(12) United States Patent
Deros et al.

(10) Patent No.: US 7,893,567 B1
(45) Date of Patent: Feb. 22, 2011

(54) MODULAR UTILITY SYSTEM

(75) Inventors: Yani Deros, Phoenix, AZ (US);
Matthew Ibarra, Lakewood, CA (US);
Jeff Mowry, Westcliffe, CO (US);
Thomas Turner, Nashua, NH (US)

(73) Assignee: Communications Integrations, Inc, Tempe, AZ (US)

( * ) Notice: Subject to any disclaimer, the term of this patent is extended or adjusted under 35 U.S.C. 154(b) by 268 days.

(21) Appl. No.: 12/059,881

(22) Filed: Mar. 31, 2008

(51) Int. Cl.
*H01B 7/30* (2006.01)
*H05K 1/02* (2006.01)
(52) U.S. Cl. .................................. 307/147; 307/42
(58) Field of Classification Search .......... 307/147, 307/42
See application file for complete search history.

(56) References Cited

U.S. PATENT DOCUMENTS

| | | | |
|---|---|---|---|
| 5,149,277 A | 9/1992 | LeMaster | |
| 5,727,963 A | 3/1998 | LeMaster | |
| 5,886,295 A * | 3/1999 | Carino et al. | 174/481 |
| 7,618,270 B2 * | 11/2009 | Scherer et al. | 439/152 |

* cited by examiner

*Primary Examiner*—Michael Rutland Wallis
(74) *Attorney, Agent, or Firm*—Marian J. Furst

(57) ABSTRACT

A modular office wiring system comprising a power distribution module, at least one data hub, at least one ten-conductor high-voltage cable, a cable carrier, connectors, at least one power core, at least one high-voltage power module, and at least one low-voltage data module. The system may additionally include one or more splitters that provide branch power lines, with additional power cores positioned on the branch lines and additional high-voltage power modules and low-voltage data modules connected to the additional power cores. In addition, a method is provided for installing and uninstalling the modules to each other.

70 Claims, 43 Drawing Sheets

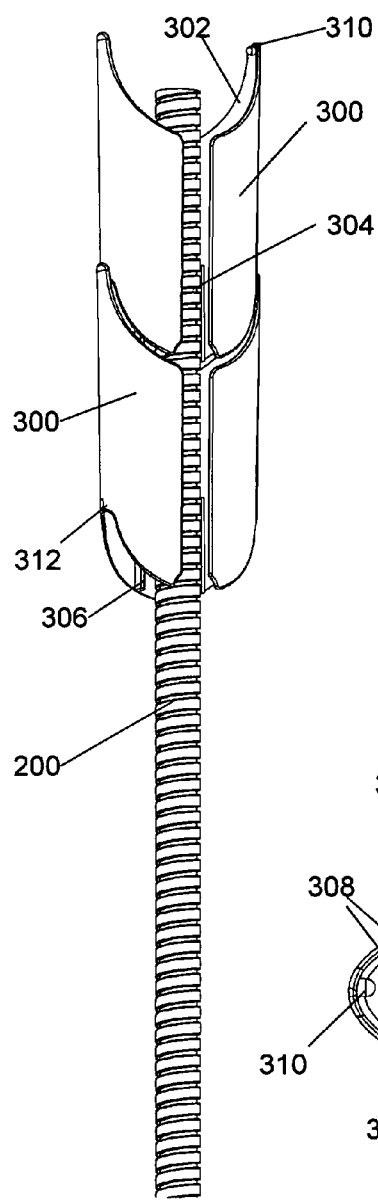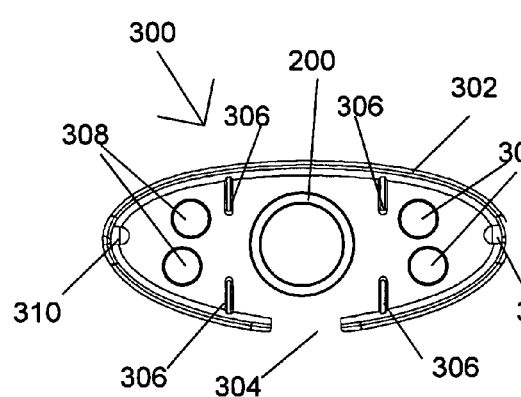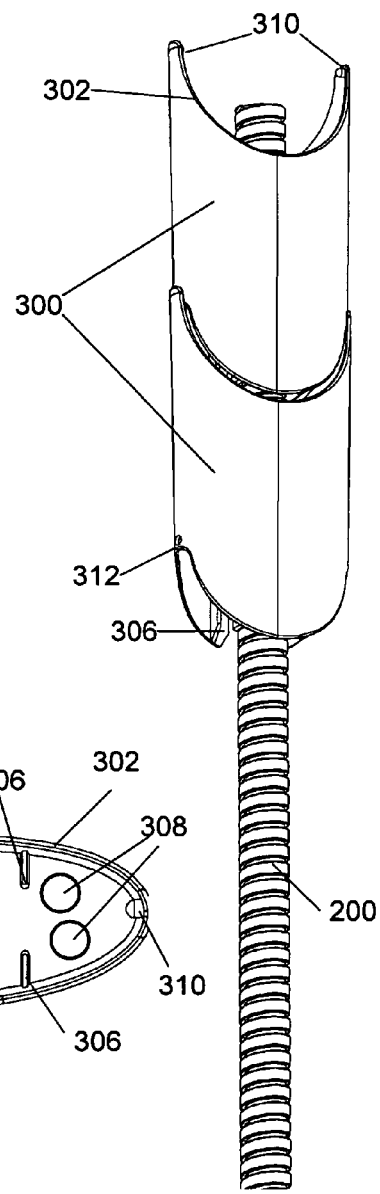
Fig. 5
Fig. 6
Fig. 7

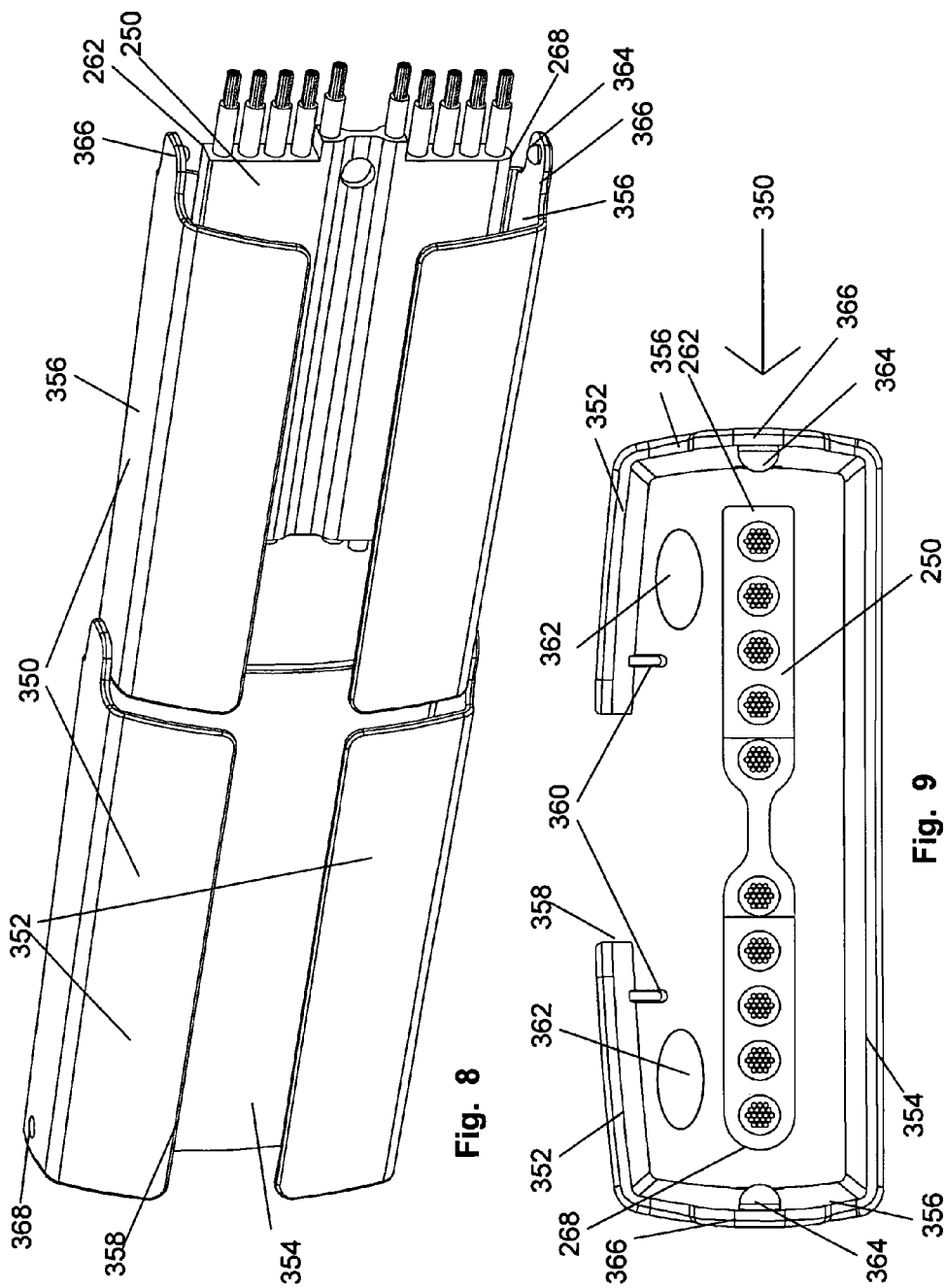

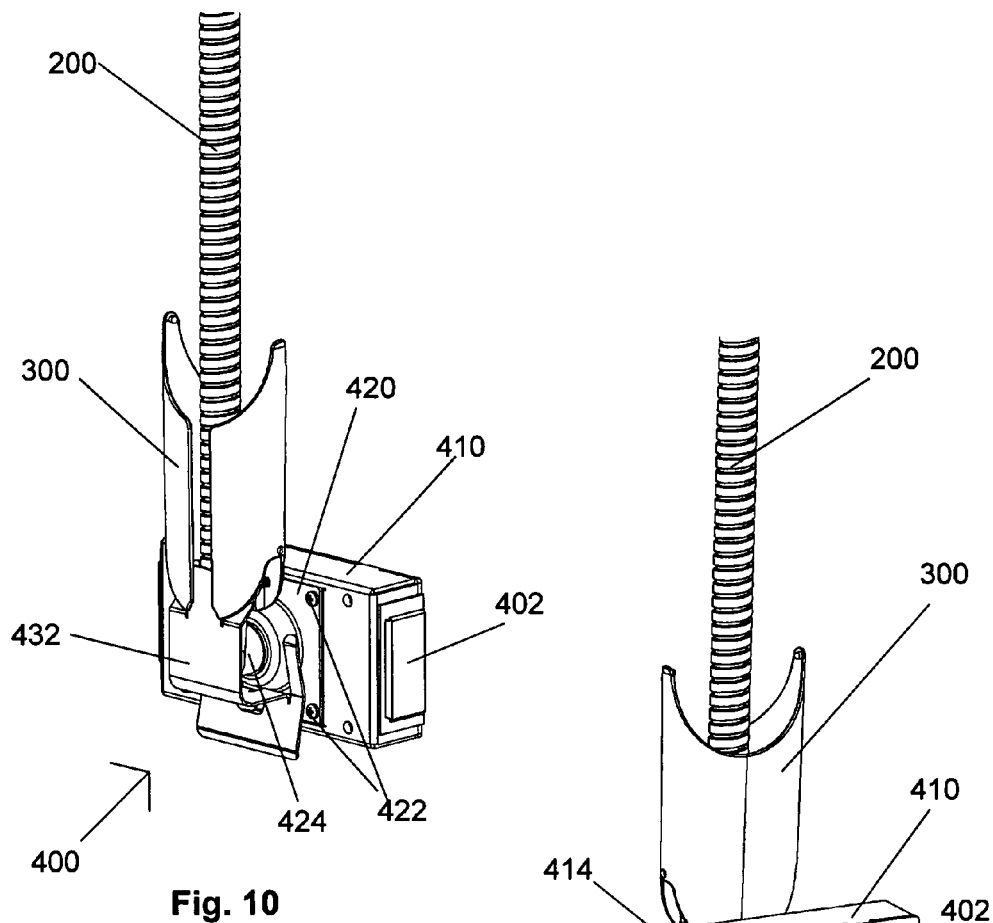
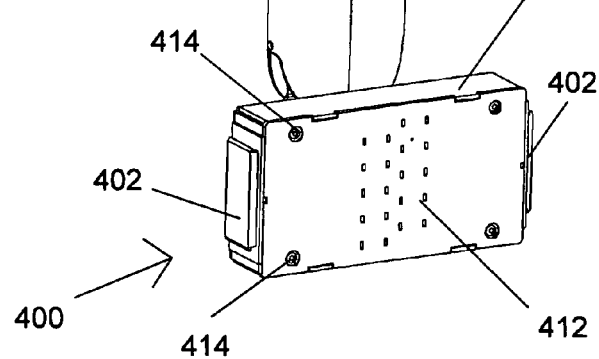

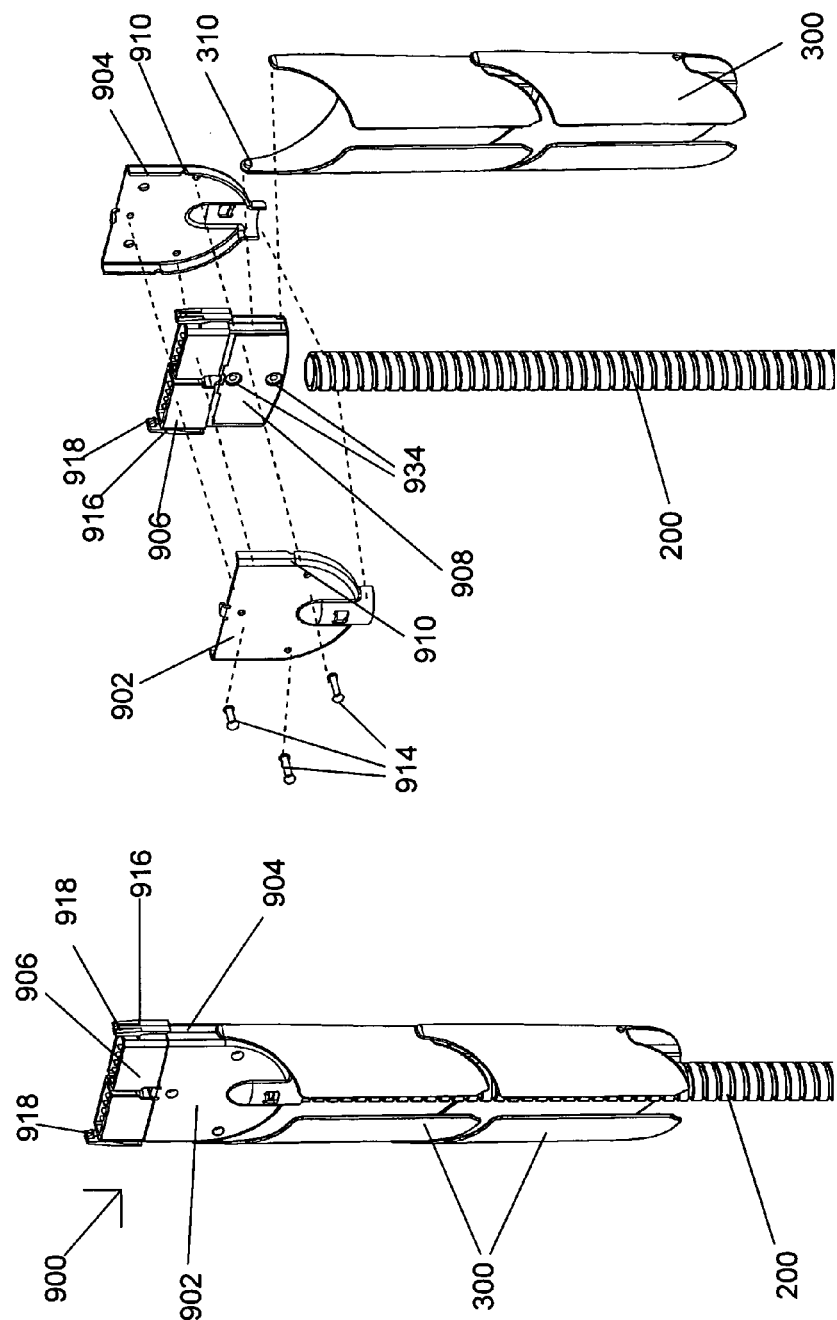

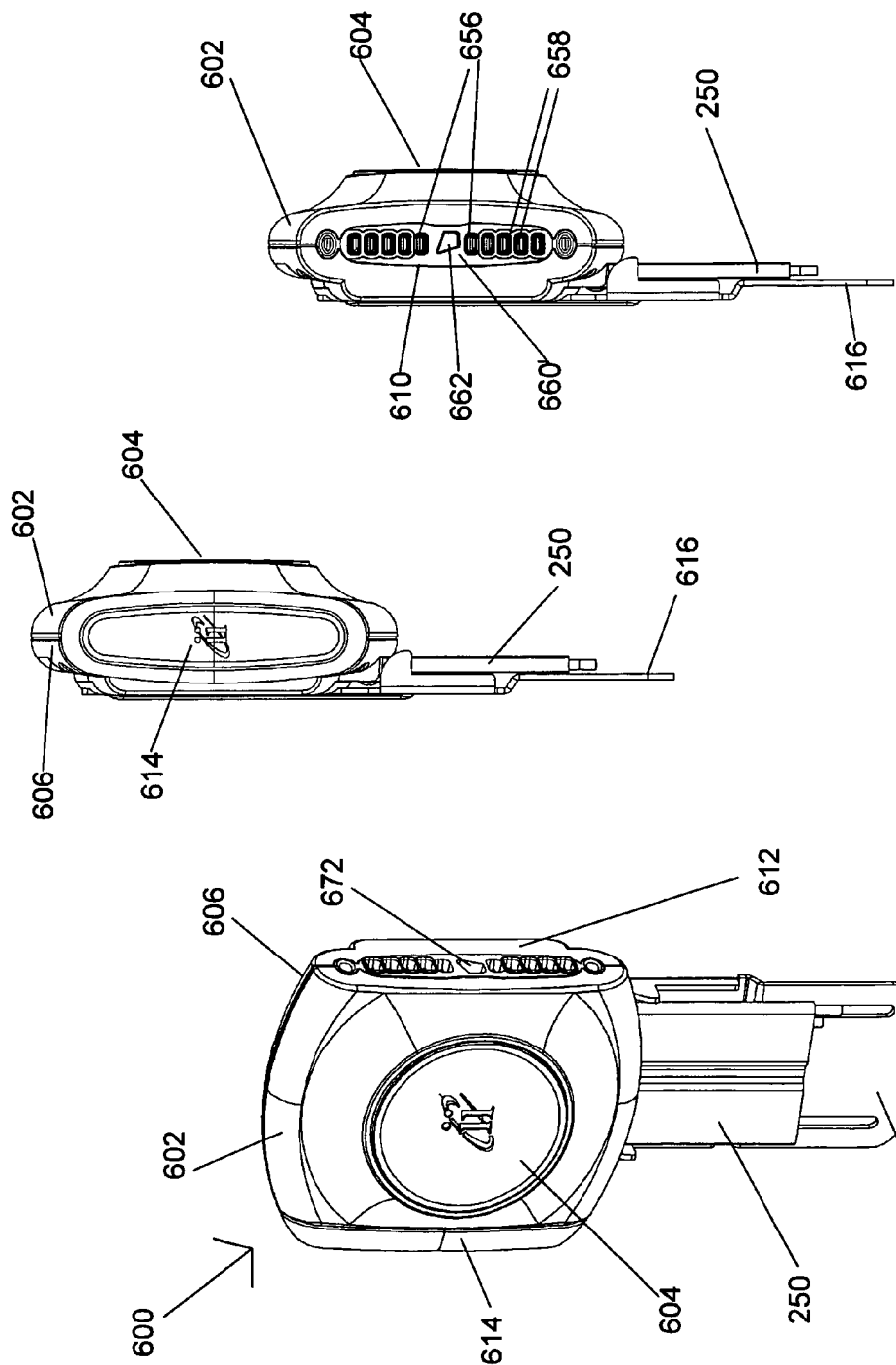

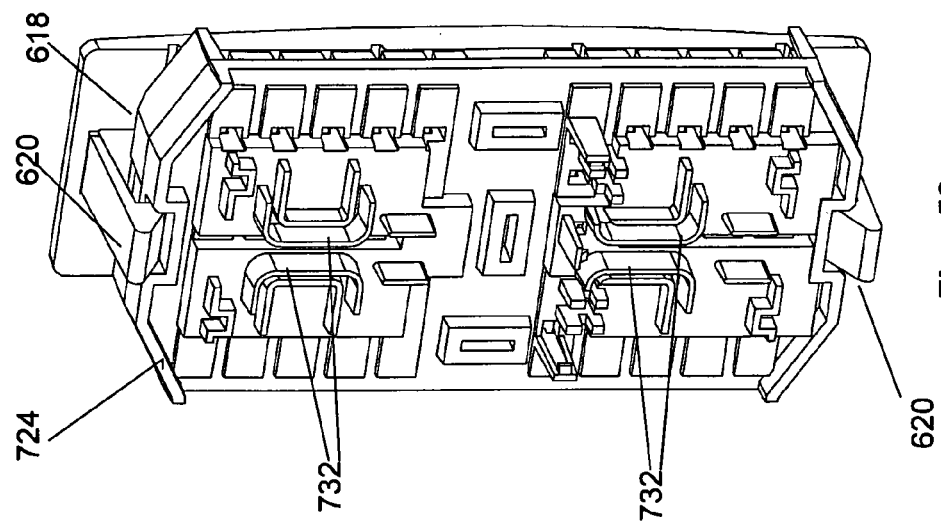
Fig. 53
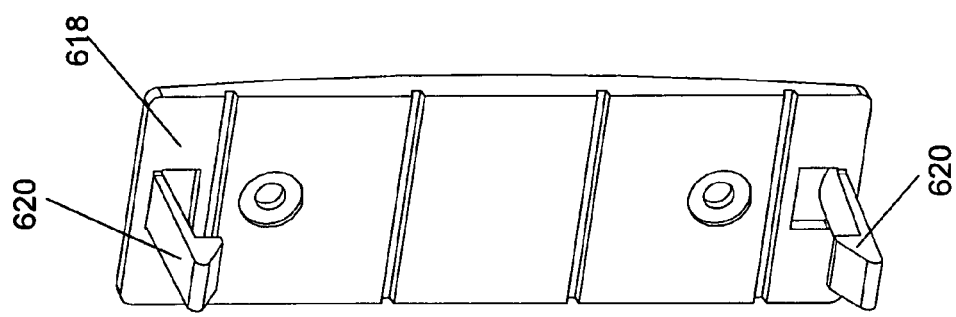
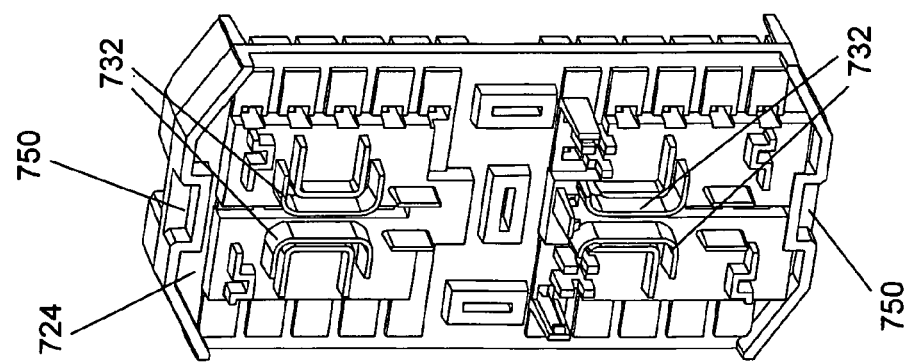
Fig. 52

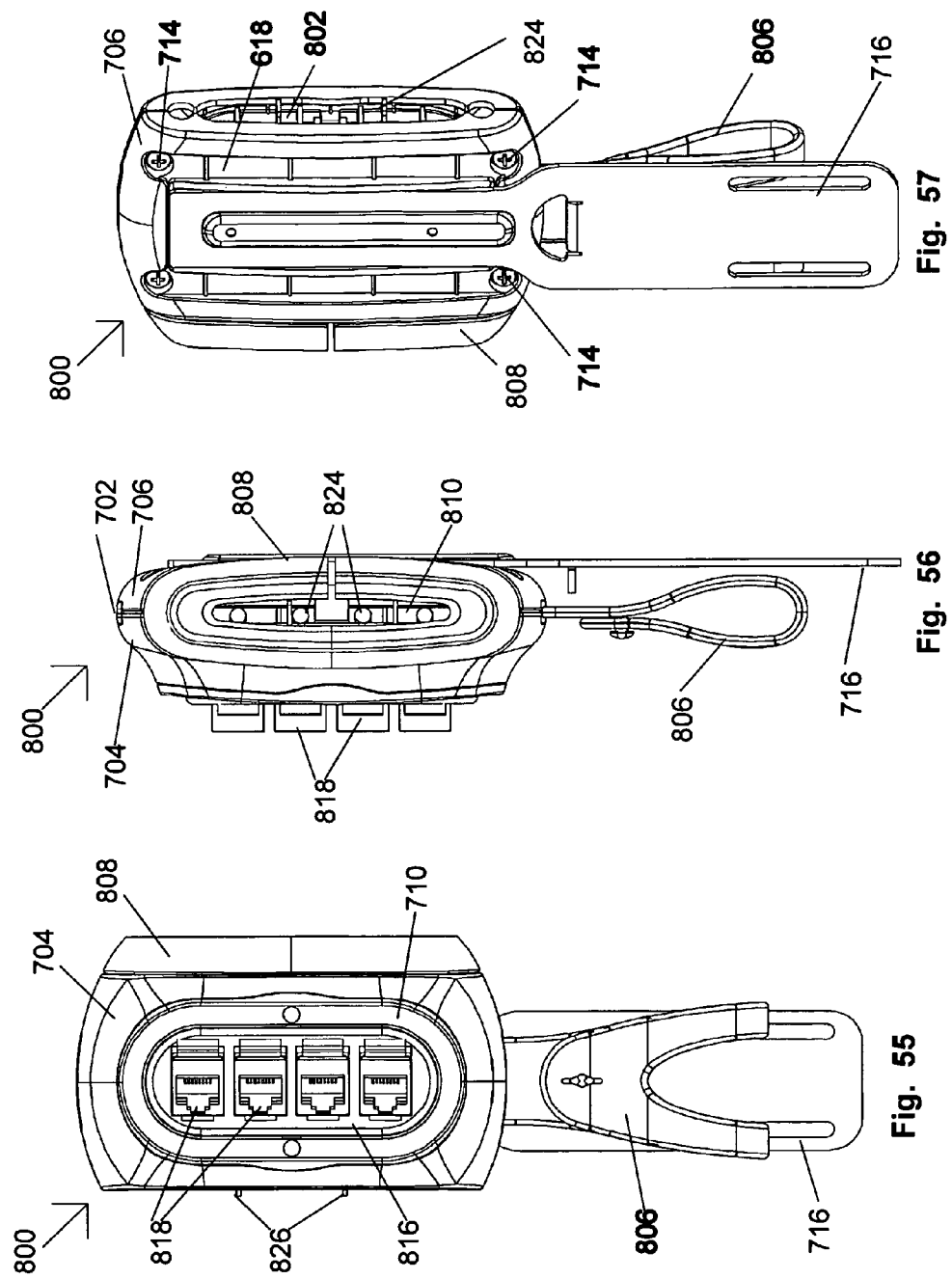

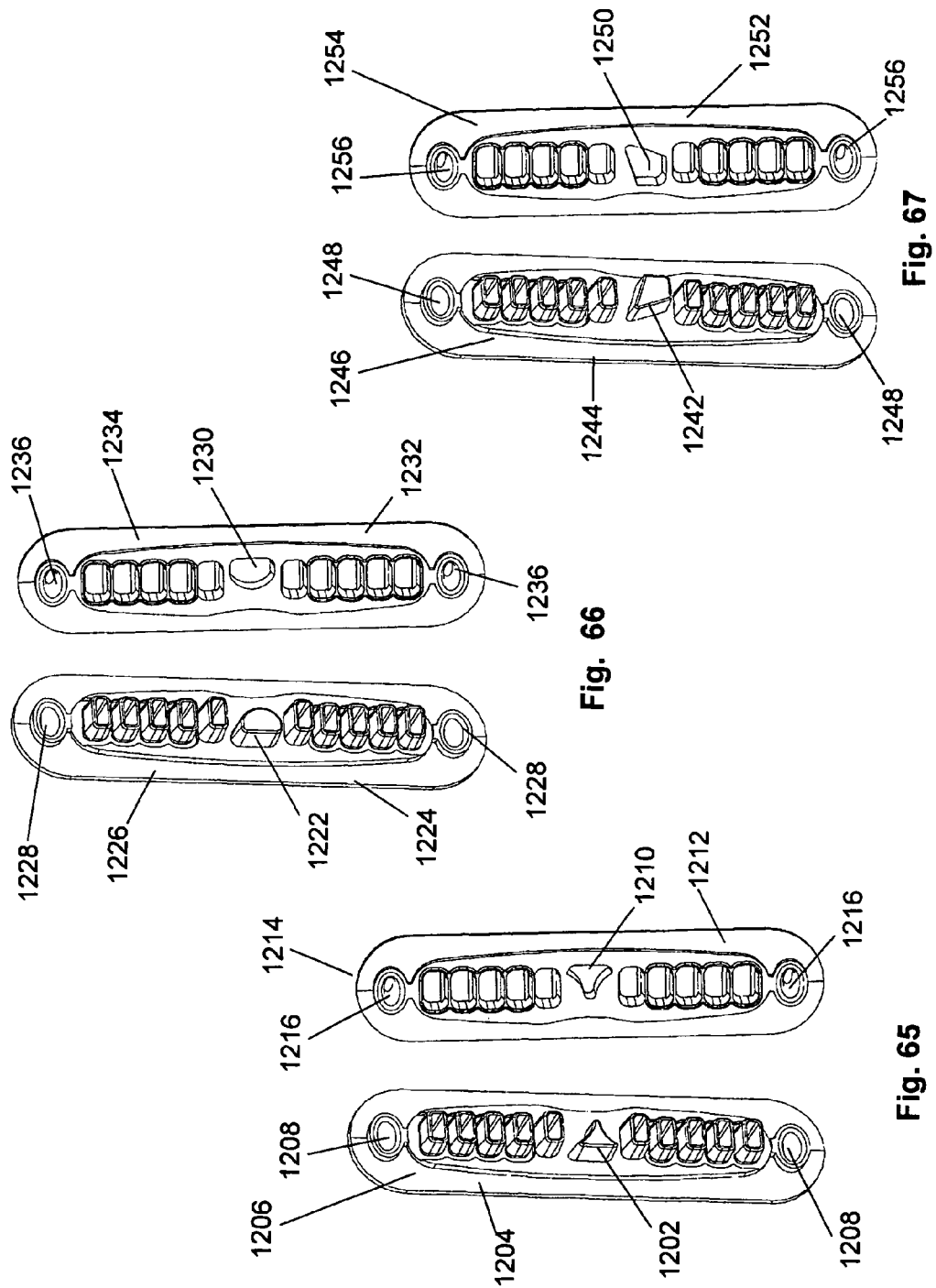

MODULAR UTILITY SYSTEM

FIELD OF THE INVENTION

The present invention relates generally to a modular utility system, and more particularly to a modular utility system including at least one ten-conductor high-voltage cable, a cable carrier, electrical connectors, at least one modular power core, at least one modular power receptacle, and at least one modular data receptacle.

BACKGROUND OF THE INVENTION

Modular office furniture systems are frequently used in individual interior offices or in large open areas sharing work spaces. With modern electronic equipment, including computers, monitors, fax machines, printers, peripherals, etc., served by separate electrical, telephone, and data lines, it is necessary to handle a large number of wires or cables in a manner that provides electricity, data, telephone communications, etc. to individual work stations, yet does not have wires or cables lying on the floor or elsewhere where they pose tripping hazards, as well as being unsightly. Cable management is crucial for providing a safe, efficient, and attractive work area.

In many commercial office environments, it also is desirable to maintain flexibility in positioning workers and in reconfiguring work stations. Commonly used types of modular furniture offer the ability to be dis-assembled, moved, reconfigured, and re-assembled, but re-routing all the wires and cables still poses a major problem, particularly because different workers or work stations have different requirements for electronic equipment and the accompanying power, data, and telephone lines. Although this flexibility can be provided using standard powered furniture outlets, wall outlets, extension cords or power strips, possibly with surge suppressors, and receptacles for multiple plugs, etc., the use of extension cords only proliferates the number of wires that must be managed and can lead to fire hazards. Further, in large shared work spaces, such as when "cubicles" are used, it can be difficult to supply enough outlets in locations where the plugs and wires won't be in the way.

In a typical office wiring installation, the main building power line enters into a power room and utility cabinet. Within the utility cabinet, individual wires are connected to the main power line through a series of protective circuit breakers, being hand configured as individual branch circuits having phased, neutral, and ground wires. The branch circuit wires are then threaded through a rigid conduit that is hung from the ceiling and walls, with individual connections made manually at each end of each wire. Care must be taken to track which wires are used to carry phased, neutral, and ground circuits. This process is time-consuming, complex, and labor intensive, and it requires the services of a qualified electrician. Therefore, it is generally quite expensive to install and re-route wiring.

Thus, there is a need for an improved system for managing power, data, and telephone lines for work stations and work areas, which provides the same level of convenience and flexibility as currently used modular furniture provides for configuring and re-configuring work stations and work areas.

SUMMARY OF THE INVENTION

To achieve the foregoing and other objects and in accordance with the purpose of the present invention broadly described herein, one embodiment of this invention comprises a modular utility system for providing high-voltage power and low-voltage telecommunications connectivity to equipment of at least one work station. The system includes a whip cable having up to 10 conductors and operative to carry a pre-determined assignment of phase, neutral, and ground circuits in the conductors; a power core module in electrical contact with the whip cable and operative to maintain the pre-determined assignment of phased, neutral, and ground circuits; at least one high-voltage power module in mated physical and electrical contact with the power core module and operative to distribute high-voltage power to the workstation equipment with the pre-determined assignment of phase, neutral, and ground circuits; and at least one low-voltage data module in mated physical contact with one of the high-voltage power modules or the power core. The system may comprise a plurality of high-voltage power modules connected serially to the power core. Also, the system may comprise multiple low-voltage data modules, wherein each low-voltage data module is in mated physical contact with a different one of the high-voltage power modules. Further, the system may comprise at least one high-voltage power splitter, with each splitter providing high-voltage power to a side branch whip cable having up to ten conductors. There may be a power core on each side branch, wherein each power core is in electrical contact with one of the side branch whip cables. In the system, at least one high-voltage power module may be in mated physical and electrical contact with each of the power cores, and at least one low-voltage data module may be in physical contact with each power core or a high-voltage power module in contact with each power core. In addition, the system may comprise a power distribution module having at least one input for a multi-conductor trunk cable cable and at least one output connector adapted for use with the whip cable. The system may further comprise mated connectors for providing electrical continuity between the whip cable and the power core. There may be a cable carrier at least partially enclosing the whip cable, with the cable carrier also including means for retaining additional low-voltage cables selected from telephone cables, data transmission cables, fiber optics cables, coaxial cables, and combinations thereof. The cable carrier may comprise flexibly linked sections. In the system, each of the power cores and each of the high-voltage power modules comprises a male connector on one side and a female connector on an opposing side, wherein at least one of the following conditions occurs:

- the male connector of the power core is mated with the female connector of an adjacent high-voltage power module or an adjacent data module;
- the female connector of the power core is mated with the male connector of the adjacent high-voltage power module or an adjacent data module;
- the male connector of the high-voltage power module core is mated with the female connector of the adjacent power core or high-voltage power module or with an adjacent data module; or
- the female connector of the power module is mated with the male connector of the adjacent power core or power module or an adjacent data module.

The male and female connectors may each include mated key features correlated with the pre-determined assignment of phase, neutral, and ground circuits. The whip cable may comprise an array of up to ten conductors arranged side by side within a ribbon cable sheath, with the sheath including indicia for identifying each of the conductors. The system may also comprise a bracket for mounting the power core, power modules, and data modules to a work surface. Each of the power cores, power modules, and data modules may comprise a shuttle having latches engage-able with an internal chassis that retains electrical components. The system may further comprise a tool for uninstalling the power modules and data modules. In this case, the tool has tines that engage with the latches of the shuttles and is operable to release the latches of the shuttle from the chassis. At least one of the power modules and the data modules comprises means for retaining high-voltage power cords and low-voltage cables selected from telephone cables, data cables, fiber optics cables, coaxial cables, and combinations thereof.

Another embodiment of the present invention comprises a ten-conductor whip cable comprising an array of up to ten conductors arranged within a ribbon cable sheath, wherein the sheath includes indicia for identifying each of the conductors. The up to ten conductors may be individually insulated within the ribbon cable sheath. The sheath may include two opposing differently shaped sides providing the indicia, with the conductors disposed side by side within the sheath. The whip cable sheath may include openings for attachment of connectors to the cable.

Yet another embodiment of the present invention comprises a male connector for providing physical and electrical contact between a first whip cable and a female connector on a second whip cable. The male connector comprises a male connector housing and a connector chassis retaining up to ten contacts. Each contact is in electrical communication with an end of one wire of the first whip cable. The chassis is secured about an end of the whip cable and within the male connector housing. Two of the contacts extend farther away from the first whip cable than the rest of the contacts for providing first make/last break connections and disconnections for a safety/equipment ground line and an isolated ground line. The first whip cable may be a ribbon cable, or it may comprise up to ten individual wires within a flexible conduit. The male connector may further comprise mated shell portions including flanges engaged with the flexible conduit, the male connector housing, and the connector chassis. In addition, the male connector may further comprise means for locking the male connector to the female connector. The means for locking may be operable with one hand, and it may comprise at least one lever with a tip engage-able with an opening in the female connector.

Still another embodiment of the present invention comprises a female connector for providing physical and electrical contact with a male connector on a whip cable. The female connector comprises a female connector housing and a connector chassis retaining up to ten contacts. Each contact is in electrical communication with an end of a conductor, and two of the contacts extend farther away from the cable end than the rest of the contacts. The chassis is secured within said female connector housing. Two of the contacts extend farther away from the first whip cable than the rest of the contacts for providing first make/last break connections and disconnections for a safety/equipment ground line and an isolated ground line. The conductors may extend from a device selected from whip cables, splitters, power cores, and combinations thereof. The female connector may further comprise means for locking the female connector to the male connector. The means for locking may includes at least one opening engage-able with a lever tip of the male connector.

Yet another embodiment of the present invention comprises a flexible cable carrier for a whip cable and low-voltage telephone, data, fiber optics, and coaxial cables. The cable carrier comprises an elongated, hollow section of an elastomeric material having a slot there-through extending the length of the section, wherein the section is shaped to substantially surround and enclose the whip, telephone, and data cables; and means for joining the section to another section or to a device connected to the whip cable. The cable carrier section may have first and second ends, with the means for joining comprising opposing pivot pins adjacent the first end of the section and opposing holes for receiving pivot pins adjacent the second end. The cable carrier section may further comprise inwardly projecting ribs for retaining the cables within the section. The cable carrier may comprise a plurality of flexibly linked sections.

Still another embodiment of the present invention comprises a splitter for splitting a first high-voltage line into second and third high-voltage lines, each high voltage line having up to 10 conductors (hereafter referred to as 10-conductor lines). The splitter comprises a splitter base; a splitter housing joined to the splitter base with a space there-between, the housing also including an opening through which the third high voltage line passes; two opposing connecting extensions retained between the splitter base and the splitter housing, the connecting extensions mate-able with connectors on whip cables of the first and second high voltage lines; ten internal conductors extending between the connecting extensions and within the space between the splitter housing and the splitter base; one contact engaging electrically each internal conductor within the space; means for engaging each conductor of the third line within the space and in electrical continuity with a corresponding one of the internal conductors; and means for mechanically supporting the third 10-conductor line adjacent the splitter. The first, second, and third 10-conductor lines may be whip cables within a tubular conduit, or at least one of the 10-conductor lines may be a ribbon cable. The internal conductors may be selected from wires and bus bars. The contacts may be retained by devices selected from spacers integral with the base, spacers integral with the housing, and combinations thereof. The means for engaging may comprise contacts engaging each of the internal conductors with a separate spade, wherein each spade is in electrical continuity with one contact and one conductor in the third line. The internal conductors may comprise bus bars, and the means for engaging may comprise contacts, with one contact engaging each bus bar and providing electrical continuity between the bus bar and one conductor in the third line. The means for supporting may comprise a bracket in mechanical contact with the housing and the third branch line.

Yet another embodiment of the present invention comprises a power core for use in a modular utility system. The power core comprises a front core housing; a rear core housing secured to the front core housing and defining a space there-between; a male connect bezel retained between the front and rear core housings on one side of the power core; a female connect bezel retained between the front and rear core housing on a second side of the power core opposing the male connect bezel; a core chassis retained between the front and rear core housing; a core cover secured to the rear core housing and forming a space there-between; a 10-conductor whip cable having an end positioned between the core cover and the rear core housing; 10 bus bars retained by the chassis and providing electrical continuity between the male and female connect bezels within the space defined between the front and rear core housings; and 10 angle contacts, one extending from each of the bus bars through an opening in the rear core housing and engaging one conductor of the whip cable within the space defined between the rear core housing and the core cover, with each angle contact providing electrical continuity between one of the bus bars and one of the conductors of the whip cable. The whip cable may be a ribbon cable. The power core may further comprise means for mounting the power core adjacent a work surface. The means for mounting may comprise a blade insert-able into a mounting bracket adjacent the work surface, a shuttle adapted for lateral motion relative to the work surface, or a combination thereof. The power core may further comprise means for indicating when electrical power is supplied to the power core. The means for indicating may comprise an electrically or inductively powered light source.

Still another embodiment of the present invention comprises a high-voltage power module for a modular utility system, the system comprising a power core. The power module comprises a front module housing; a rear module housing attached to the front module housing and enclosing a space there-between; a male connect bezel retained between the front and rear module housings on one side of the power module; a female connect bezel retained between the front and rear module housings on a second side of the power module opposing the male connect bezel; a power module chassis retained between the front and rear module housings; 10 current carriers retained by the chassis and providing electrical continuity between the male and female connect bezels within the space defined between the front and rear module housings, with each current carrier designated to carry a type of current selected from phased, neutral, or ground circuits; at least one power receptacle retained within an opening in the front module housing, the power receptacle including openings for two power prongs and a ground prong of an electrical plug; ground straps electrically connecting the ground current carriers to a ground contact in each power receptacle; and power straps electrically connecting the phased and neutral current carriers to the at least one power receptacle in accordance with a pre-determined power line configuration. The current carriers may be bus bars. The power receptacle may be selected from 110V power receptacles and 220 V power receptacles. The high-voltage power module may further comprise an indicator for the power configuration of the current carriers. The indicator may be a ring retained within the opening in the front module housing between the front module housing and the at least one power receptacle. The power module may further comprise means for mounting the high-voltage power module adjacent a work surface and in electrical contact with a power core of the utility system. The means for mounting may comprise a blade insert-able into a mounting bracket adjacent the work surface, a shuttle adapted for lateral motion relative to the work surface, or a combination thereof.

Yet another embodiment of the present invention comprises a low-voltage data module for a modular utility system, with the system comprising a power core and at least one power module in physical and electrical contact with the power core. The data module comprises a front module housing; a rear module housing attached to the front module housing and partially enclosing a space there-between; a data module chassis retained between the front and rear module housings and including projections that are physically align-able with an adjacent power core or high-voltage power module; and at least one communications receptacle in electrical communication with a low-voltage line selected from telephone lines and data lines, the receptacle retained by the chassis between the front and rear module housings and extending into an opening in the front module housing to enable connection of a telecommunications line extending between the communications receptacle and telecommunications equipment. The telecommunications receptacles may be selected from telephone cable receptacles, network cable receptacles, fiber optics cable receptacles, fiber optics cable receptacles, and coaxial cable receptacles. The low-voltage data module may further comprise indicia for identifying the type of low-voltage circuit associated with each receptacle. Also, the data module may further comprising means for mounting the low-voltage data module adjacent a work surface and in physical contact with a data module or power core of the utility system. The means for mounting may comprise a blade insert-able into a mounting bracket adjacent the work surface, a shuttle adapted for lateral motion relative to the work surface, or a combination thereof.

Another embodiment of the present invention comprises a tool for uninstalling modules of a modular utility system, with the system comprising a power core and at least one module selected from high-voltage power modules and low-voltage data modules, each module comprising a shuttle that is reciprocally slide-able relative to a chassis within the module and having paired latches engage-able with the chassis. The tool comprises a handle and a pair of tines extending from the handle, each tine terminating in a tapered tip engage-able with the shuttle latches on one of the modules.

Yet another embodiment of the present invention comprises a keying system for aligning and mating first and second modules of a modular utility system having a pre-determined power configuration, each module having a front, two sides, and a male connect bezel on one side and a female connect bezel on the other side. The keying system comprises a male mating surface at the exterior of each of the male connect bezels and openings through the male mating surface into which electrical contacts extend from the interior of the module; a distinctively shaped key protruding outward from the male mating surface; a female mating surface at the exterior of each of the female connect bezels and openings through the female mating surface into which electrical contacts extend from the interior of the module; and a keyhole in the female mating surface having a shape complementary to the distinctively shaped key; wherein the key of the first module is insert-able only into the complementarily shaped keyhole of the second module to mate the modules with the electrical contacts of the modules providing electrical continuity of the pre-determined power configuration between the modules. Preferably, the male connect bezels are positioned on the left sides of each of the modules, and the female connect bezels are positioned on the right sides of each of the modules, as viewed from the front of the module. The predetermined power configuration may be selected from 4D, 3+2, and 3+3. In the keying system, the first module may be a power core and the second module may be a high-voltage power module, and the system may further comprise additional high-voltage power modules, with each high-voltage power module including male and female mating surfaces substantially identical to the male and female mating surfaces of the power core. In this case, the key of each module is insert-able into the keyhole of another of the modules to mate the modules to provide electrical continuity between all of the modules in the pre-determined power configuration.

Still another embodiment of the present invention comprises a method for installing and de-installing a modular utility system for providing high-voltage power and low-voltage telecommunications connectivity to equipment of at least one work station. Each module comprises a chassis, a mounting blade, and a shuttle, with the mounting blade fixed to the shuttle and the shuttle latchable to the chassis. modular utility system. The method comprises the steps of:

(a) providing a mounting bracket and means for mounting each mounting blade to the bracket with the modules in a side-by-side arrangement;

(b) providing first and second modules, each module having a shuttle/blade subassembly detached from the module;
(c) mounting the first module shuttle/blade subassembly to the mounting bracket;
(d) mounting the first module onto the first module shuttle/blade subassembly and latching the first module's shuttle to the first module's chassis;
(e) mounting the second module shuttle/blade subassembly to the mounting bracket adjacent the first shuttle/blade assembly;
(f) mounting the second module onto the second module shuttle/blade subassembly with the second module's chassis positioned laterally away from the first module; and
(g) sliding the second module toward the first module until the second module is positioned in physical contact with the first module and the second module's shuttle latches to the second module's chassis.

In the method, the first module may be a power core and the second module may be a high voltage power module. Steps e-g may be repeated to mount a third module to one of the first and second modules. The third module may be selected from high voltage power modules and low voltage data modules. Steps e-g may be repeated to mount up to three modules on each side of a power core to form a linear array of connected modules, with the array comprising no more than two low voltage data modules with each low voltage data module at an end of the array. For de-installation of the system, the method may comprise the additional steps of providing a de-installation tool which comprises a handle and a pair of tines extending from the handle. Each tine terminates in a tip engage-able with each shuttle of each module. In addition, the tines are inserted into openings in the last of the modules to disengage the shuttle latches from the chassis of the last module. Then, steps c-g are reversed.

BRIEF DESCRIPTION OF THE DRAWINGS

These and other features, aspects, benefits, and advantages of the present invention will become better understood with reference to the following description, appended claims, and accompanying drawings, where:

FIG. 5 is a front perspective view of a whip cable and cable carrier sections in accordance with the present invention;

FIG. 6 is a top view of one of cable carrier sections of FIG. 5;

FIG. 7 is a rear perspective view of the whip cable and cable carrier sections of FIG. 5;

FIG. 8 is a front perspective view of another embodiment of two cable carrier sections for use with the whip cable of FIG. 4;

FIG. 9 is a cross-sectional view of the cable carrier and whip cable of FIGS. 4 and 8;

FIG. 10 is a front perspective view of a splitter in accordance with the present invention;

FIG. 11 is a rear perspective view of the splitter of FIG. 10;

FIG. 20 is a front perspective view of a whip cable, cable carriers, and male connector in accordance with the present invention;

FIG. 21 is a front exploded perspective view of the whip cable, cable carriers, and male connector of FIG. 20;

FIG. 33 is a front perspective view of a power core in accordance with the present invention;

FIG. 34 is a left side view of the power core of FIG. 33 with an end cap in place;

FIG. 35 is a left side view of the power core of FIG. 33, without the end cap;

FIG. 52 is a front perspective view of the separated shuttle and high-voltage module chassis of the high-voltage power module of FIG. 41;

FIG. 53 is a front perspective view of the engaged shuttle and high-voltage module chassis of the high-voltage power module of FIG. 41;

FIG. 55 is a front view of a low-voltage data module in accordance with the present invention;

FIG. 56 is a right side view of the low-voltage data module of FIG. 55;

FIG. 57 is a rear perspective view of the low-voltage data module of FIG. 55;

FIG. 65 is a front perspective view of male and female connect bezels with key features for a 3+2 wiring configuration, in accordance with the present invention;

FIG. 66 is a front perspective view of male and female connect bezels with key features for a 3+3 wiring configuration, in accordance with the present invention;

FIG. 67 is a front perspective view of male and female connect bezels with key features for a 4D wiring configuration, in accordance with the present invention;

DESCRIPTION OF THE INVENTION

Modular System

The present invention comprises a modular system for electrical power distribution, data transmission, and voice transmission to and from utility closets, server rooms, data centers, workstations, and all other areas in a commercial environment. The system includes at least one section of whip cable, cable conduits or carriers substantially surrounding the whip cable sections, at least one modular power core, at least one high-voltage power module connected physically and electrically to the power core, and at least one low-voltage data module connected physically to a high-voltage power module or to the power core. The low-voltage data module includes low-voltage ports for telephone and data connections. In addition, the system may comprise at least one power distribution module, at least one splitter to provide branches for power distribution to multiple work stations, additional sections of whip cable and cable conduit, one or more sections of ribbon cable, additional power cores, and/or additional high-voltage power and low-voltage data modules, with male and female connectors to provide electrical connections between various components. All of the connectors provide first make/last break connections and disconnections for both safety/equipment ground lines and isolated ground lines.

Figure 1:
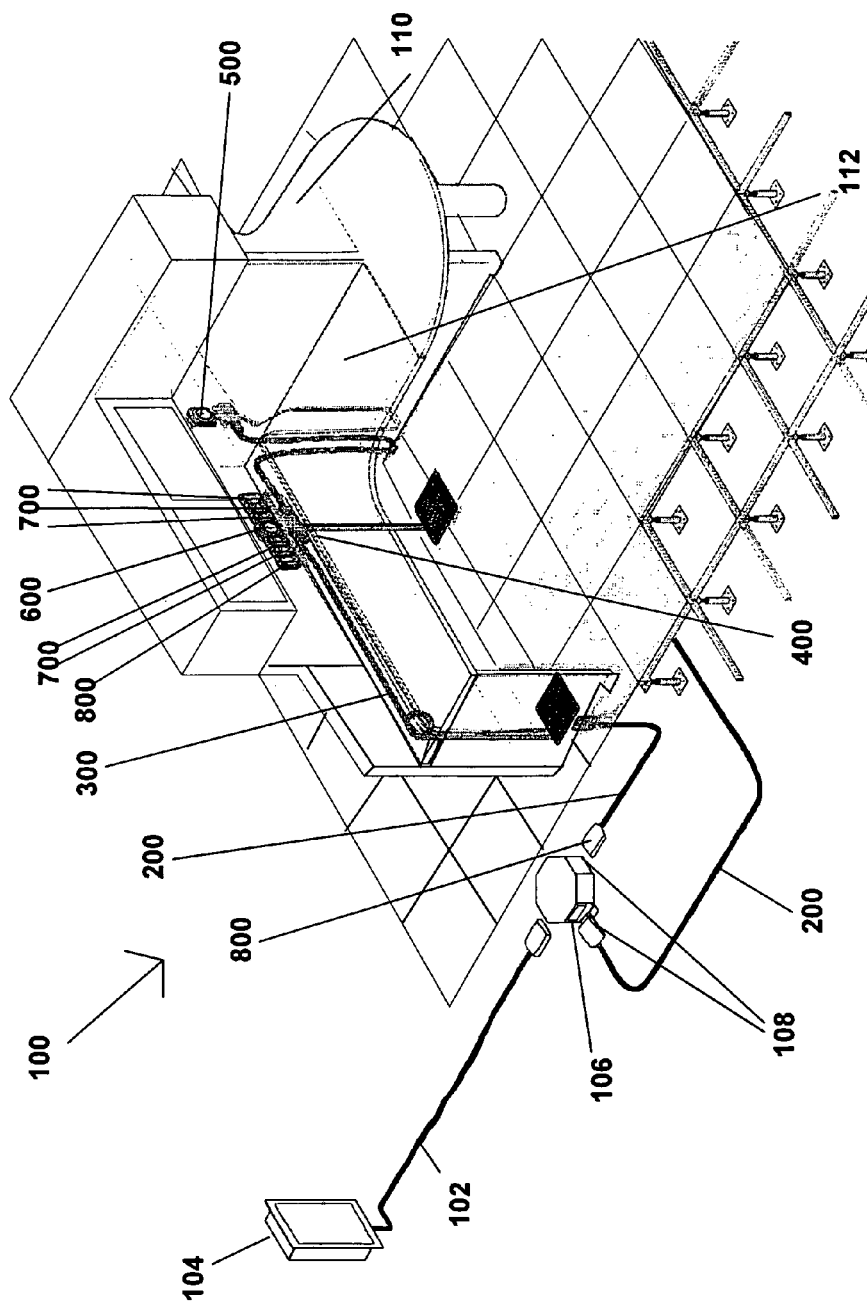
FIG. 1 is a perspective view of one installation of a system in accordance with one embodiment of the present invention.

FIG. 1 shows one installation of a system 100 in accordance with the present invention. A multi-conductor trunk cable cable 102 provides electrical connections for up to 35 individual connector wires between a power circuit breaker panel 104 and a power distribution module 106, where the wires are converted into multiple smaller whip branches 200, with each branch including up to ten conductors. Ten-conductor whip cables 200 carry high-voltage power from outlet ports 108 to work stations 110 within linked cable carrier sections 300 beneath the floor, within walls, between workstation vertical panels, within the ceiling, and/or along the horizontal work area tables or desk tops 112. The system may include one or more splitters, such as splitter 400 or splitter 500 (described below), that create branches in the power distribution system, for example, one branch to each work station 110. At each work station 110, a high-voltage power core module 600 is connected electrically to a whip power line exiting from the power distribution module 106 or the splitter 400 or 500. The power core module is mounted above or below the table or desk top or to a systems furniture panel. As shown at the leftmost workstation in FIG. 1, three high-voltage power modules 700 are connected serially to the left side of high-voltage power core module 600, and two high-voltage power modules and a low-voltage data module 800 are connected to the right side of high-voltage power module 600, with the low-voltage data module farthest from the power module. Low voltage cables 114 carry telephone and other data to low voltage data module 800. The high-voltage power modules 700 may be configured for different power circuits. As shown, multi-conductor trunk cable cable 102 is hard-wired between circuit breaker panel 104 and power distribution module 106. Alternatively, a multi-conductor trunk cable cable could be provided with connectors that can be mated with and removed from mate-able connectors on a circuit breaker panel and a power distribution module.

Figure 2:
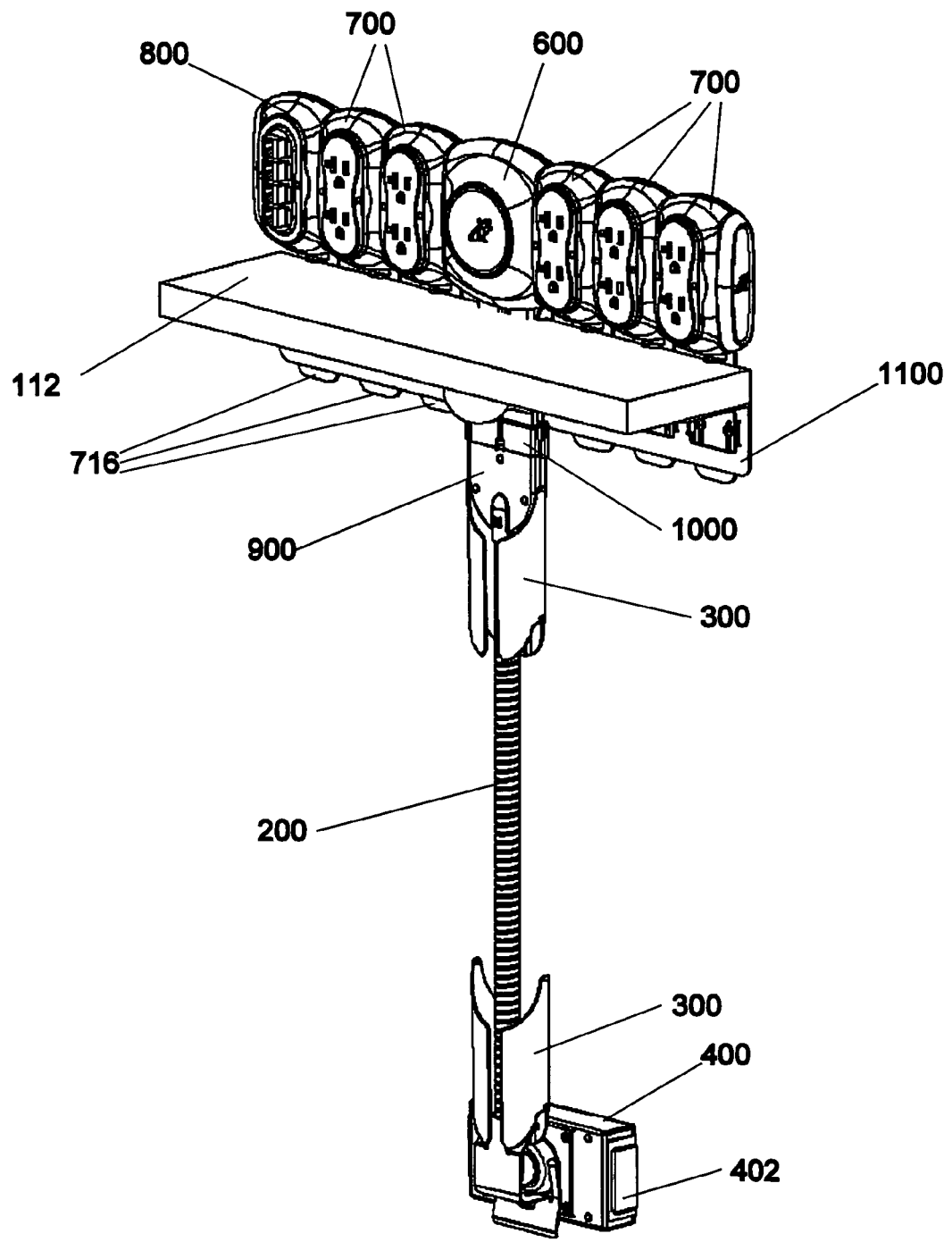
FIG. 2 is a front view of a splitter connected to a power core, power modules, and a low-voltage data module in accordance with one embodiment of the present invention.

FIG. 2 shows a more detailed view of another installation at one work station. Flexible metal conduit whip cables with connectors (not shown) run along or underneath the floor (not shown) or within the space above a suspended ceiling (not shown) and down to a workstation within hard-wall columns (not shown) or furniture system power poles (not shown), and/or within furniture panel chases (not shown). The whip cables terminate in connectors (not shown), which are mateable with female connections 402 on splitter 400. Whip cable 200 within cable carrier sections 300 provides power to modular power core 600 positioned just above the desk top 112. Male and female connectors 900 and 1000, respectively, are used to join the whip cable 200 to the power core 600, providing electrical continuity between the splitter 400 and the power core 600. High-voltage power modules 700 are connected serially to the left and right sides of power core 600, and a low-voltage data module 800 is attached to the outermost high-voltage power module 700 on the left side of core 600. Alternatively, this or another low-voltage data module could be attached to the outermost high-voltage power module 700 on the left side of core 600. Mounting bracket 1100 is secured to the bottom of the desk or table top 112, and retains the mounting blade (not shown) of power core 600 and blades 716 of high-voltage power modules 700 and low-voltage data module 800.

Figure 3:
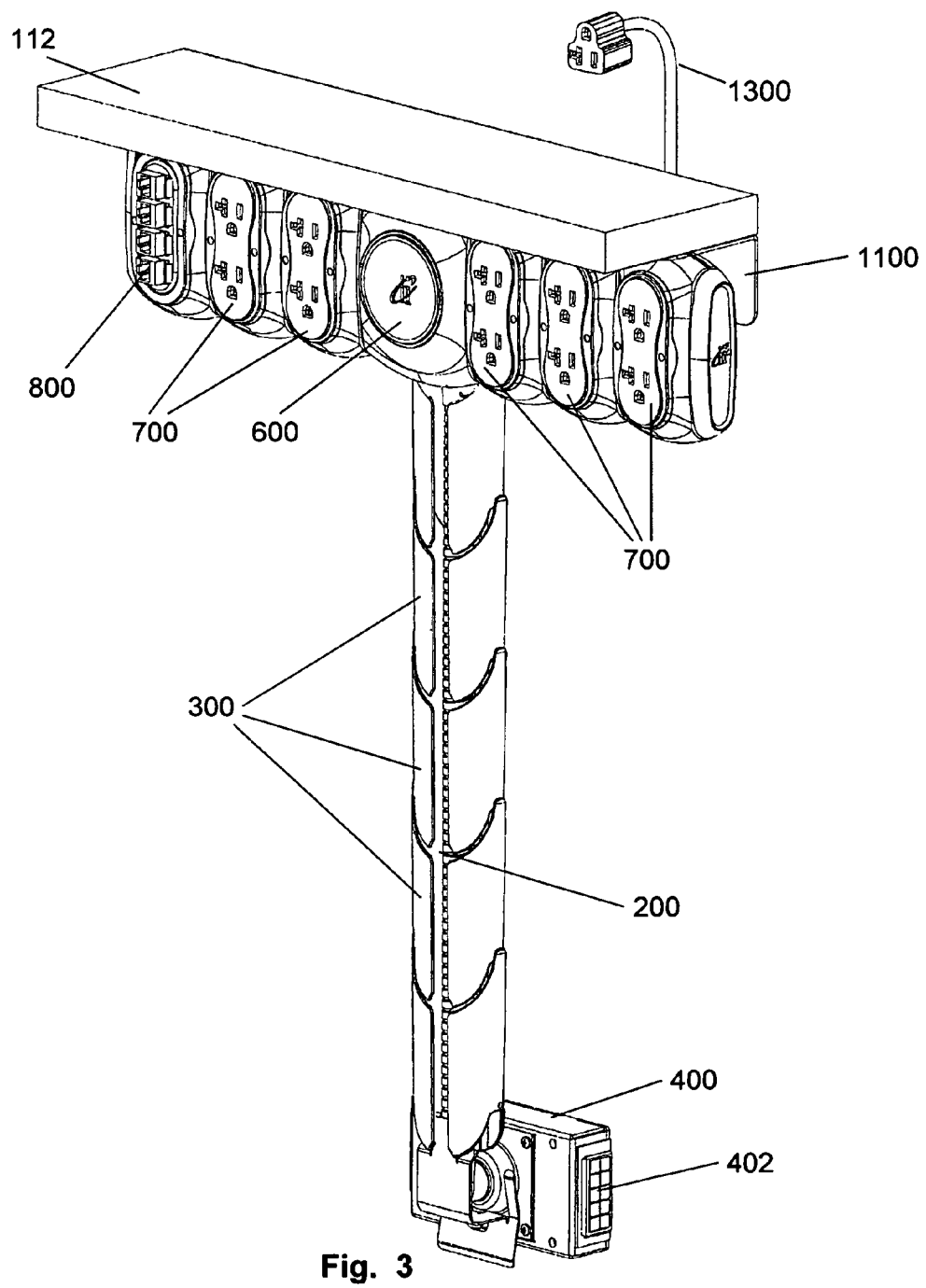
FIG. 3 is a front view of a splitter connected to a power core, power modules, and a low-voltage data module in accordance with another embodiment of the present invention.

As shown in FIG. 3, a power core 600, high-voltage power modules 700, and low-voltage data module 800 may, alternatively, be mounted below desk or table top 112. In this case, it may be desirable to include one or more goosenecks 1300 extending upward from one or more high-voltage power modules 700 to provide one or more power outlets above the desk or table top 112.

Throughout the system, wire conductors are designated into three types: phased (ungrounded), neutral (grounded), or safety/equipment ground lines. Generally, each line type is color coded within a ribbon cable or within a flexible conduit. This configuration of phased, neutral, and ground wires is maintained throughout the system and across connections between system components, thus significantly reducing the time and effort required to install an office wiring system and also significantly simplifying the installation process.

The components of the system are described in more detail below. In the following discussion, the terms "front," "back," "side," "top," and "bottom" refer to the modules as oriented and shown in FIG. 2. The term "PCB" refers to a printed circuit board. The term "LED" refers to a light-emitting diode.

Power Distribution Module

In a typical commercial office setting, a multi-conductor trunk cable cable having up to thirty-five conductors or wires extends within a flexible conduit originating at the power/utility cabinet and extending to a power distribution module, wherein the circuit conductors are wired for connection to multiple jumper whip cables, with each cable providing from one to six branch circuits to a portion of the office environment. The multi-conductor trunk cable cable may carry up to thirty-five conductors or wires and is hard wired to the power distribution module. In accordance with the present invention, a power distribution module is provided that includes multiple sockets into which connectors attached to sections of flexible whip cable or ribbon cable can be inserted. The connectors may be of the type described in U.S. Pat. No. 5,727,963, issued to LeMaster on Mar. 17, 1998, and U.S. Pat. No. 5,149,277, issued to LeMaster on Sep. 22, 1992, both of which are incorporated herein by reference in their entirety. Such connectors are available from Communications Integrators Incorporated, located at 2625 S. Wilson Street, Suite 106, Tempe, Ariz. 85282.

Ribbon Cable

Figure 4:
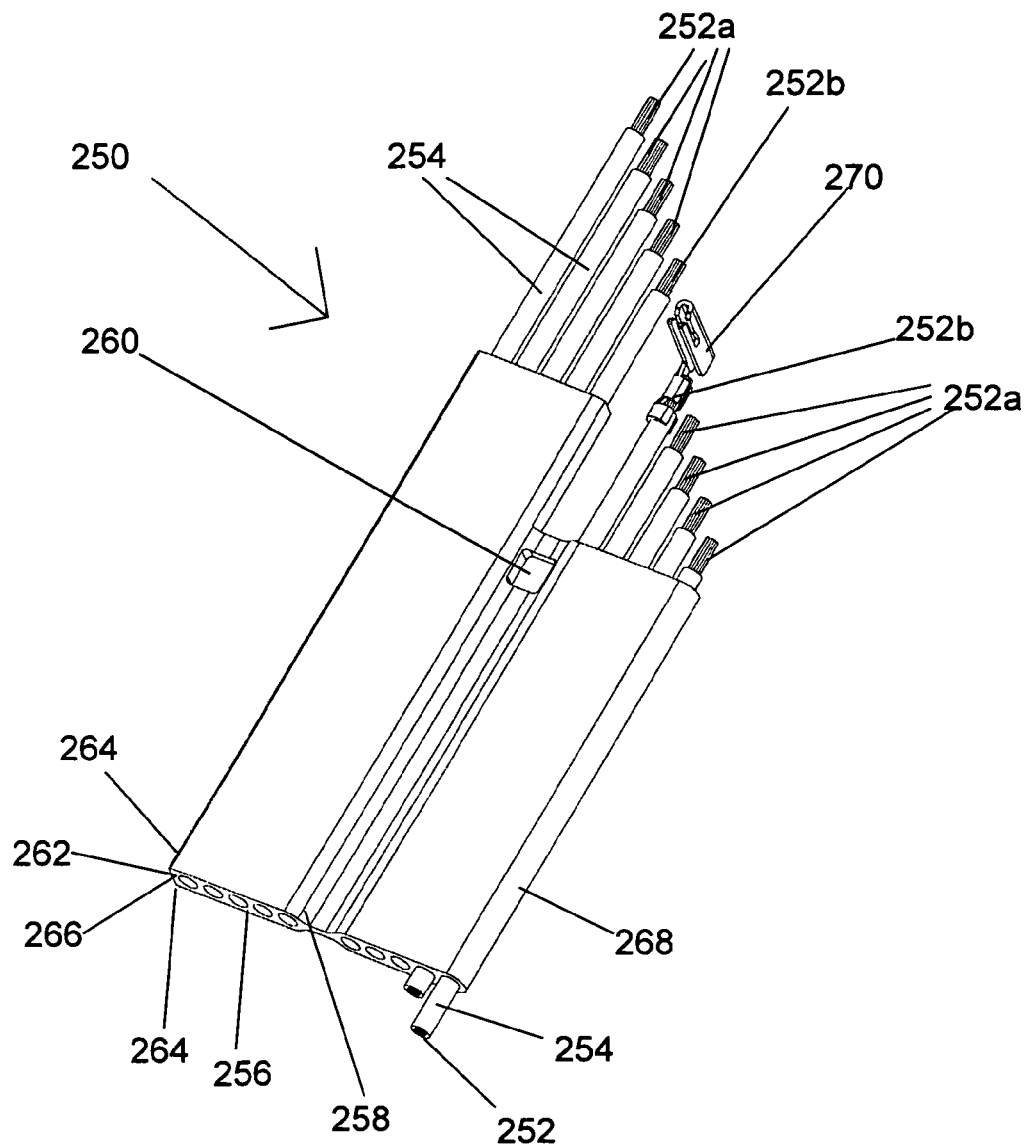
FIG. 4 is a perspective view of one embodiment of a whip cable in accordance with the present invention.
Figure 12:
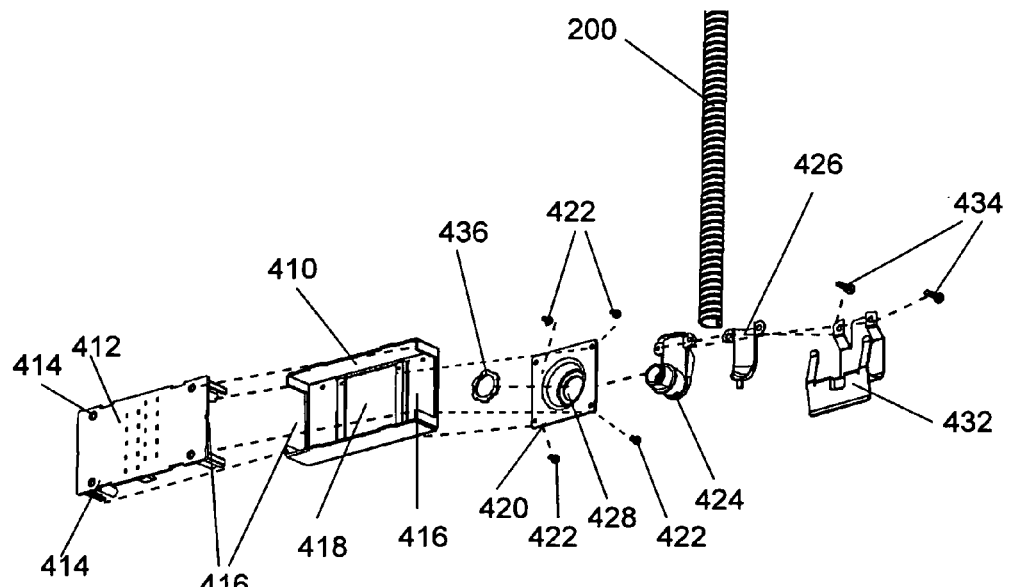
FIG. 12 is a rear exploded perspective view of the splitter of FIG. 10.

In addition to or instead of the whip cable 200, the system in accordance with the present invention may include a flexible whip cable 250, shown in FIG. 4, having up to ten conductors to carry high-voltage power between a power distribution module, such as power distribution module 106 in FIG. 1, and other modular system components, such as a splitter 400 (FIGS. 2-3) to provide power for computer equipment, electrical lighting, office machines, etc. at one or more workstations. It is particularly desirable to use a section of ribbon cable 250 in locations where a whip cable 200 will not fit, such as where the cable must pass through a narrow space between a desk or table top and a wall or vertical panel behind the desk or table, typically no more than about one half of an inch wide. This situation may arise, for example, if a splitter 400 (FIGS. 2-3) is positioned below a desk or table top and a power core 600 is positioned above the desk or table top.

In accordance with the present invention, a ribbon cable 250 is provided that includes up to ten individual conductors to provide electrical continuity for a power line passing behind a desk or table top or through other confined spaces. Preferably, the ribbon cable 250 comprises a single layer of 10 conductors. Alternatively, it may comprise two or more layers with multiple conductors in each layer (not shown). As shown in FIG. 4, the ribbon cable 250 comprises 10 multi-strand wires 252 within insulating sheaths 254. Examples of suitable wires include THHN #10 AWG or 10 THHN #12 AWG multi-strand wires. The insulated multi-strand wires 252 are encased within outer jacket 256, which has two groups of five wires, separated by a channel 258 having a thickness less than that of the adjoining portions of the cable with the wires. Channel 258 may include one or more perforations 260 to facilitate mounting of connectors as described below. Preferably the ribbon cable includes indicia for identifying the individual conductors. For example, one side edge 262 of ribbon cable 250 has corners 264 and a substantially flat wall 266. A second side edge 268 of ribbon cable 250 has a rounded profile, as seen in FIGS. 4, 8, and 9. Thus each wire is easily identifiable by its position relative to the side edges 262 and 268 and the central channel 258. For example, the wire closest to the flat edge may be designated as conductor number 1, with the wires numbered sequentially across the ribbon cable and the wire adjacent the rounded edge designated as conductor number 10. In this numbering system, the wires designated 5 and 6 adjacent to channel 258 are preferably used as grounding conductors, and the wires designated 1 through 4 and 7 through 10, positioned farthest from the channel 258, are preferably used as phased or neutral carriers to provide for safe connections between system components, as described below.

It is possible that an installation of the system of the present invention will include multiple segments of ribbon cables, and the wires in different segments will have the same designations, easily maintained by matching the edges of the ribbon cable. Due to the design of the ribbon cable, each wire is easily identifiable by its position in the ribbon cable and, therefore, the wires need not be color coded for identification. It may be preferable to use wires with a single color of insulation to reduce manufacturing costs.

Ribbon cable 250 can be manufactured by extruding a suitable material, such as PVC, to form an outer jacket 256 around ten insulated multi-strand conductors 252, with each insulated conductor 252 enclosed in an electrically insulating strand sheath 254. The conductors may be standard commercially available conductors, preferably #12 AWG. The ribbon cable also can be manufactured by insert molding lengths of insulated multi-stranded conductors suspended in a tool cavity that allows for the jacket to be molded around the wires.

To use ribbon cable 250 within a system in accordance with the present invention, a desired length of ribbon cable is measured and cut. Alternatively, the cable 250 may be provided in sections of any length to facilitate installation within the available space and re-arrangement of work stations. The end portion of the cable jacket 256 is stripped away, exposing the individual insulation 254 of the multi-strand wires 252. Then, the end portions of the individual wire insulation sheaths 254 are stripped away from the individual wires 252 to expose the copper ends of the multi-strand wires. Each exposed wire end may be provided with a ribbon angle contact 270, shown in FIG. 4, or another suitable contact. The ribbon angle contact 270 is crimped onto the wire 252 and, possibly also its insulation sheath 254. The contacts are then assembled inside a connector, splitter, or power core, as described below. Sections of ribbon cable may be used between and within other system components.

As discussed and shown herein, whip cables 200 and 250 terminate in male connectors, and the system components to which the whip cables are connected include female connections. Alternatively, the whip cables could terminate in female connectors and the other system components could include male connections. Preferably, the gender of all whip cable connectors and the gender of all other system component connections are consistent to simplify the system and facilitate interchangeability of components.

Cable Carrier

Referring to FIGS. 2-3 and 5-7, the present invention also comprises cable carrier sections 300 that can be connected to form a cable carrier of any desired length. Each carrier section 300 is shaped to partially enclose a whip cable, such as whip cable 200, with an exterior wall 302 having an approximately oval or C-shaped cross section and a slot 304 extending lengthwise through the exterior wall in a direction perpendicular to the C-shaped cross section (FIG. 6). Retaining ribs 306 extend from wall 302 inwards and function to retain whip cable 200 and separate voice and data cables 308 within the carrier section. As shown in FIGS. 5-7, the upper end of each section includes pivot pins 310 extending inward along the long dimension of the cross section adjacent the upper end of each section, and openings 312 are positioned on the long diameter adjacent the lower end of each section 300. The pins 310 of the uppermost cable carrier section 300 engage receiving holes in the lateral walls of the connector, allowing the cable carrier to hang in position. Each additional cable carrier section 300 is engage-able in the openings 312 of the next higher section. Cable carrier sections 300 can be joined together by positioning pivot pins 310 from one section in holes 312 of an adjacent section. The pins allow the sections to pivot relative to one another, thus providing sufficient flexibility in the assembled cable carrier to position the carrier where it is desired.

If sections of ribbon cable 250 are used in places where they are exposed, such as along floors, walls, or panels, it may be desirable to enclose the ribbon cable in a ribbon cable carrier. Referring to FIGS. 8-9, the present invention also comprises whip cable carrier sections 350 that can be connected to form a cable carrier of any desired length. Each carrier section 350 is shaped to partially enclose a ribbon cable, such as ribbon cable 250 in FIG. 8, with two front panels 352, a rear panel 354, and side panels 356 connecting front panels 352 to rear panel 354. Opening 358 between front panels 352 allows insertion and removal of cables, such as a ribbon cable 250 and separate voice and data cables 362 (FIG. 9). Retention ribs 360 extend from front panels 352 toward the interior of the carrier section 350 toward ribbon cable 250 and center the ribbon cable 250 within the cable carrier. Also, voice and/or data cables 362 can be tucked between ribs 360 and side panels 356 within each cable carrier section. At one end of each section 350, a pivot/connection pin 364 extends inward from an extension tab 366 on each side panel 356 and is engage-able with corresponding holes in the housing of a connector, splitter, or other system component. At the other end of each section, side panels 356 include holes 368 sized and shaped to accommodate pivot/connection pins 364 from an adjacent carrier section 350.

Cable carrier sections 350 can be joined together by positioning pins 364 from one section in holes 368 of an adjacent section. The pins allow the sections to pivot relative to one another, thus providing sufficient flexibility in the assembled cable carrier to position the carrier where it is desired.

Optionally, one or more assembled sections of carrier 300 or 350 can be mounted to a surface, such as a wall or desk top. Preferably, they are mounted with double-sided sticky tape, allowing easy installation and removal of the cable carrier. Alternatively they could be mounted by another means known in the art, such as with brackets.

The cable carrier sections 300 or 350 can be formed by molding or extruding a polymeric material. The material should be flexible enough to allow easy insertion and removal of cables, joining of sections to each other, and flexing and twisting to conform to the space provided in an installation.

Splitter

A Splitter 400 in accordance with the present invention can be understood with reference to FIGS. 10-14. Female connecting extensions 402 extend outward from splitter 400 and are preferably mate-able with male connectors, such as the male connectors 404 at the ends of whip cables 200. Female connecting extensions 402 are integral with splitter 400 but function in a similar manner to the female modular 10-pin connectors described in U.S. Pat. No. 5,727,963 and include holding tabs 406 engage-able by lever arms 408 on the male connectors 404, as described in U.S. Pat. No. 5,727,963. Alternatively, the female connecting extensions 402 could be compatible with other male connectors. Splitter 400 functions to split one high-voltage line having up to 10 connectors into two serial high-voltage lines, each with up to 10 connectors.

Figure 14:
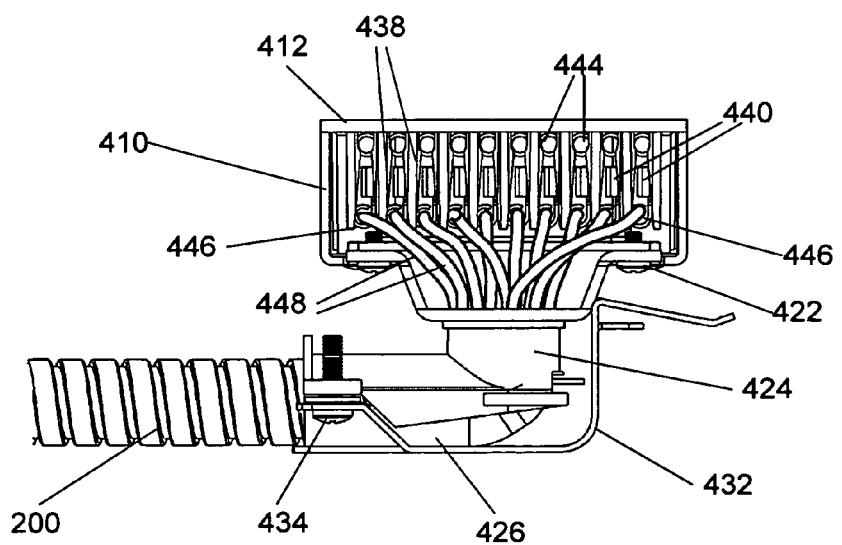
FIG. 14 is a right side view of the splitter of FIG. 10 with the right female connecting extension removed.
Figure 13:
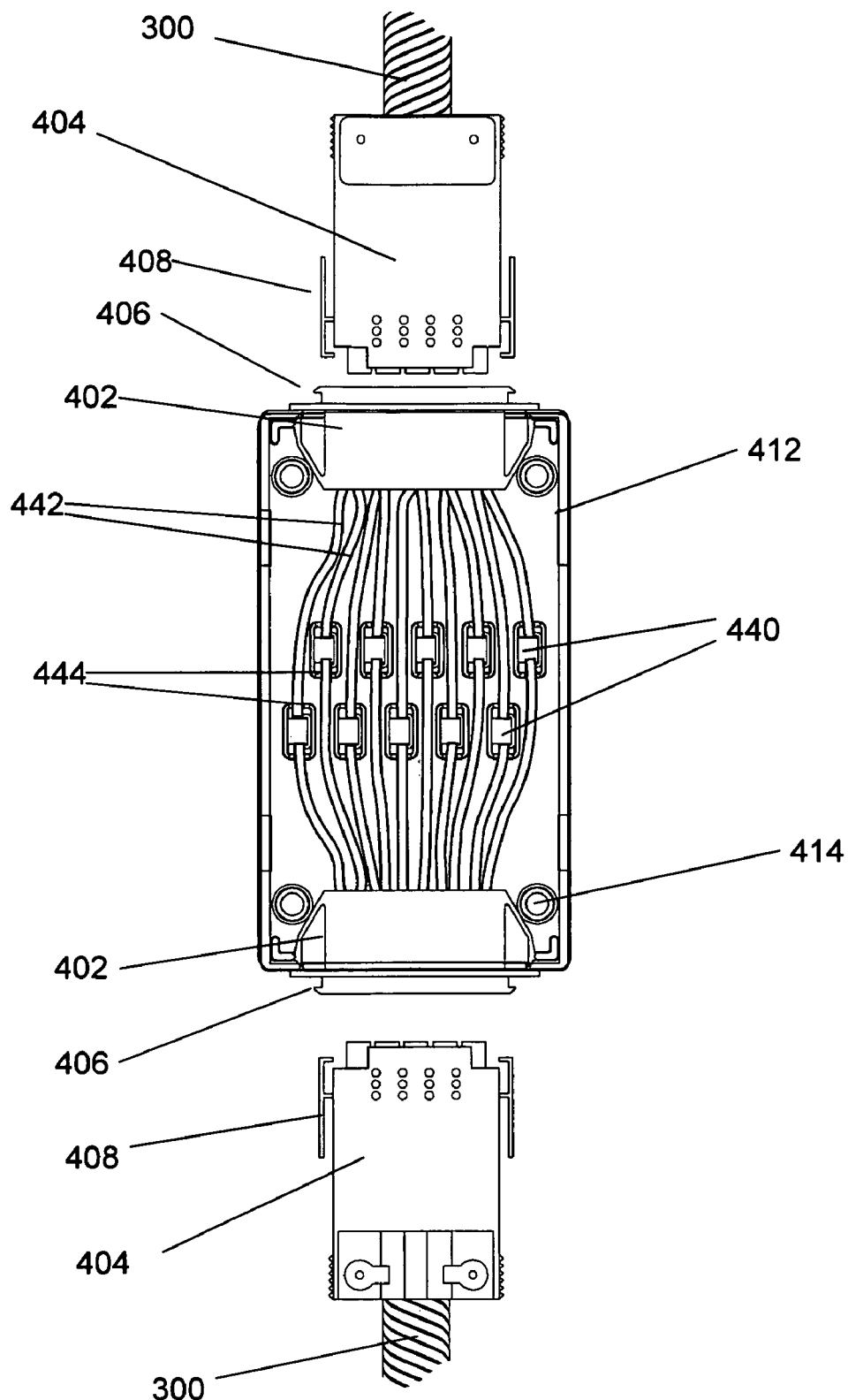
FIG. 13 is a partial cutaway view of the splitter of FIG. 10.
Figure 15:
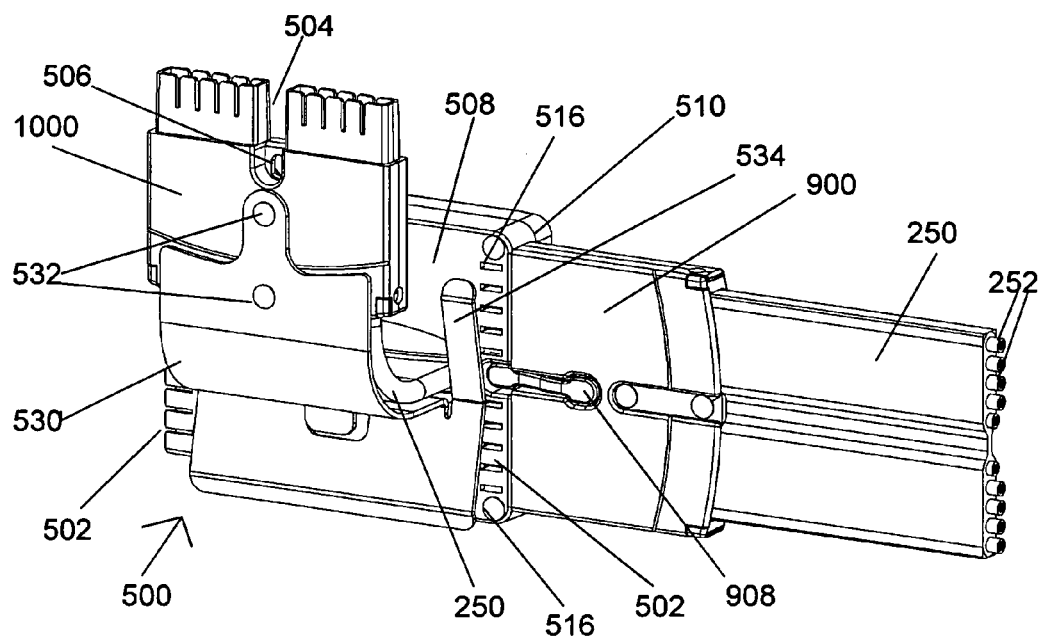
FIG. 15 is a front perspective view of another splitter in accordance with the present invention.
Figure 17:
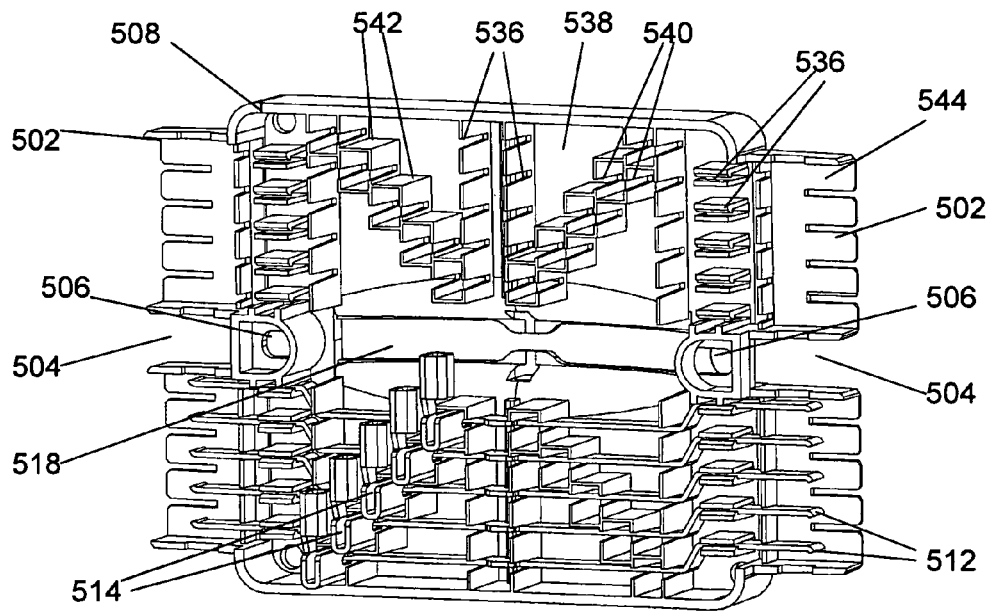
FIG. 17 is a rear perspective view of the front housing of the splitter of FIG. 15.
Figure 16:
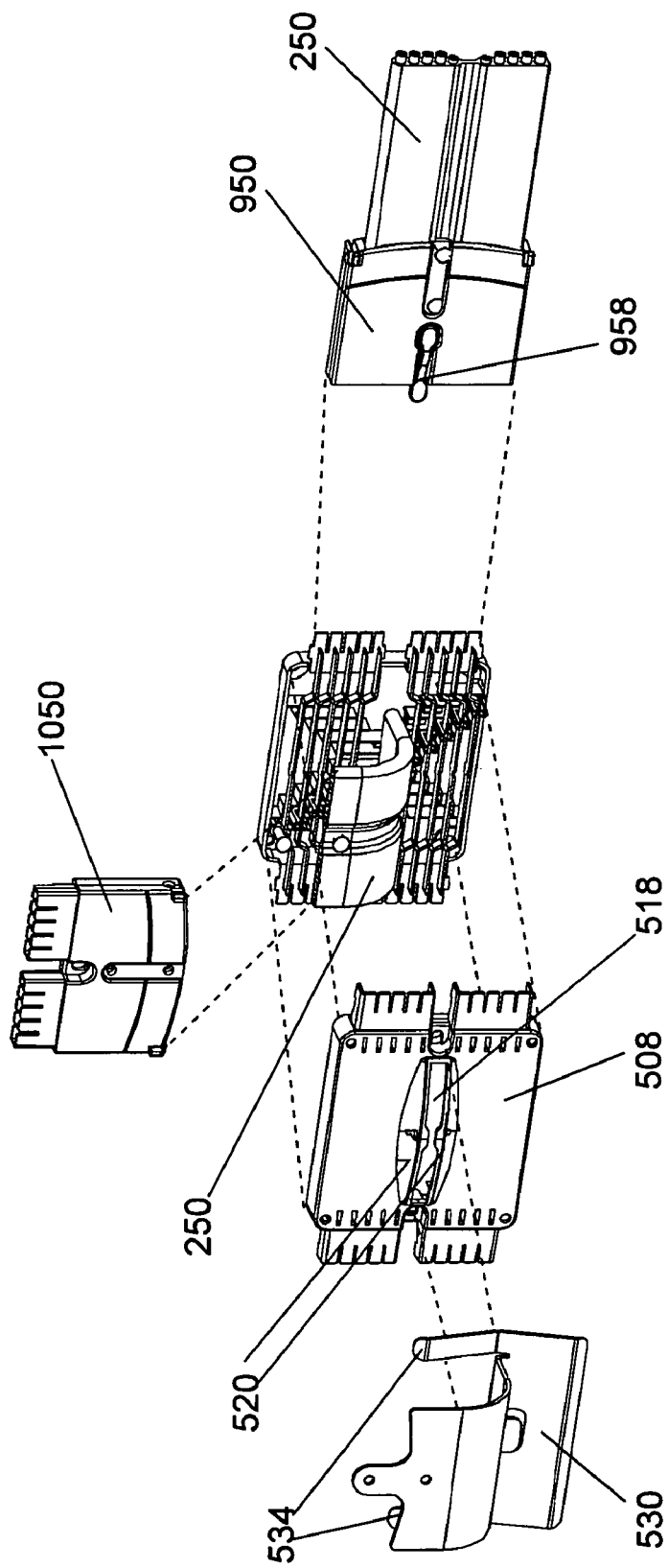
FIG. 16 is a front exploded perspective view of the splitter of FIG. 15.
Figure 18:
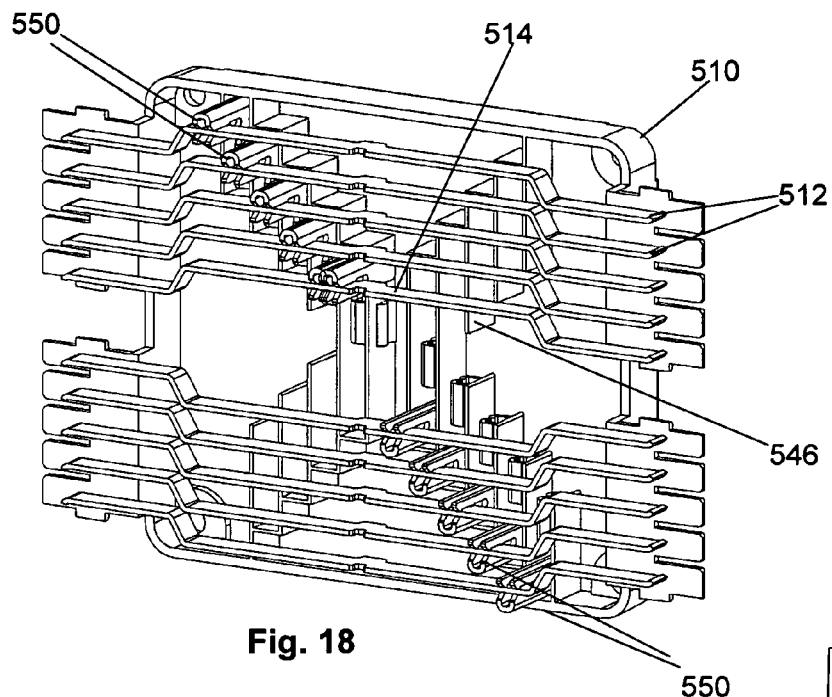
FIG. 18 is a front perspective view of the rear splitter housing of the splitter of FIG. 15.
Figure 19:
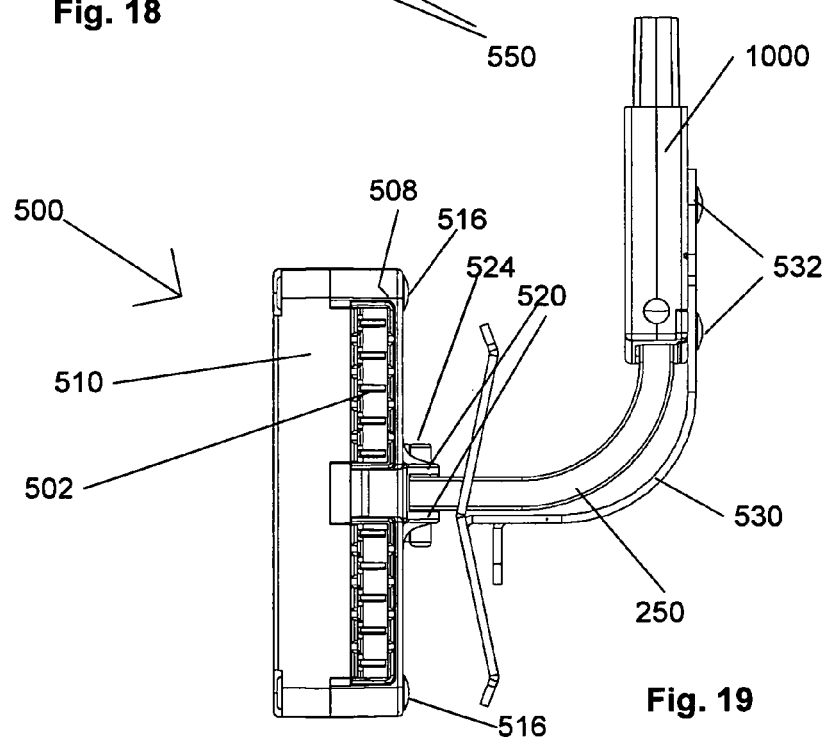
FIG. 19 is a side elevation view of the splitter of FIG. 15.
Figure 22:
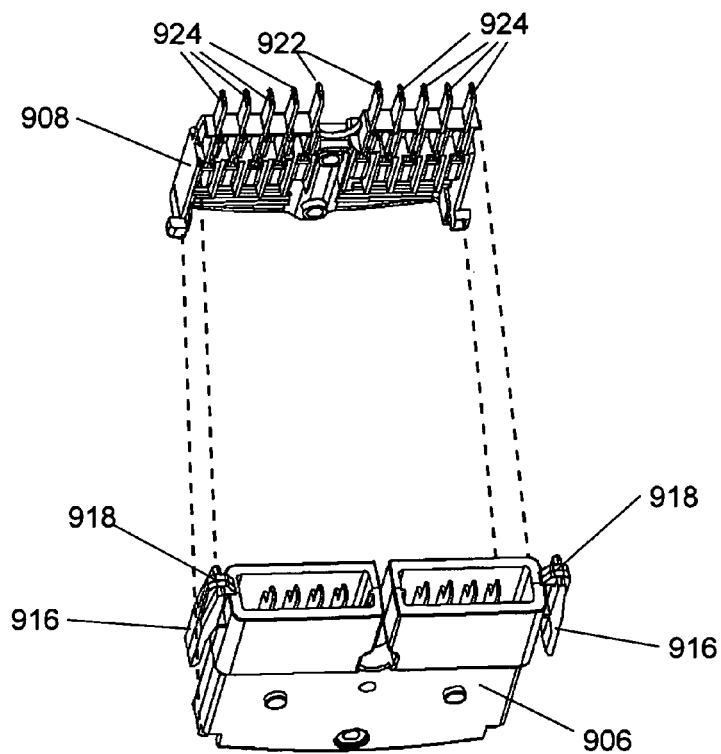
FIG. 22 is another front exploded perspective view of the male connector of FIG. 20.
Figure 23:
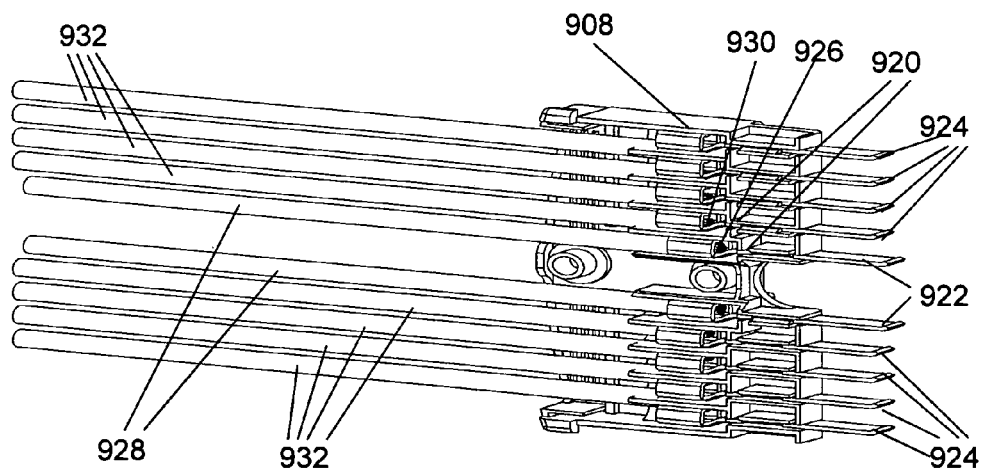
FIG. 23 is a front perspective view of the chassis and wires from the whip cable of FIG. 20.

Splitter 400 comprises a splitter cover 410 and a splitter base 412 that enclose wires and contacts, as discussed below with reference to FIGS. 13 and 14. Splitter cover 410 is joined to splitter base by suitable fasteners, such as rivets 414, with side openings 416 between the cover 410 and the base 412 that accommodate female connecting extensions 402. Splitter cover 410 also includes an opening 418 against the edges of which elbow panel 420 is mounted with suitable fasteners, such as screws 422. Splitter elbow 424 and elbow clamp 426 extend from the interior of the splitter through opening 428 and secure the end of whip cable portion 200. Bracket 432 is mounted to elbow clamp 426 and elbow 424, such as with screws 434, and functions to stabilize the end of the whip cable portion 200. Splitter elbow 424 is also secured inside elbow panel 420 with splitter conduit nut 436.

Splitter base 412 includes spacers 438 that separate and retain contacts 440. Wires 442 extend between female connecting extensions 402, with contacts 440 engaging wire sections 444 that have been stripped of insulation. Spades 446 extend away from splitter base 412 and provide electrical continuity between wires 444 and branch wires 448 extending from whip cable section 200.

Preferably splitter base 412 is formed from V-rated plastic, such as by injection molding. Splitter cover 410 is preferably formed from sheet metal to provide a thin profile for the splitter 400. Preferably, the contacts 440 and spades 446 are formed from brass.

Splitter 400 can be assembled by stripping insulation off of wire sections 444 and securing contacts 440 about the stripped wire sections. The ends of wires 442 are secured to contacts in female connecting extensions 402, and the contacts 440 are friction fitted between the spacers 438 in splitter base 412. Insulation is also stripped off of the wires at the end of a whip cable, and the cable end is positioned between elbow 424 and elbow clamp 426 and passed through the opening in elbow panel 420 and splitter conduit nut 436. Spades 446 are secured onto the stripped wire ends and inserted into contacts 440. Conduit nut 436 is tightened about the end of elbow 424 to secure the elbow to elbow panel 420, and elbow panel 420 is screwed onto splitter cover 410. Splitter cover is riveted onto splitter base about female connecting extensions 402, and bracket 432 is screwed onto elbow 424 and elbow clamp 426.

If ribbon cables are used in place of whip cables, an alternative Splitter 500 in accordance with the present invention can be understood with reference to FIGS. 15-19. Female connecting extensions 502 extend outward from splitter 500 and are mateable with the male connectors, such as male connector 900 at the end of ribbon cable 250. Female connecting extensions 502 are integral with splitter 500 but function in a similar manner to female connectors 1000, described below, and include recesses 504 and openings 506 to accommodate the release latches 908 of male connectors 900. Alternatively, the female connecting extension could be compatible with other male connectors, such as the whip cable connectors described in U.S. Pat. No. 5,727,963. Splitter 500 provides two side power branches of power conductors, such as bent ribbon cable 250. Splitter 500 comprises a front splitter housing 508 and a rear splitter housing 510 that enclose the end of ribbon cable 250, bus bars 512, and angle contacts 514, with rivets 516 holding the housings around the internal structure.

Bent ribbon cable 250 extends from the inside of splitter 500 through opening 518 in splitter front housing 508 and terminates at female connector 900. Flanges 520 extend outward from front splitter housing 508, spaced apart to allow bent ribbon cable 250 to pass through opening 518 between the flanges 520. Dowel pin 524 extends through holes in flanges 520 and a hole in channel 258 of bent ribbon cable 250 to stabilize and provide strain relief for the bent ribbon cable 250 relative to the front splitter housing 508. Bracket 530 supports a short, bent piece of ribbon cable 250 and is secured to ribbon cable 250 and female connector 1050, such as with rivets 532. Extensions 534 on the vertical section of bracket 530 and adjacent the sides of the ribbon cable provide for attachment of a cable carrier section 350.

The ten bus bars 512 are retained between front and rear splitter housings 508 and 510. The interior of front housing 508 includes ten bus bar retainers 536 extending inward from a wall 538 of the front housing and indentations 540 in projections 542 also extending inward from wall 538. The ten bus bars 512 are held in place by retainers 536 and positioned between female contact extensions 544 to allow electrical contact with the contacts of a male connector 950. The bus bars 512 are preferably formed in an approximate "U" shape to provide the desired spacing between the ends for connecting with the contacts of male connectors 950 yet provide space for bent ribbon cable 250 to pass through opening 518 in front splitter housing 508.

The interior of rear splitter housing 510 is provided with projecting ribs 546 arranged to retain the portions of angle contacts 514 that are crimped about or otherwise engage the ends of the wires 252 of bent ribbon cable 250. Angle contacts 514 also include split ends 550 that engage bus bars 512 securely, with the split ends 550 of the angle contacts 514 also held in place by friction fit into projections 542 extending inward from front splitter housing 508. The angle contacts 514 each form a substantially right-angle electrical connection between each bus bar and the respective wire 252 of the bent ribbon cable 250.

Alternatively, a power core, such as power core 600 described below, or other component can be connected to Splitter 500 instead of side branch ribbon cable 250.

Front and back splitter housings 508 and 510 are preferably formed from V-rated thermoplastic, such as by injection molding. The angle contacts are preferably formed from brass by a four slide bending process.

To assemble splitter 500, insulation is stripped off the ends of the wires in bent ribbon cable 250. Angle contacts 514 are crimped about the wire ends. Bus bars 512 are mounted between bus bar retainers 536 of front splitter housing 508 and between female contact extensions 544. The angle contacts 514 are inserted between ribs 546 of rear splitter housing 510 and engaged with bus bars 512. The front and rear housings are riveted together, and bracket 530 is secured to front splitter housing 508 and bent ribbon cable 250 with dowel pin 524.

Male Connectors

Referring to FIGS. 20-23, a male connector 900 is positioned at the end of branch whip cable 200 extending from the splitter 400. Connector 900 includes two shell portions 902 and 904 that enclose the end of whip cable 200, male connector housing 906, and connector chassis 908. The shell portions 902 and 904 include openings 910 that are engage-able with pivot pins 310 of a cable carrier section 300 when the shell portions are mated. Each shell portion also includes an inward projection 912 that engages a groove in helically wound cable armor. Shell portions 902 and 904 are secured to each other with rivets 914. Male connector housing 906 includes opposing latch levers 916 disposed at the sides of the housing. The latch levers 916 terminate in latches 918 that are engage-able with a female connector housing 1004. Chassis 908 includes retainers 920 for contacts 922 and 924. Male connector housing 906 and chassis 908 are riveted together about contacts 922 and 924. Contacts 922 are preferably crimped or otherwise fastened to the exposed wire strands 926 at the ends of insulated ground wires 928, and contacts 924 are preferably crimped or otherwise fastened to the exposed wire strands 930 at the ends of current carrying wires 932. Contacts 922 are longer than contacts 924 and therefore extend outward somewhat more from the end of chassis 908 than contacts 924.

Male connector 900 can be assembled by first crimping or otherwise securing the contacts 922 and 924 to exposed wire strands 926 and 930. Next, the contacts 922 and 924 are press fitted into chassis 908. Male connector housing 906 is placed over the ends of the wire strands 926 and 930, contacts 922 and 924, and chassis 908, and secured to chassis 908 with rivets 934. Finally, shell portions 902 and 904 are placed about male connector housing 906, chassis 908, and the armor of whip cable 200, and fastened to each other with rivets 914.

Figure 24:
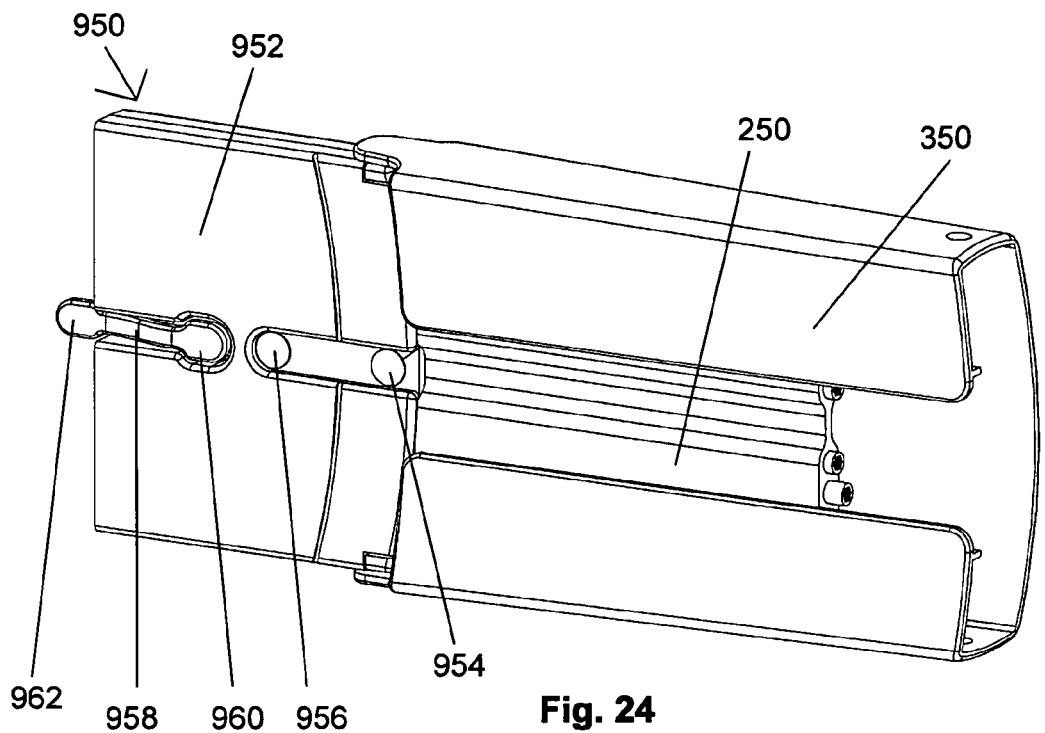
FIG. 24 is a front perspective view of another male connector in accordance with the present invention.
Figure 25:
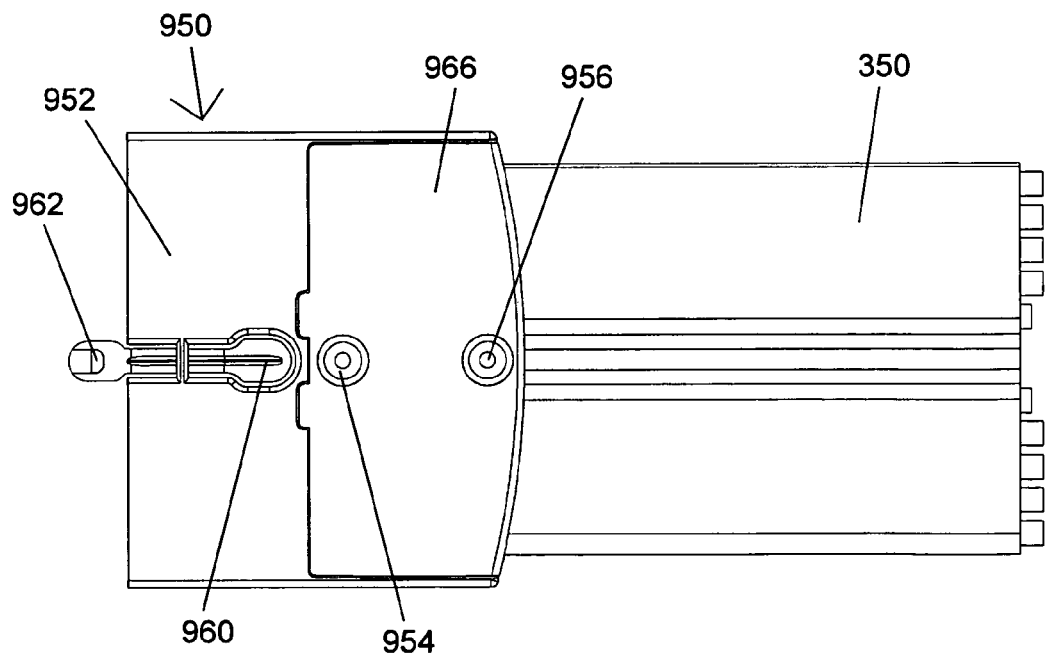
FIG. 25 is a rear elevation view of the male connector of FIG. 24.
Figure 26:
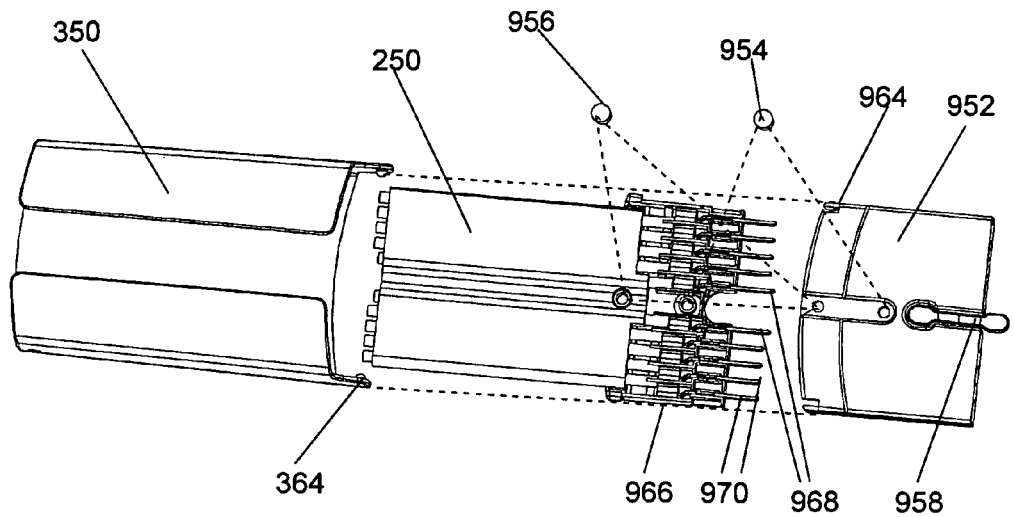
FIG. 26 is a front exploded perspective view of the male connector of FIG. 24.

It may desirable to use ribbon cable, such as ribbon cable 250, instead of whip cable 200 in some installations. As shown in FIGS. 24-26, male connector 950 is mounted to one end of a section of ribbon cable 250. Male connector 950 includes a male connector housing 952, similar to housing 906 of male connector 900, and rivets 954 and 956. Male connector housing 952 includes a release latch 958, having a lever 960 and a pin 962 engage-able with an opening in a female connector, such as female connector 1050 in FIGS. 27-30 or a female extension of another system module, such as female extensions 502 of splitter 500 in FIGS. 15-19. The release latch 958 is preferably operable with one hand for making and breaking connections between the male connector 950 and a mating female connector. Male connector housing 952 also includes openings 964 that are mate-able with pins 364 of a ribbon cable carrier section 350.

Within the male connector housing 952, a male connector chassis 966 is mounted to the end of ribbon cable 250 with rivet 954. Male power contacts 968 are mounted, preferably by crimping, to the ends of each wire 252 and 254 of ribbon cable 250 to provide electrical contact between the wires of ribbon cable 250 and the power contacts and the wires within a female connector, as described below. Preferably, the outer eight wires 252a (FIG. 4) and contacts 970 are the phased (ungrounded) and neutral (grounded) conductors, and the two inside wires 252b (FIG. 4) and contacts 968 are the safety/equipment and isolated ground conductors. Preferably, the ground contacts 968 extend outward farther from the end of male connector 950 than the phased and neutral contacts 970, thereby ensuring (1) that the safety/equipment ground connections are made before the phased and neutral connections when male and female connectors are mated, and (2) that the phased and neutral connections are broken before the safety/equipment ground connections when the male and female connectors are separated from each other.

Male connector chassis 966 holds the male connector contacts 968 and 970 in place within male connector 950. Rivet 954 secures the male connector housing 952 to male connector chassis 966 and to the end of ribbon cable 250 via a hole 260 in channel 258 (FIG. 4), thereby providing strain relief by preventing ribbon cable 250 from being pulled away from male connector chassis 966 and male connector housing 952. Rivet 956 further secures male connector housing 952 to male connector chassis 966.

To mount a male connector 950 onto the end of a section of ribbon cable 250, the cable jacket 256 (FIG. 4) is stripped away, exposing the individually insulated wires. The insulation 254 (FIG. 4) is stripped away from the individual wires 252 (FIG. 4). Contacts 968 and 970 are crimped onto the exposed wires 252 and possibly also onto the insulation. Then, the connectors 968 are positioned within male connector chassis 966. Male connector housing 952 is placed about male connector chassis 966 and the end of ribbon cable 250, and the entire assembly is riveted together with rivets 954 and 956 that also provide strain relief for the ribbon cable 250. Cable carrier section 350 is mounted to male connector housing 952 by pins 364 inserted into openings 964 in male connector housing 252.

Male connector housing 900 or 952 and male connector chassis 908 or 966 are preferably formed from a V-0 rated thermoplastic material that is flame-retardant and meets UL standards for electrical equipment. The thermoplastic material may be injection molded. The male connector contacts 922, 924, 968, and 970 are preferably formed brass.

Female Connectors

The present invention includes a female connector, such as female connector 1000 that is mate-able with male connector 900. Alternatively or in addition, female connector 1050 is mate-able with male connector 950. Either female connector 1000 or female connector 1050 may be part of another system component, such as power core 600, or the female connector may be secured to the end of a section of ribbon cable, as shown in FIGS. 29-32.

Figure 27:
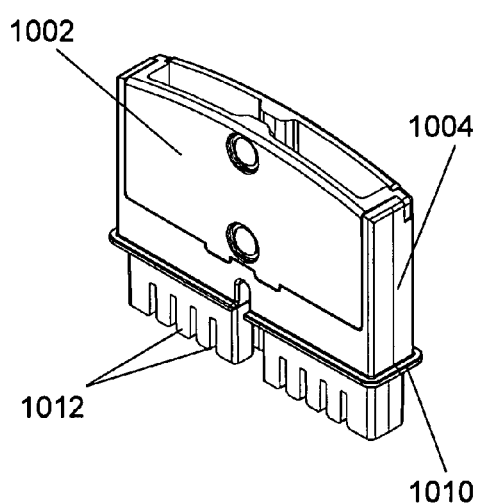
FIG. 27 is a rear perspective view of a female connector in accordance with the present invention and mate-able with the male connector of FIG. 20.
Figure 28:
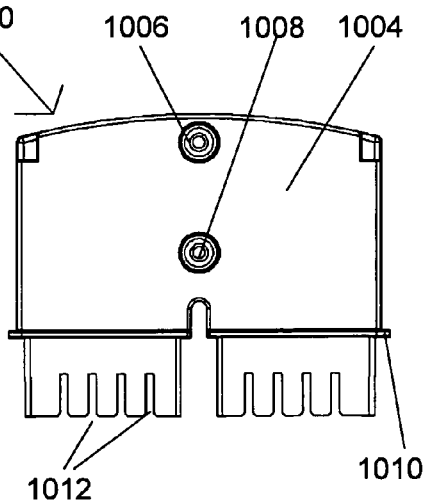
FIG. 28 is a front elevation view of the female connector of FIG. 27.
Figure 29:
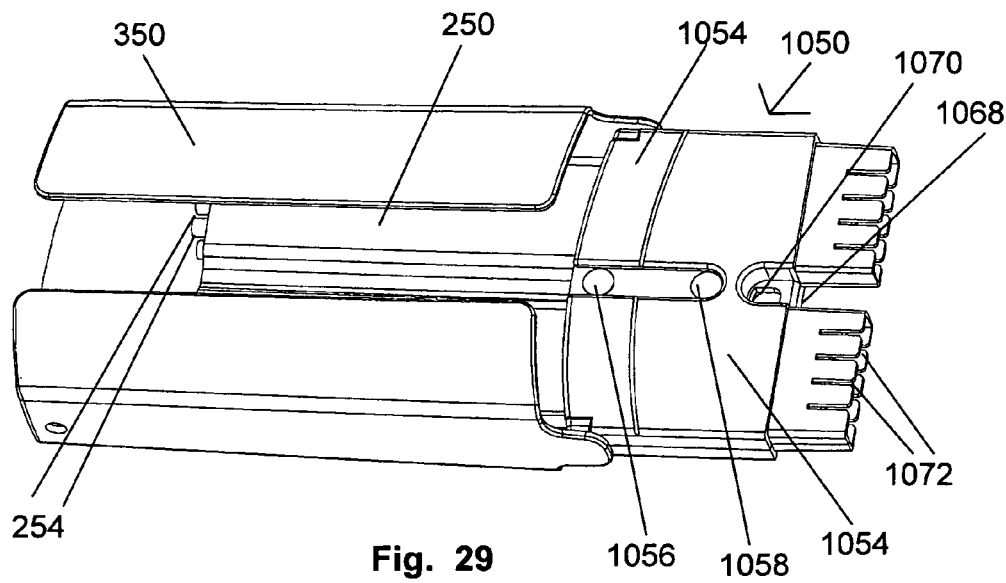
FIG. 29 is a front perspective view of another female connector in accordance with the present invention and mate-able with the male connector of FIG. 24.
Figure 30:
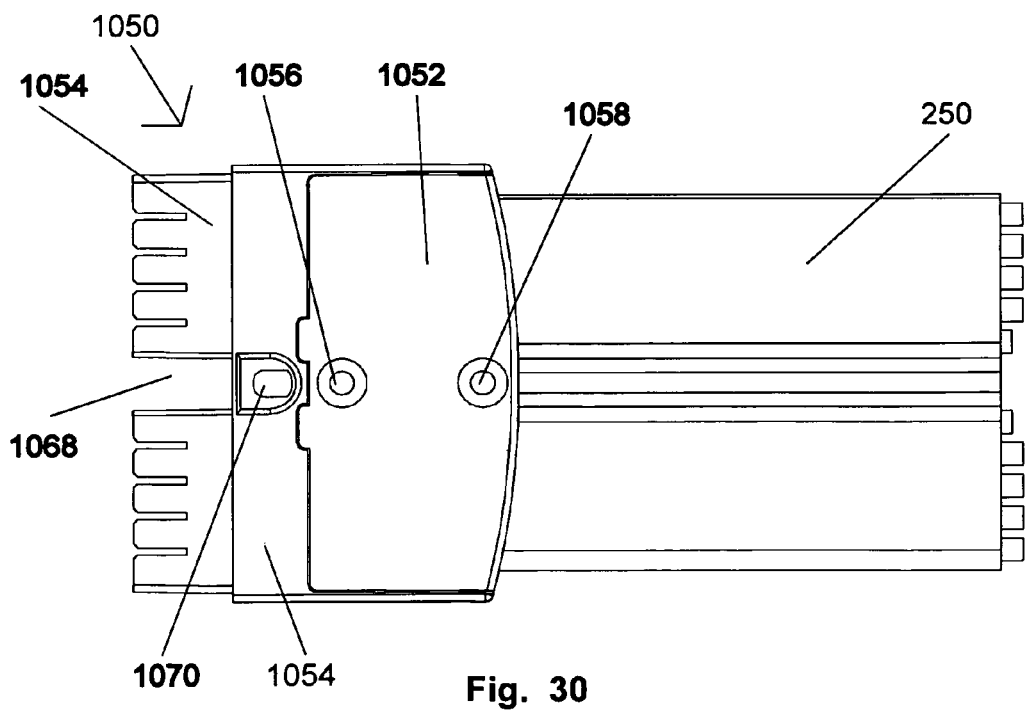
FIG. 30 is a rear elevation view of the female connector of FIG. 29.
Figure 31:
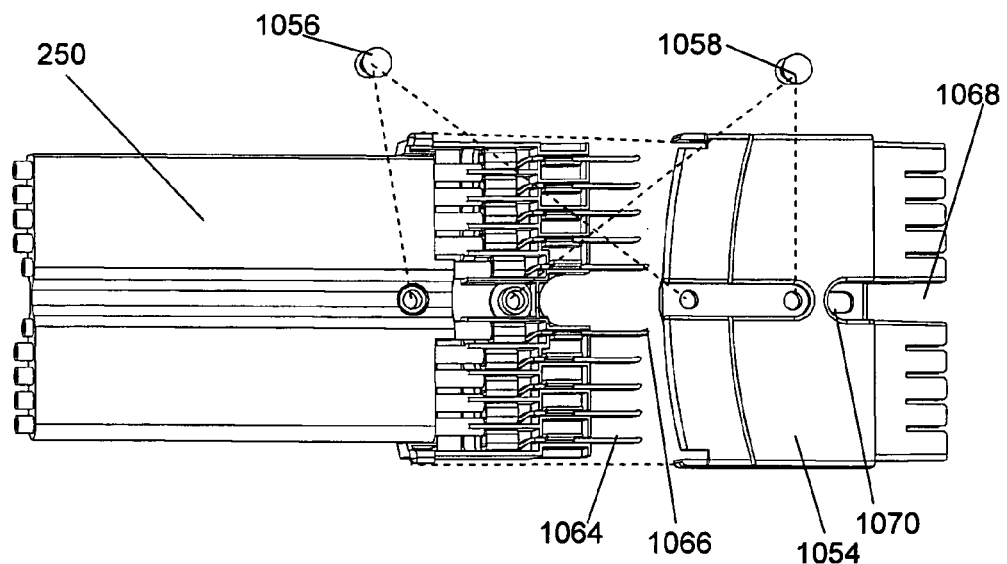
FIG. 31 is a front perspective exploded view of the female connector of FIG. 29.
Figure 32:
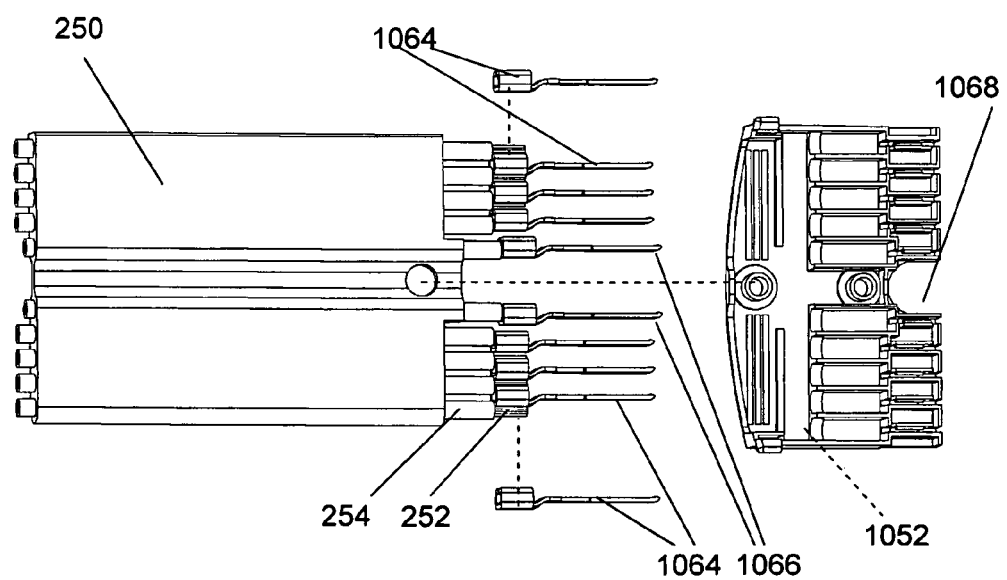
FIG. 32 is another front perspective exploded view of the female connector of FIG. 29.
Figure 36:
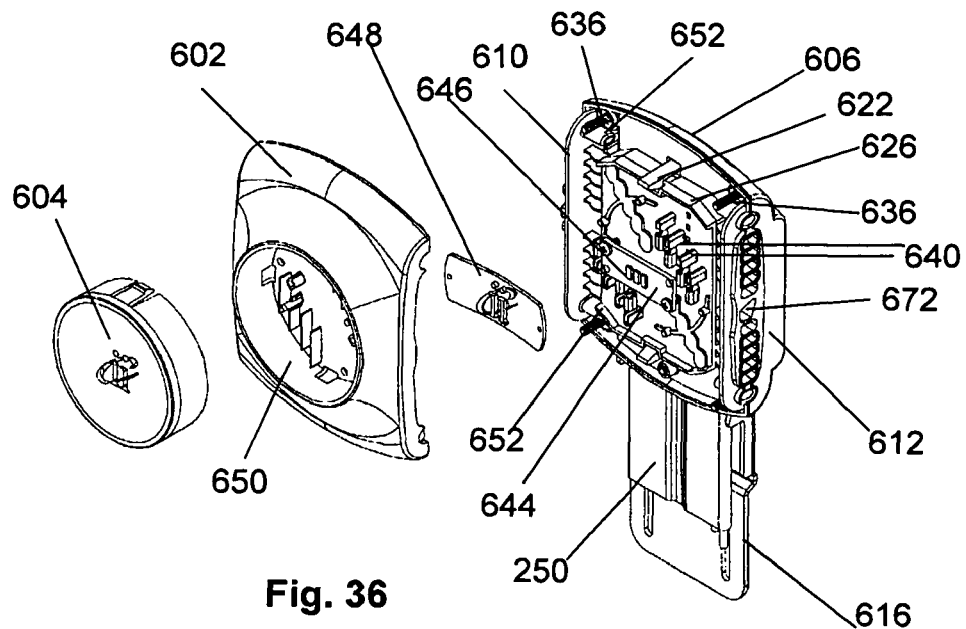
FIG. 36 is a front exploded perspective view of the power core of FIG. 33.
Figure 37:
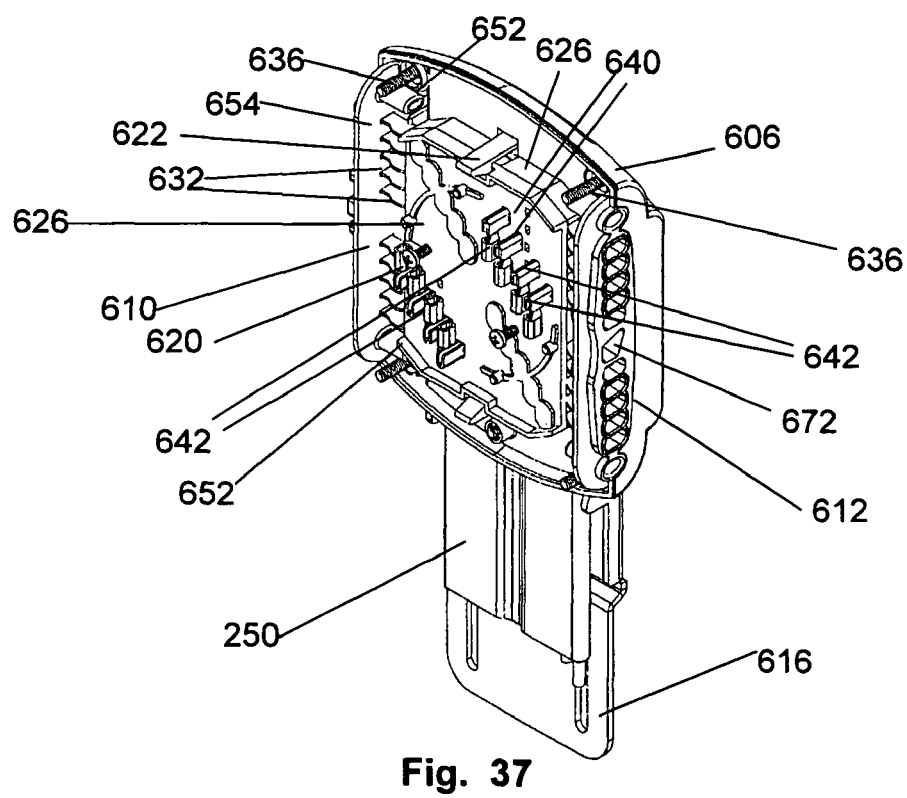
FIG. 37 is a front internal exploded perspective view of the power core of FIG. 33.
Figure 38:
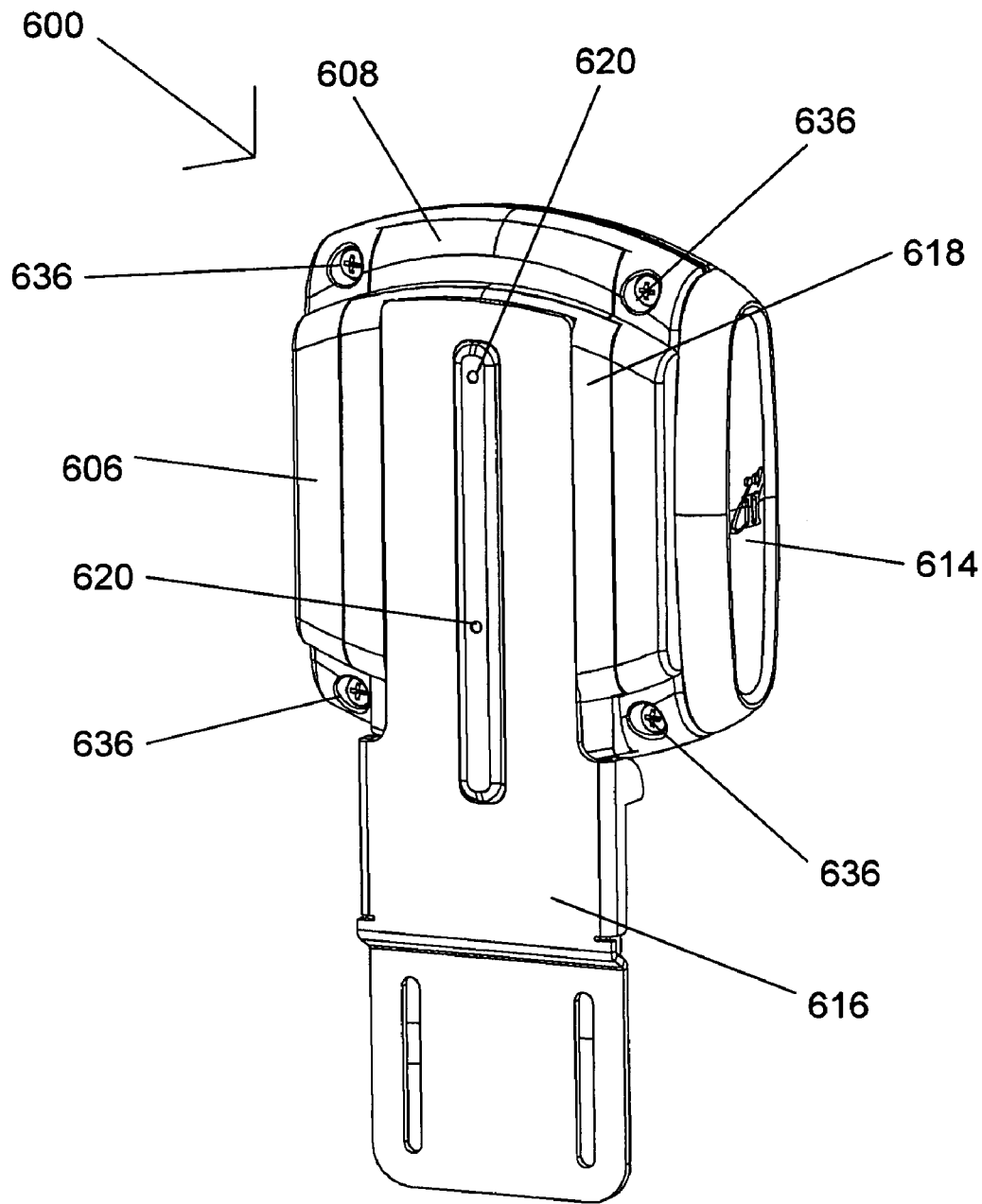
FIG. 38 is a rear perspective view of the power core of FIG. 33.
Figure 39:
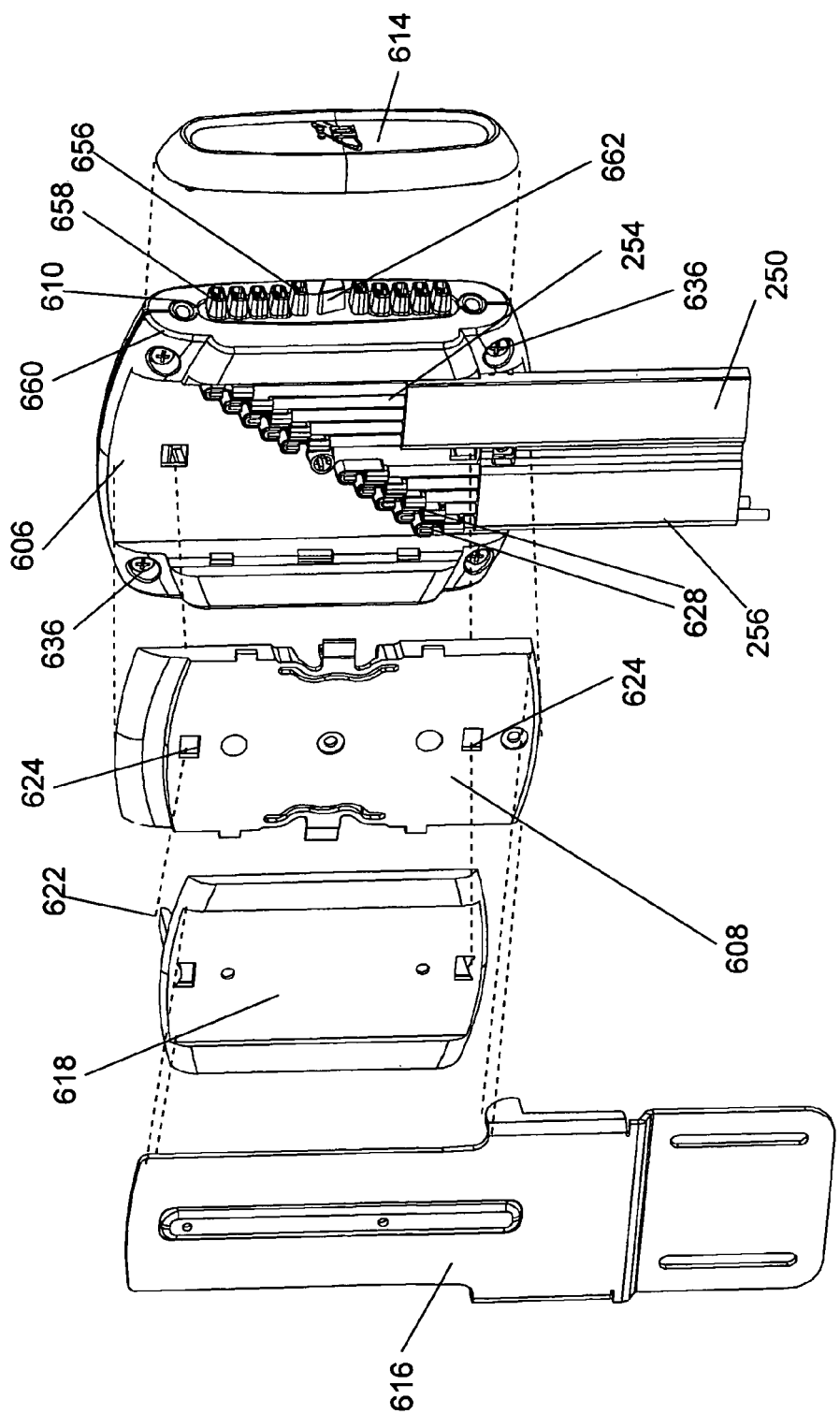
FIG. 39 is a rear exploded perspective view of the power core of FIG. 33.
Figure 40:
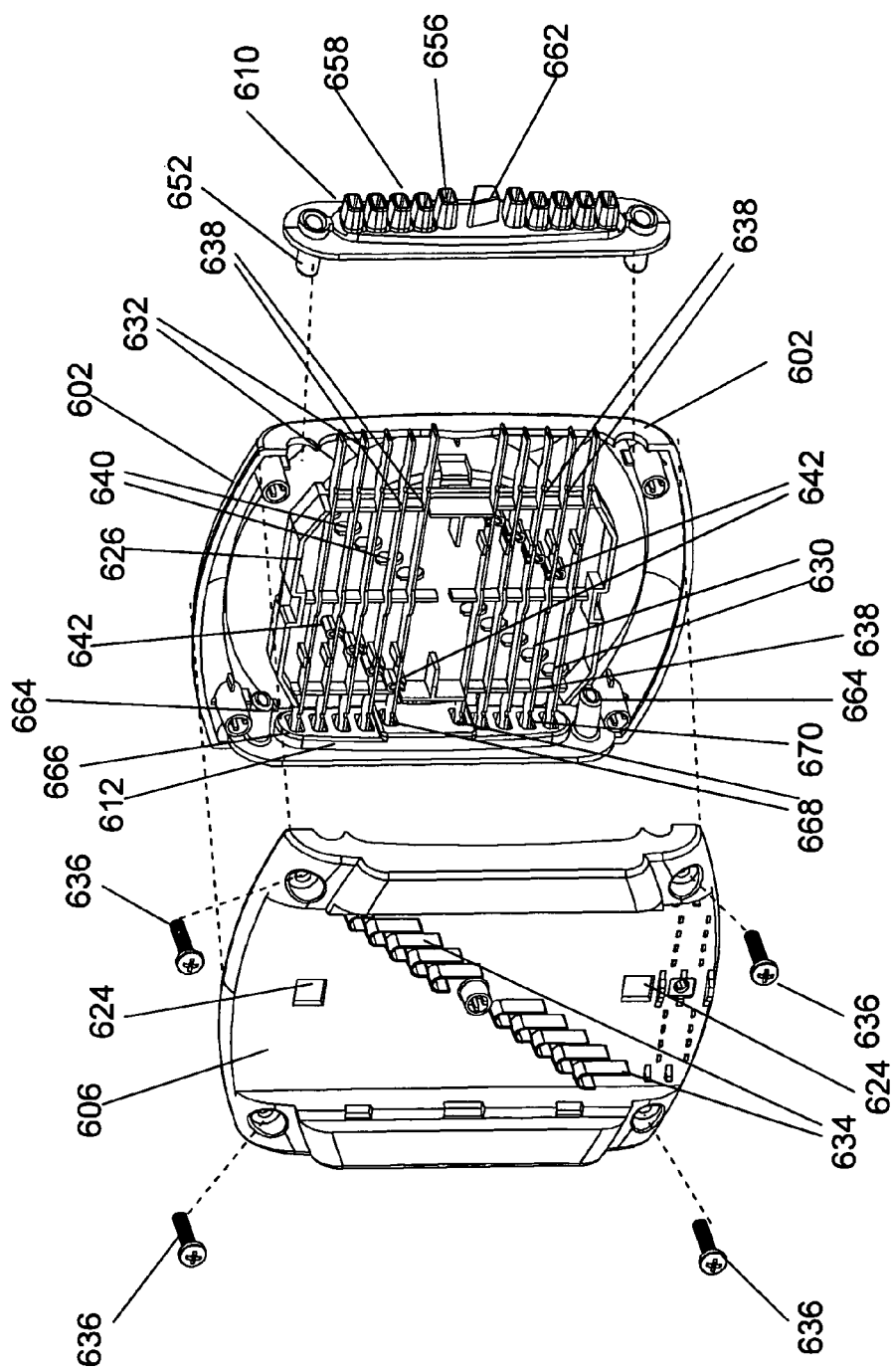
FIG. 40 is a rear internal exploded perspective view of the power core of FIG. 33.
Figure 41:
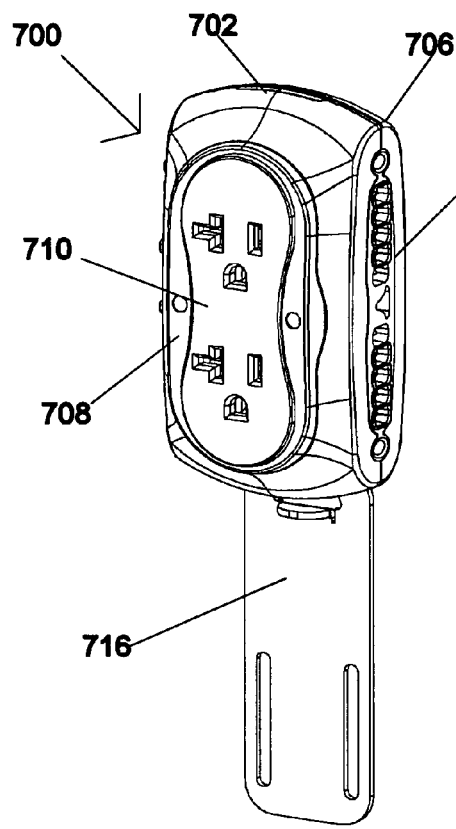
FIG. 41 is a front perspective view of a high-voltage power module in accordance with the present invention.
Figure 42:
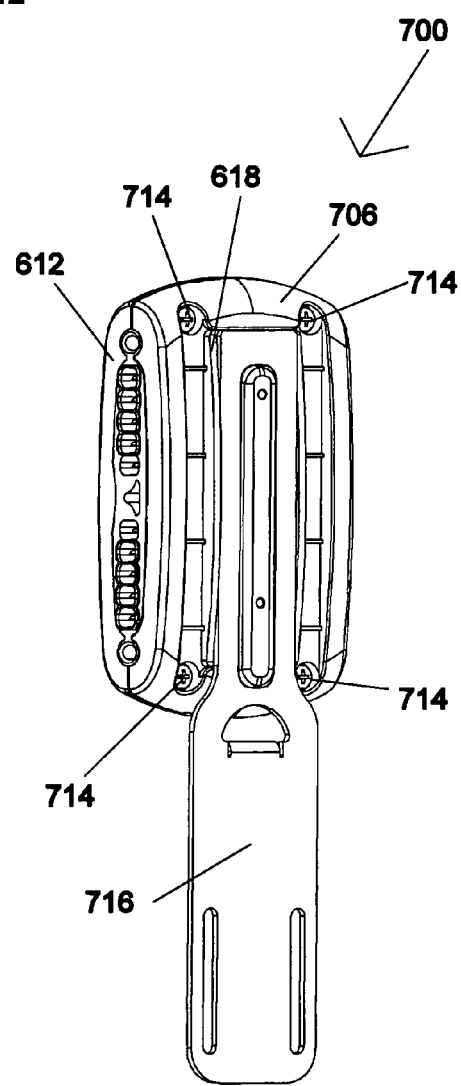
FIG. 42 is a rear perspective view of the high-voltage power module of FIG. 41.
Figure 43:
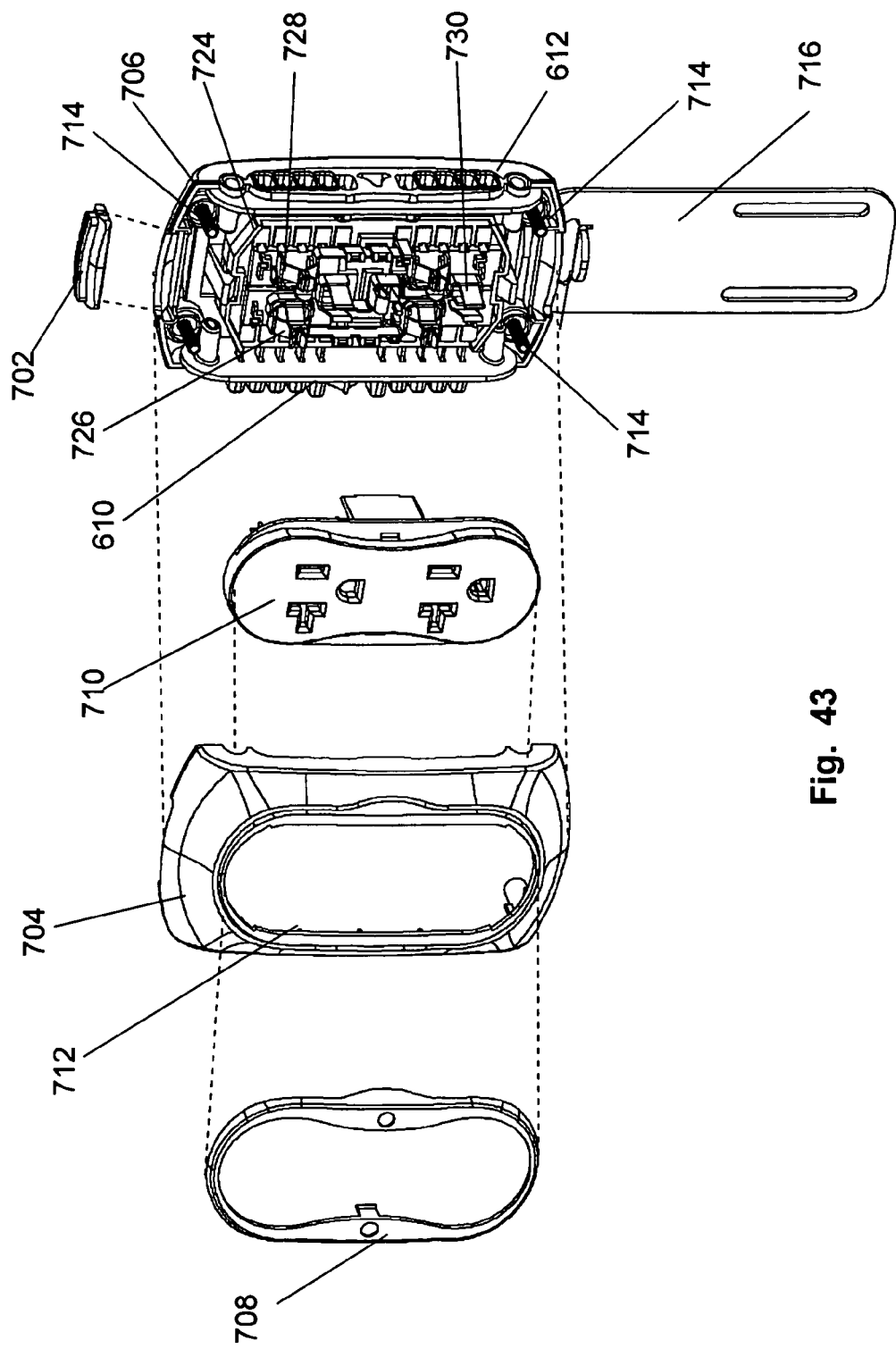
FIG. 43 is an exploded front perspective view of the high-voltage power module of FIG. 41.
Figure 44:
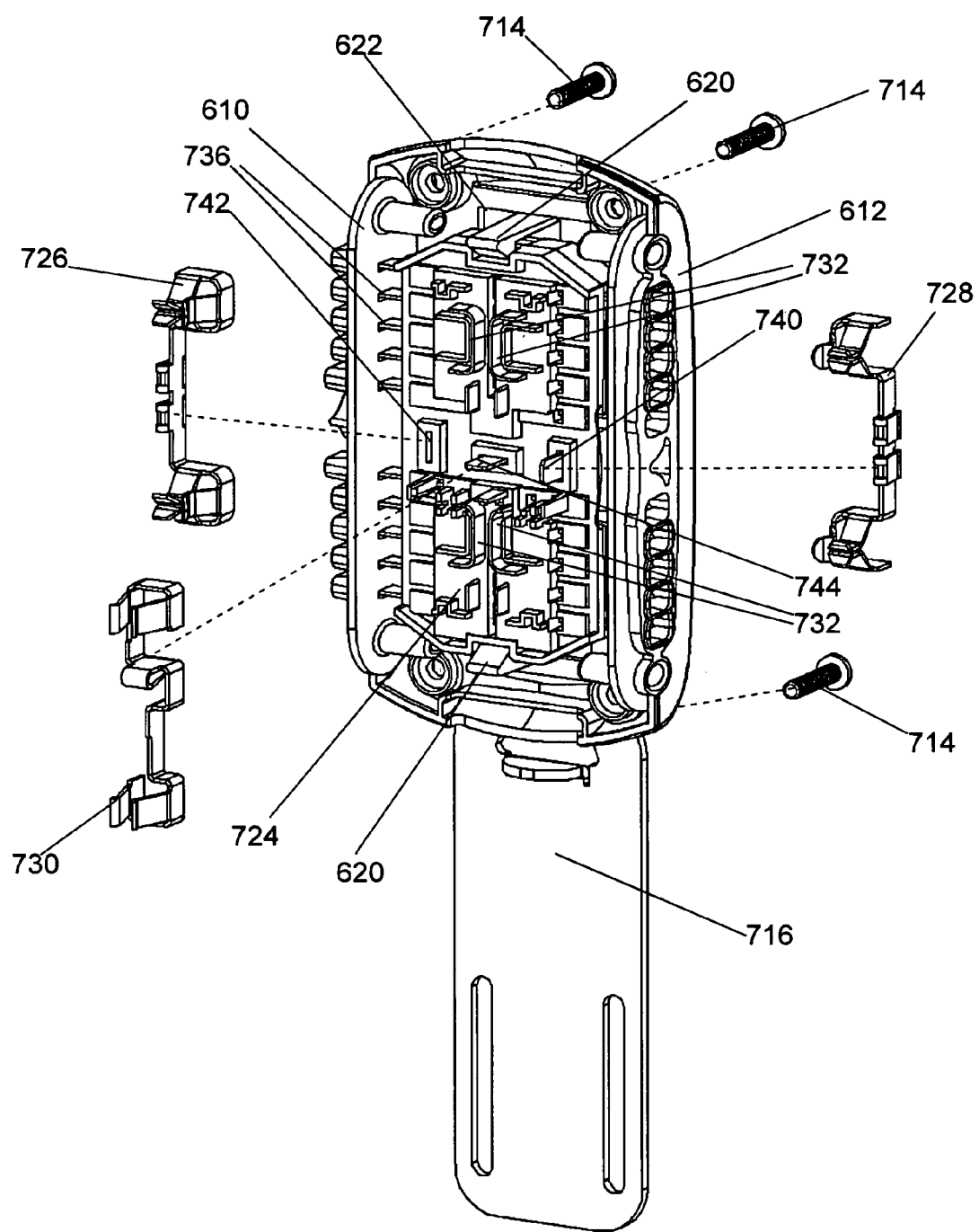
FIG. 44 is an exploded internal front perspective view of the high-voltage power module of FIG. 41.
Figure 45:
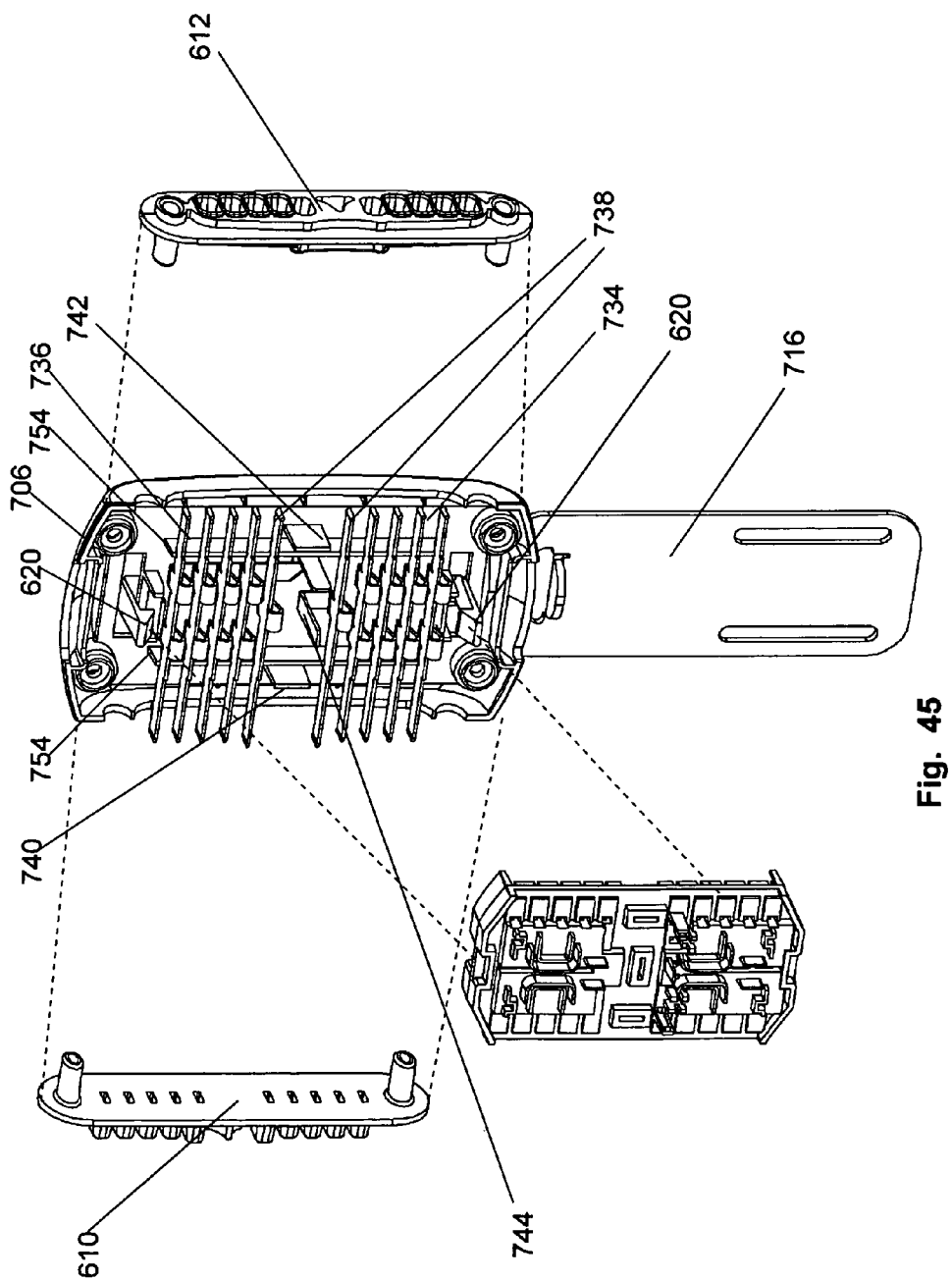
FIG. 45 is another exploded internal front perspective view of the high-voltage power module of FIG. 41.
Figure 46:
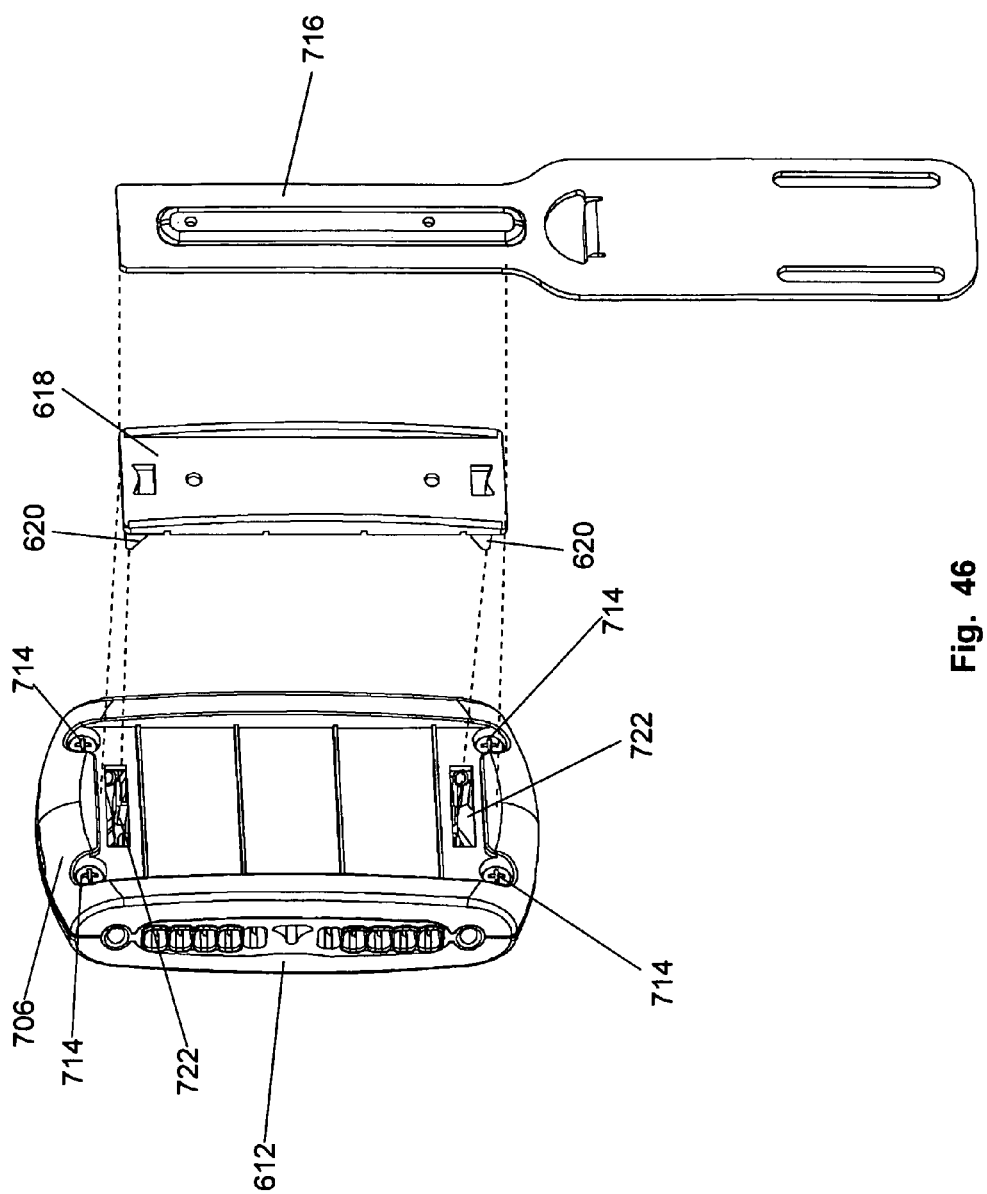
FIG. 46 is a rear exploded perspective view of the high-voltage power module of FIG. 41.
Figure 47:
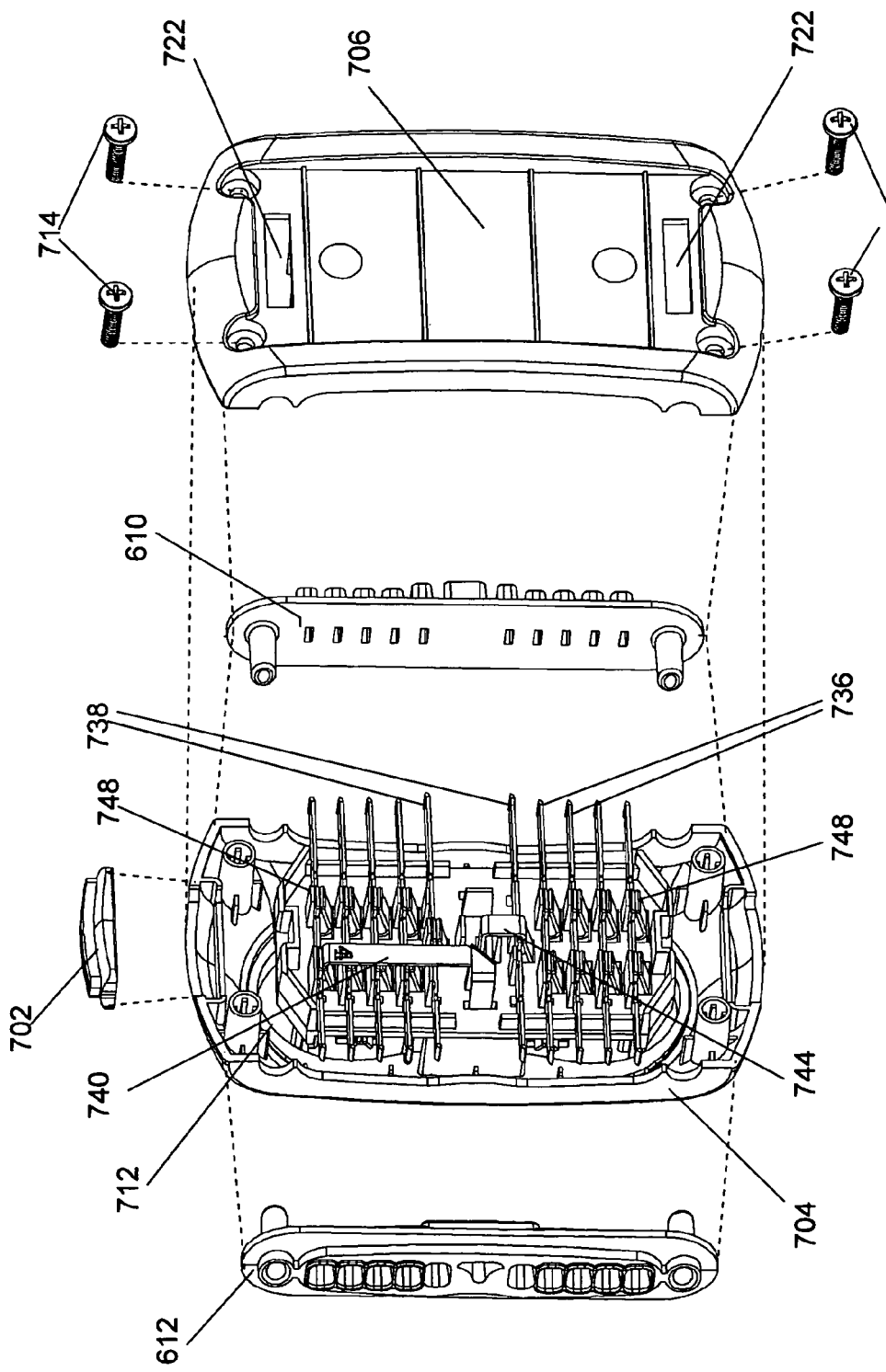
FIG. 47 is a rear interior exploded perspective view of the high-voltage power module of FIG. 41.

Referring to FIGS. 27 and 28, female connector 1000 includes a chassis 1002 and a female connector housing 1004, secured to each other with rivets 1006 and 1008. Female connector housing 1004 includes a lip 1010 that can be engaged by latches 918 of male connector 9000. Chassis 1002 includes retaining structures similar to those shown for chassis 1052 of female connector 1050 in FIGS. 31-32, and female connector housing 1004 includes recesses 1012 that are mate-able with the corresponding structure of male connector 900.

FIGS. 29-32 show another embodiment of a female connector 1050 that is mate-able with male connector 950. Female connector 1050 is shown attached to a ribbon cable 250 containing individual insulated wires 252 enclosed within insulating sheaths 254. Rivet 1056 secures female connector housing 1054, ribbon cable 250, and female connector chassis 1052 together, and rivet 1058 secures female connector housing 1054 and female connector chassis 1052 to each other. Female connector chassis 1052 retains female connector power contacts 1064 in position. Power contacts 1064 and ground contacts 1066 are each fastened to the end of a wire 252 to provide electrical conduction between the wire 252 and the opposing end of each contact 1064 and 1066. Female connector housing 1054 includes a recess 1068 and an opening 1070 to accommodate the end of the latch lever 960 and the latch pin 962 of a male connector, such as male connector 950 in FIGS. 24-26. The safety/equipment ground contacts 1066 extend outward farther from the end of female connector 1000 or 1050 than the phased and neutral contacts 1064 to ensure (1) that the safety/equipment and isolated ground connections are made before the phased and neutral connections when connectors are mated, and (2) that the phased and neutral connections are broken before the safety and equipment ground connections when the connectors are separated from each other. Recesses 1072 at the end of the female connector housing 1054 engage the ends of the phased and neutral contacts 970 and the safety/equipment ground contacts 968 of a male connector 950.

Female connector housing 1004 or 1054 and female connector chassis 1002 or 1052 are preferably formed by injection molding a V-rated thermoplastic material that meets the flame retardant standards of UL for electrical components. Connectors 1064 and 1066 are formed from brass.

To assemble female connector 1000 or 1050, the insulation is stripped from the ends of wires, such as might be within a section of ribbon cable 250, to expose the copper wire ends, such as wires 252. Contacts 1064 and 1066 are crimped or otherwise secured to the ends of the wires to provide electrical connectivity between the wires and the contacts. Female connector chassis 1002 or 1052 is positioned about contacts 1064 and 1066 and the end of ribbon cable 250 or another source of wires, and female connector housing 1004 or 1054 is also positioned about the end of ribbon cable 250 or other wire source and adjacent female connector chassis 1002 or 1052. Rivets 1006 and 1008 or 1056 and 1058 are then installed to secure the components together. If desired, a cable carrier section 350 may be attached to female connector housing 1054 by inserting pins 364 on the cable carrier section into holes in the female connector housing 1054, with ribbon cable 250 inside cable carrier section 350.

Power Core

Power core 600 can be understood with reference to FIGS. 33-40 and functions to primarily manage and distribute power from an input cable to adjacent power modules. Preferably, the power is provided via up to 10 conductors as standard 20 amp 125 V AC, as is generally used in commercial environments. The electrical components of the power core 600 are enclosed between front core housing 602, front core bezel 604, rear core housing 606, core cover 608, male connect bezel 610, and female connect bezel 612. An end cap 614 may be used to cover male connect bezel 610 or female connect bezel 612 when a high-voltage power module or low-voltage data module is not connected to the side of the power core 600. Core blade 616 is attached to core shuttle 618 with screws 620 and functions for installing power core 600 to a mounting bracket 1000 fixed to a desk or other work surface, shown as 112 in FIGS. 1-2. Core shuttle 618 fits over core cover 608, with latches 622 that extend through holes 624 in core cover 608 and engage core chassis 626. Alternatively and not shown, the core blade may include latch elements engageable with the core chassis, eliminating the need for a shuttle.

The end of a section of ribbon cable 250 is positioned between core cover 608 and rear core housing 606, with insulating sheaths 254 protruding from outer jacket 256. Angle contacts 628 are secured about the ends of wires 252 and insulating sheaths 254, such as by crimping. The angle contacts 628 extend through holes 630 in core cover 608 to engage bus bars 632, thereby providing electrical contact between each wire 252 and a bus bar 632 positioned between rear core housing 606 and front core housing 602. Retainers 634 on core cover 608 hold angle contacts 628 in position. Screws 636 or other suitable fasteners secure the front and rear housing to each other.

Core chassis 626 is positioned between front core housing 602 and rear core housing 606 and includes paired slots 638 for retaining bus bars 632 between the core chassis 626 and rear core housing 606. In addition, core chassis 626 includes openings 640 through which angle contacts 642 extend from bus bars 632 to provide electrical power to the contacts of a printed circuit board (PCB) 644. PCB 644 is positioned in front of core chassis 626 and is provided for an LED 646 that can illuminate a graphic or logo on the front of core 600. LED lens 648 is positioned between PCB 644 and front core housing 602 and functions to focus light from the LED 646 through front core bezel 604. Front core bezel 604 includes latches that mate with the edge of opening 650 in front core housing 602. The LED 646 and the transparent or translucent front core bezel 604 provide a visible indication that the core is receiving power. In addition, front core bezel 604 and/or LED lens 648 may be customized to include a brand icon, logo, or other ornamentation. Alternatively, a different type of light source could be used, such as an electrically or inductively powered light source.

Male connect bezel 610 is retained between the left edges of front and rear core housings 602 and 606 has two hollow projections 652 extending toward the inside of core 600. The interior surface 654 is substantially flat. Projections 656 and 658 extend outward from the exterior surface 660 and surround the ends of bus bars 632. Male key feature 662 also extends outward from exterior surface. The male key feature 662 and the two adjacent projections 656 extend farther than the other eight projections 658.

Female connect bezel 612 is also retained between front and rear core housings 602 and 606, and it has two hollow projections 664 extending toward the inside of core 600. Exterior surface 666 is substantially flat and includes openings 668 and 670 about the ends of bus bars 632 and a female key feature 672 in the form of a well or opening. Openings 668 and 670 and female key feature 672 are mate-able with corresponding projections 656 and 658 and male key feature 662 of a male connector on an adjacent power or low-voltage data module. The male and female key features 662 and 672 identify the type of circuit, A, B, or C, for which the system is configured, as described below.

Core front and back housings 602 and 606, male and female connect bezels 610 and 612, and core chassis 626 are preferably formed from a thermoplastic material having a V rating from Underwriter's Laboratories or an equivalent flame-retardant material. They may be formed by injection molding. Bus bars 632 and angle contacts 628 and 640 are preferably formed from brass. End cap 614 is preferably formed from an elastomeric material. Preferably, the power core is assembled at the factory.

High-Voltage Power Modules

A high-voltage power module 700 in accordance with the present invention can be understood with respect to FIGS. 41-54. Female connect bezel 612, male connect bezel 610, and plug 702 are retained between the edges of front module housing 704 and rear module housing 706. The front face of high-voltage power module 700, as viewed by a user, includes an ID ring 708 and a receptacle 710 with two outlets, both extending through an opening 712 in front module housing 704. Front and rear module housings 704 and 706 are secured to each other about the internal components of high-voltage power module 700 with suitable fasteners, such as screws 714. ID ring 708 is color coded to indicate the type of high-voltage power for which the module is configured. For example, orange may denote conditioned or backup power, where a battery backup is provided for important or sensitive equipment, such as computers, and gray may denote raw line power which is unconditioned. Thus, items such as lamps, heaters, and printers, which could drain the backup battery during a long power failure, can be connected to other lines. Also, the color coding can aid in balancing the loads on different circuits. Female connect bezel 612 and male connect bezel 610 are preferably color coded to identify the circuit phase, A, B, or C, used for the eight power/neutral lines, as described below.

As viewed from the rear, module mounting blade 716 is mounted to high-voltage power module shuttle 618 of high-voltage power module 700 and is adapted for insertion into a mounting bracket 1000, as described below. Shuttle 618 is used to connect high-voltage power module 700 to an adjacent power core 600 or an additional high-voltage power module, as described below, and includes two latches 620 that pass through openings 622 in rear module housing 706 and engage notches 750 in high-voltage module chassis 724. Receptacle 710 is preferably a 20 AMP 125V AC duplex module with brass contacts, and it preferably receives standard NEMA 5-20P 3 prong UL straight blade electrical conductors from grounding plugs that are insert-able into the outlet, such as plugs at the ends of power cords for office equipment and luminaries used in North America. Alternatively, different receptacles could be used, such as those used for high-voltage circuits in other countries, or two 110V lines may be combined for a 220V outlet.

Male connect bezel 610 and female connect bezel 612 each provide a high-voltage connection port between high-voltage power module 700 and an adjacent high-voltage power module or power core, allowing power to be delivered to receptacle 710 on the front face of high-voltage power module 700. As shown and viewed from the front, the male connect bezel 610 is on the left side of module 700, and the female connect bezel 612 is on the right side. Each high-voltage power module and power core in an installation should be provided with a male connection on the left and a female connection on the right to make the modules compatible with each other.

A high-voltage module chassis 724 is retained inside high-voltage power module 700 and within the volume between front module housing 704, rear module housing 706, female connect bezel 612, male connect bezel 610, and receptacle 710, sandwiched between the front module housing 704 and the rear module housing 706. Power contacts 726 and 728 and ground contact 730 are held in place by snap retainers 732 on the front of high-voltage module chassis 724 and projections 752 extending rearward from the receptacle 710. These power contacts provide programmable electrical contact between bus bars 736 and 738 and receptacle 710 via power straps 740 and 742 and ground strap 744. The power and ground straps have ends that extend through openings 746 in high-voltage module chassis 724. The back of high-voltage module chassis 724 includes retainers 748 to hold bus bars 736, and 738 between high-voltage module chassis 724 and rear module housing 706. The ends of the bus bars 734, 736, and 738 extend through openings in male connect bezel 610 and female connect bezel 612 to provide electrical contact with bus bars of an adjacent power core or high-voltage power module. Bus bars 738 are used for ground connections and therefore are longer than bus bars 734 and 736. Bus bars 738 extend farther outward from the sides of high-voltage power module 700 and provide for establishing ground connections before hot connections when adjacent modules are connected to each other.

As explained below, the wiring for an installation will be configured in a pre-determined manner. Depending on how the wiring is to be configured, power straps 740, 742, and 744 are selected and installed to provide power to the appropriate bus bars for the selected configuration, as shown in FIGS. 48-51. Bus bars 734 are connected via power straps 742a, 742b, or 742c; bus bars 736 are connected via power straps 740a, 740b, or 740c; and ground bus bars 738 are connected by ground straps 744 for three possible branch circuit phase selections. If a different branch circuit phase is desired, a different arrangement of power straps will provide the necessary contacts between the appropriate bus bars. Preferably, the power straps are installed at the factory, and the color coding of the physically keyed male and female connect bezels 610 and 612 may be used to ensure that the appropriate modules are used at the installation site so that mismatching of voltage polarity does not occur.

Front module housing 704, rear module housing 706, female connect bezel 612, male connect bezel 610, and high-voltage module chassis 724 are preferably formed from a thermoplastic material that is V rated by Underwriters Laboratories, or an equivalent material that is low smoke rated and combustion resistant. The bus bars 734, 736, and 738 are preferably formed from brass.

Figure 54:
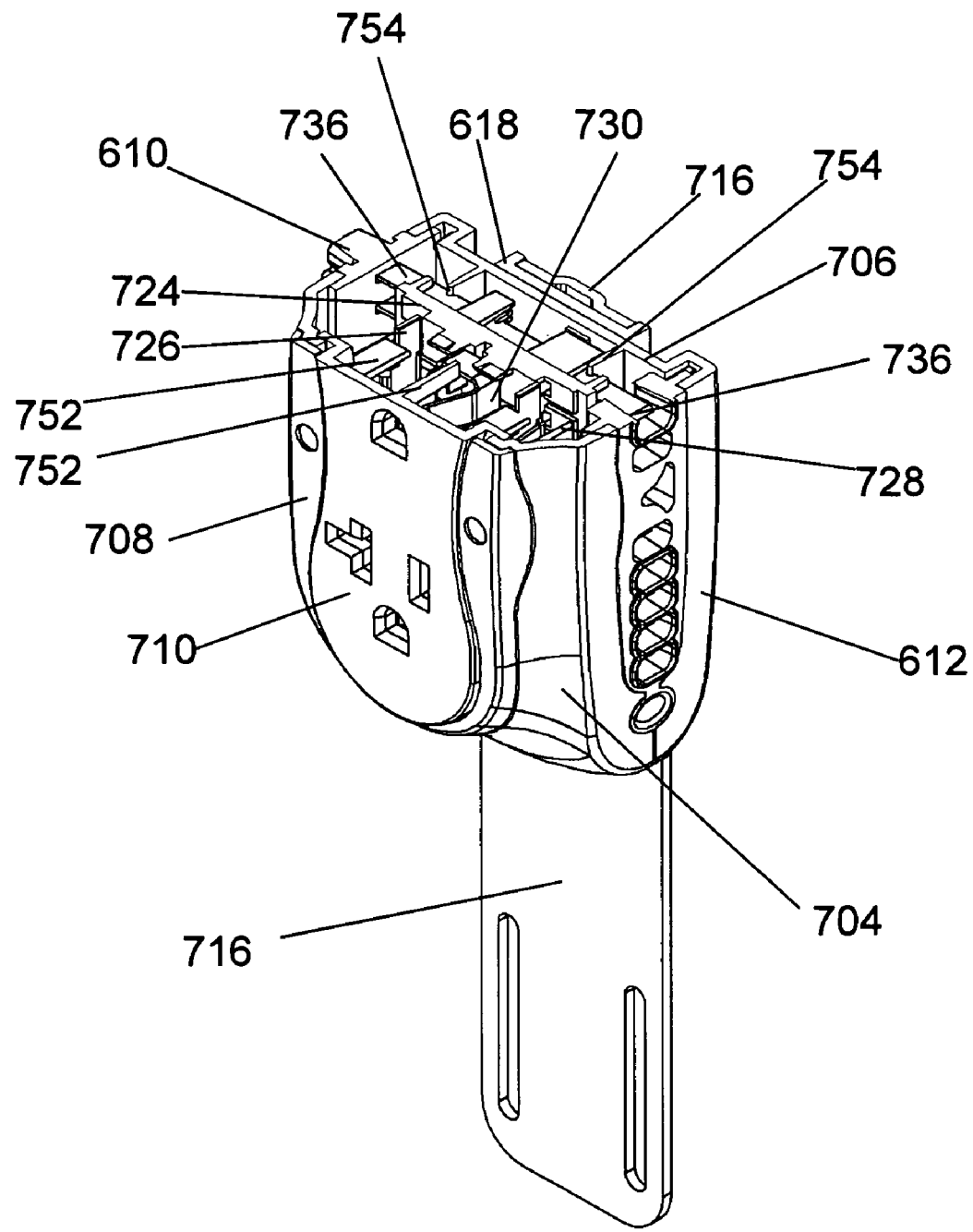
FIG. 54 is a cutaway front perspective view of the high-voltage power of FIG. 41.
Figure 58:
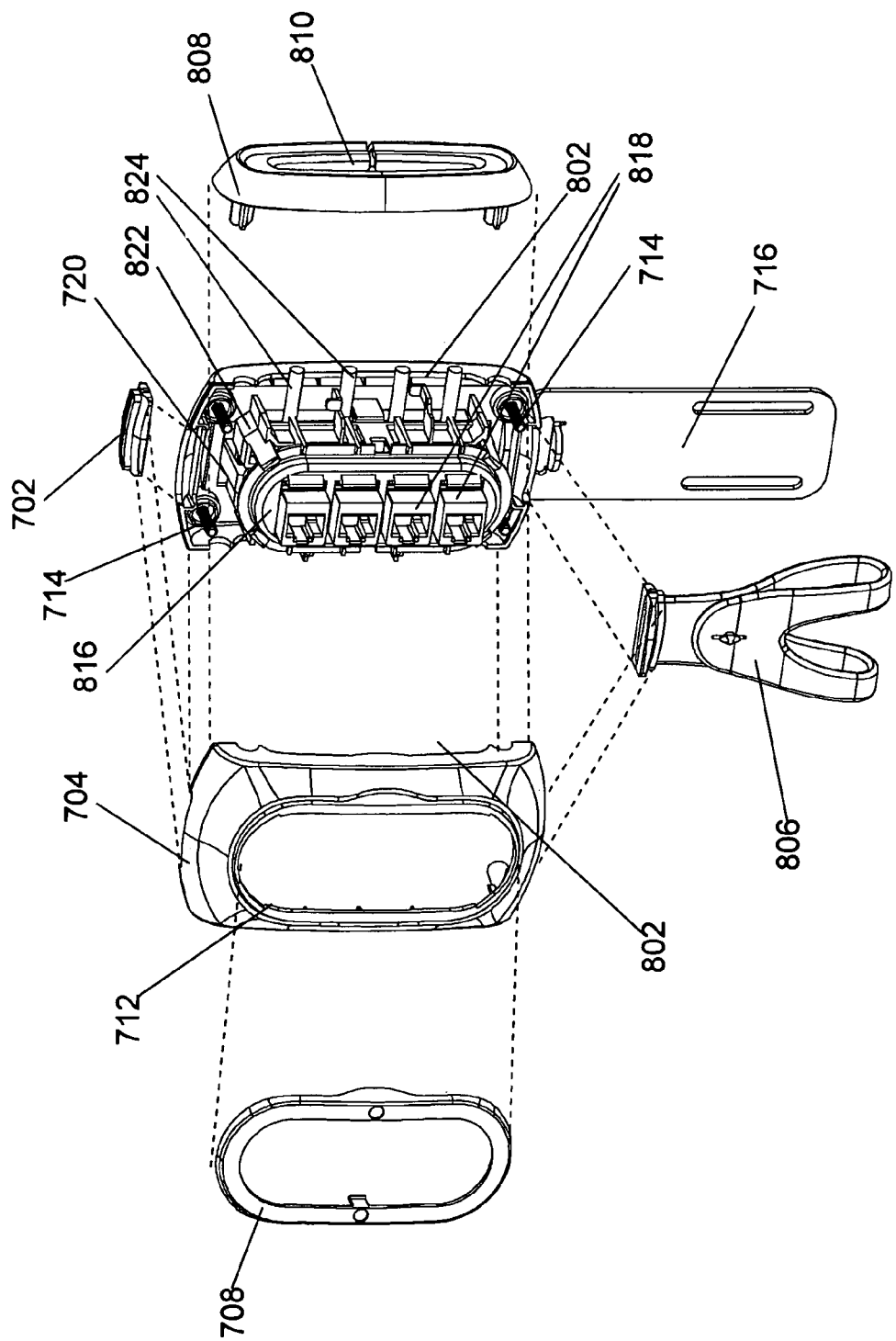
FIG. 58 is a front exploded perspective view of the low-voltage data module of FIG. 55.
Figure 59:
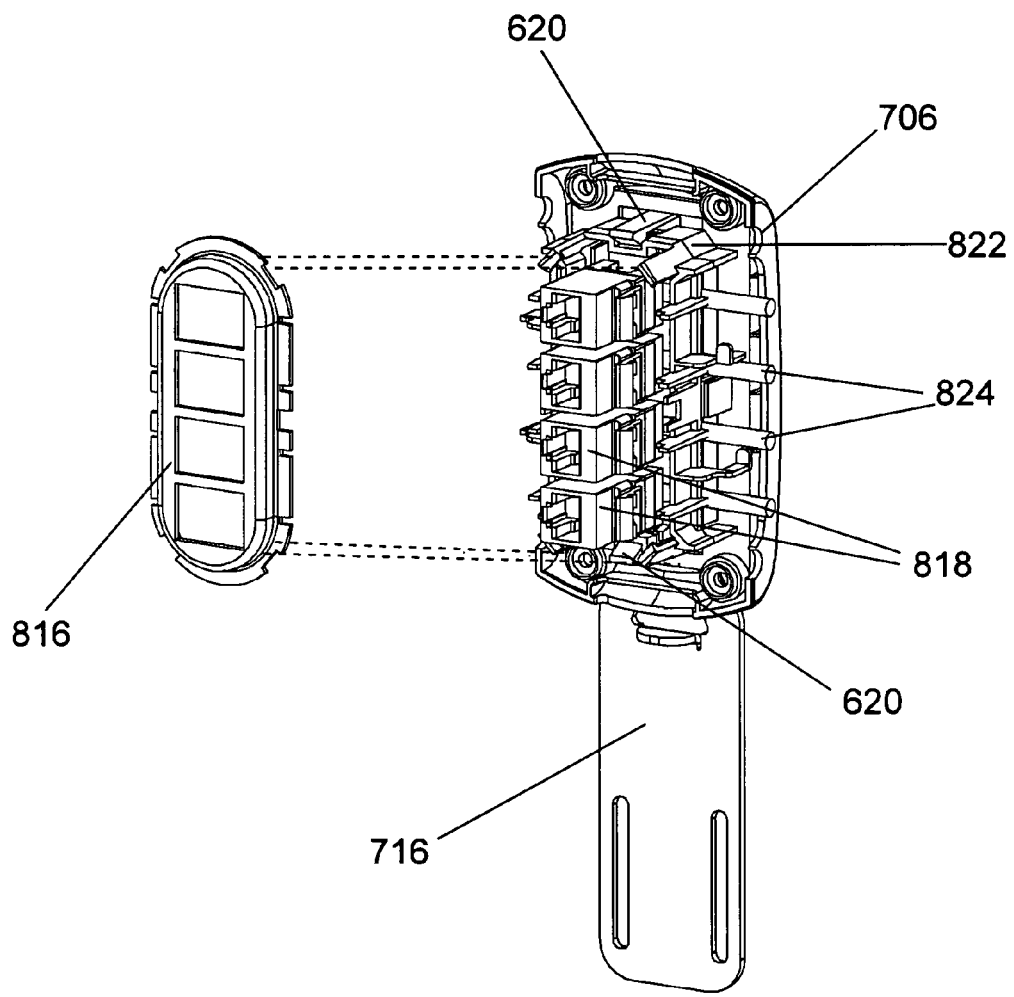
FIG. 59 is a front exploded perspective view of the interior of the low-voltage data module of FIG. 55.

Preferably, high-voltage power module 700 is configured for a selected circuit phase and completely pre-assembled at a manufacturing facility and then shipped to an installation site ready for connection to adjacent modules. To assemble high-voltage power module 700, bus bars 734, 736, and 738 are snapped into bus bar retainers 748 on the back of high-voltage module chassis 724. The power and ground contacts 726, 728, and 730 snap into retainers 732 on the front of high-voltage module chassis 724. Next, power straps 740 and 742 and ground strap 744 are attached to contacts 726, 728, and 730, respectively, to provide the desired circuit configuration. Receptacle 710 is installed into the front module housing 704 with the plug faces to the outside of the housing. Then the subassembly of the high-voltage module chassis 724, bus bars, contacts, and ground contacts is inserted into the front module housing 704. The rear module housing 706 is placed against the high-voltage module chassis assembly, with the corresponding male and female connect bezels 710 and 712 clamped between the front and rear housings. The front and rear housings are screwed together using screws 714. Finally, the ID trim ring 708 is added to indicate the power configuration, and blade 716 and shuttle 618 are screwed onto rear module housing 706. The notches 750 and snap retainers of high-voltage module chassis 724 maintain the power contacts 726, 728, and 730, respectively, and the bus bars 736 and 738 in position during assembly of the high voltage power module 700. As shown in FIG. 54, when the front module housing 704 and rear module housing 706 are secured about the internal components of the module, projections 752 are urged against the power and ground contacts 726, 728, and 730, and ribs 754 extending forward from the rear housing 706 are urged against the bus bars 736 and 738, ensuring that the contacts and bus bars are held securely in the desired positions.

Low-Voltage Data Module

Referring to FIGS. 55-62, the exterior of low-voltage data module 800 includes a front module housing 704 and a rear module housing 706, with a cable management strap 806 and a plug 702 retained between the edges of the front and back housings 704 and 706. As viewed in FIGS. 57-58, openings 802 are formed at the sides of module 800, between front and rear module housings 604 and 606. End cap 808 fits onto the side of low-voltage data module 800 that is not attached to the adjacent high-voltage power module 700 and is provided with a slot 810 through which the ends of data cables, such as might be held by cable management strap 802, can pass.

RJ plate 816 and ID ring 710 fit into opening 712 in front module housing 704 and are seated about female connectors 818 for data cables. RJ plate 816 is shown with identical openings for four female connectors 818, but the plate is customizable for up to 4 voice or data ports. Preferably, the RJ plate includes indicia showing the types of data ports that are present, such as for network, coaxial, fiber optics, and telephone cables. The indicia may be color coded to indicate the type of low-voltage circuit in use, preferably following industry color coding standards. For example, blue could be used to indicate Ethernet connections. ID ring 710 may be colored for esthetic purposes.

Figure 60:
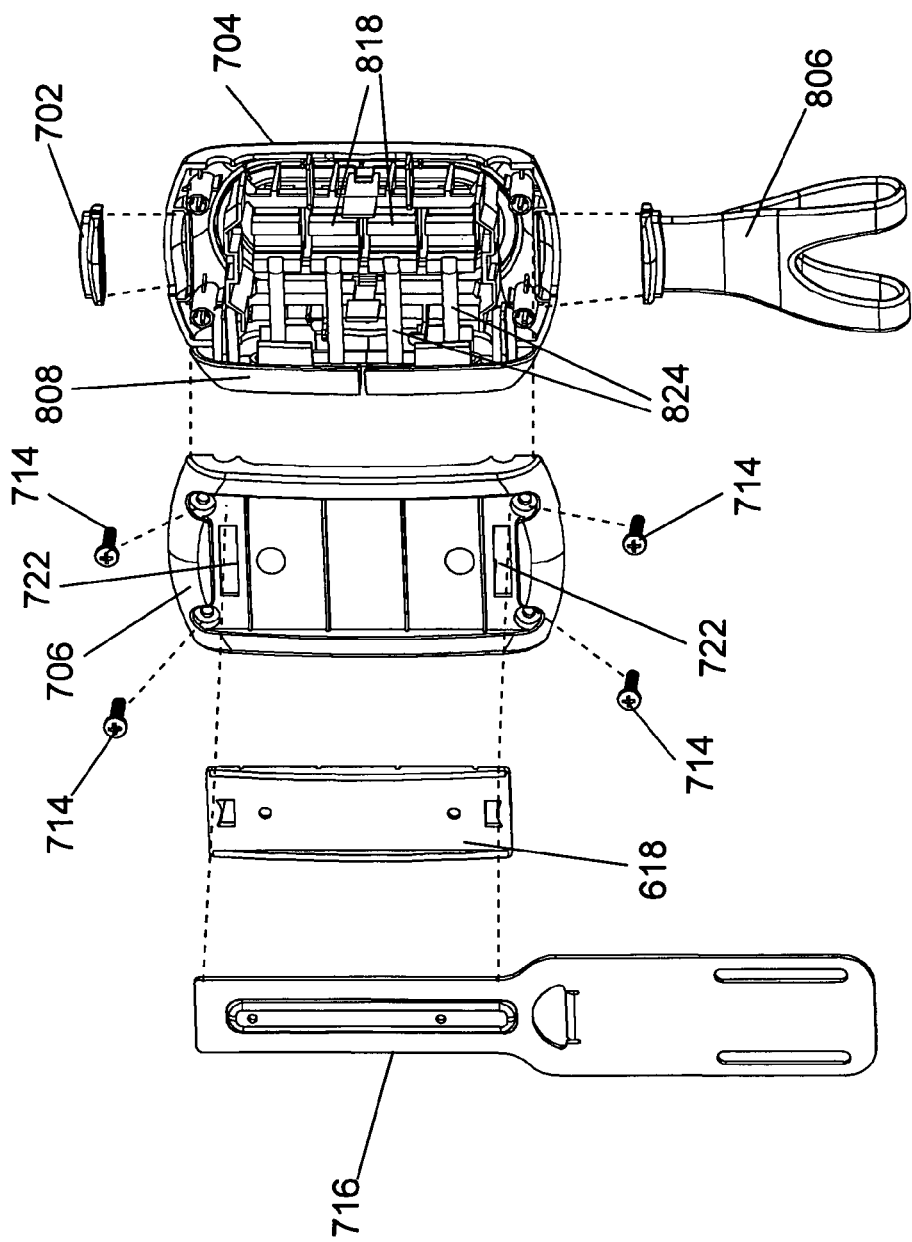
FIG. 60 is a rear exploded perspective view of the low-voltage data module of FIG. 55.
Figure 61:
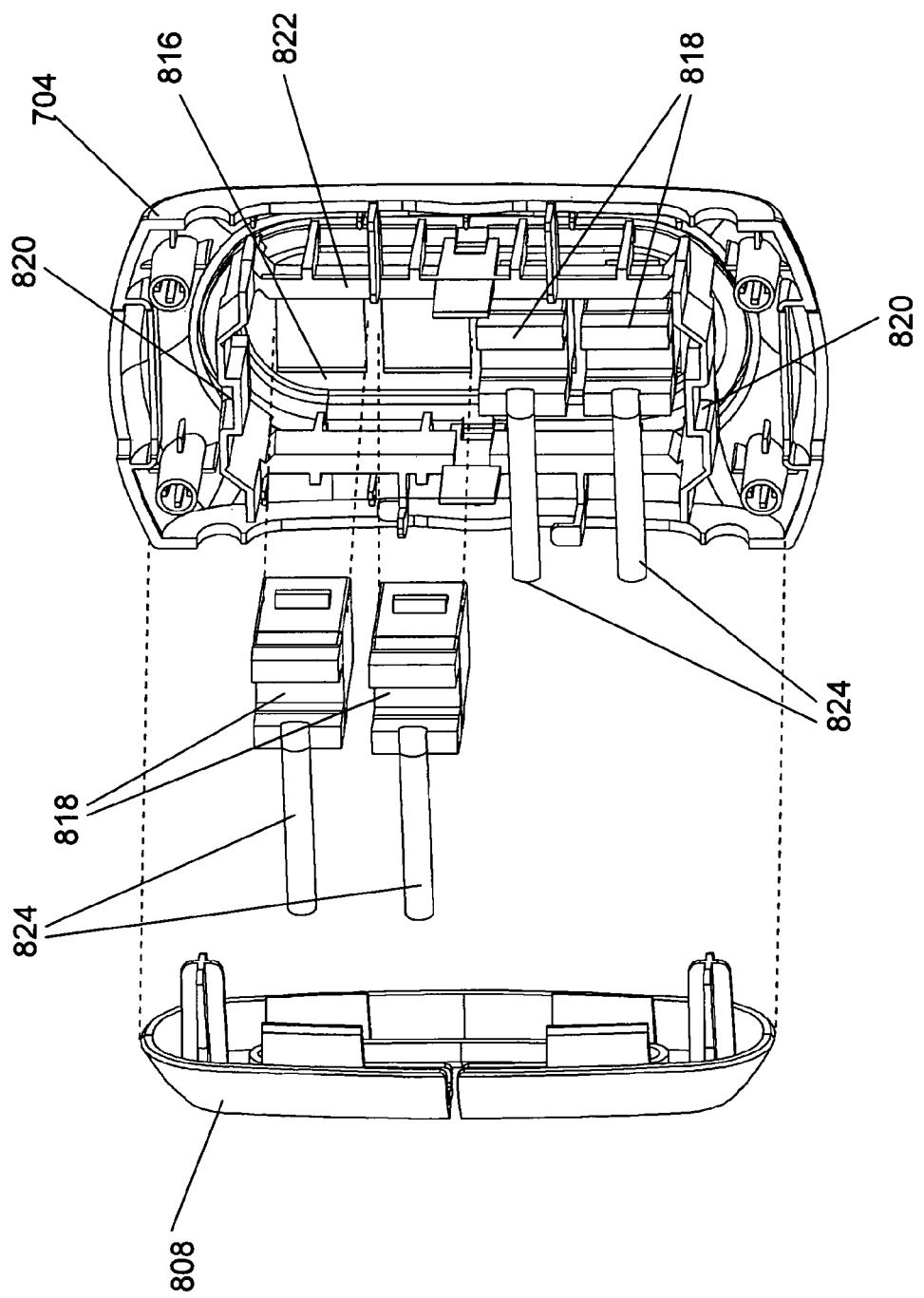
FIG. 61 is a rear internal exploded perspective view of the low-voltage data module of FIG. 55.
Figure 62:
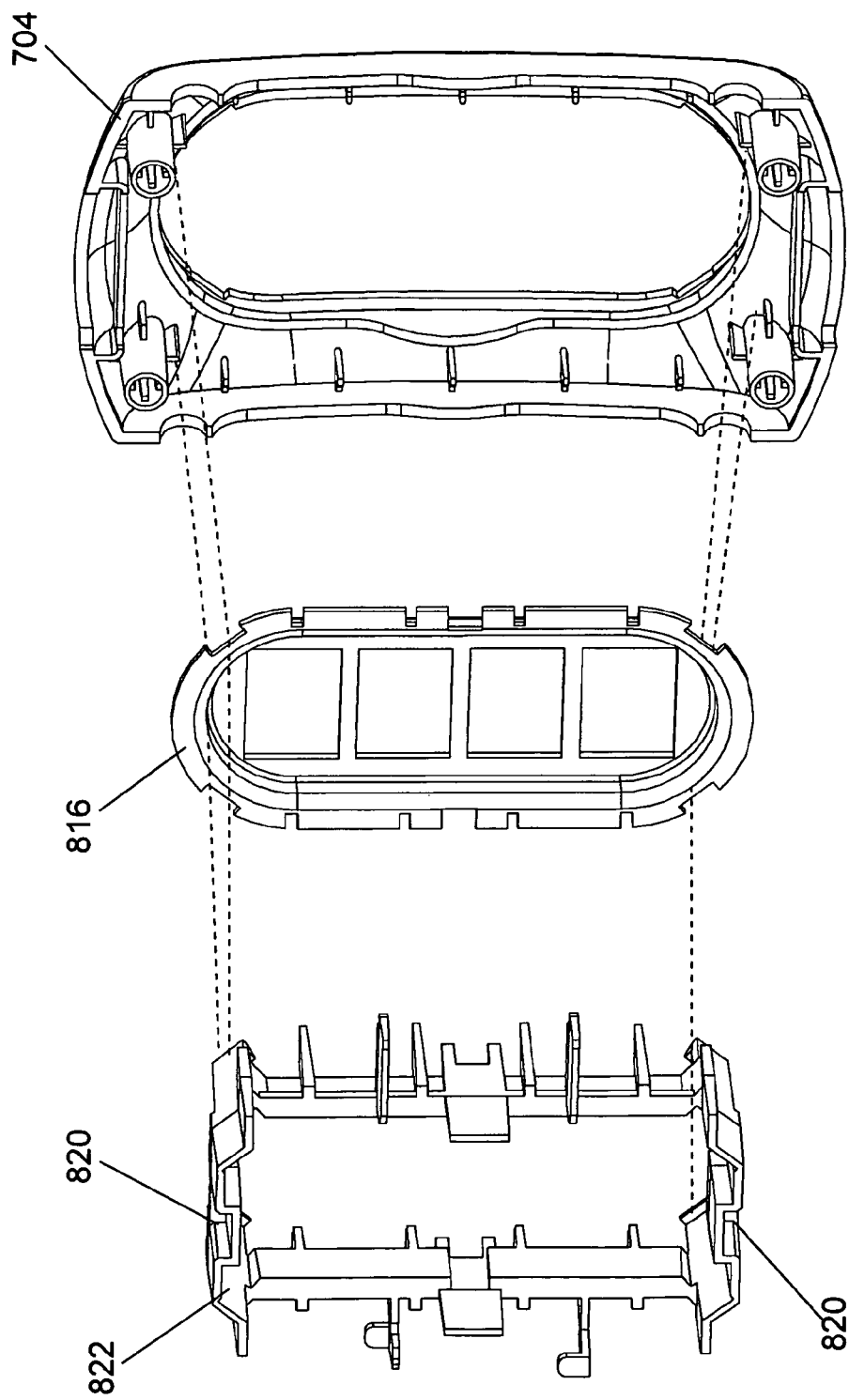
FIG. 62 is another rear internal exploded perspective view of the low-voltage data module of FIG. 55.

As viewed from the rear in FIGS. 57 and 60, mounting blade 716 is fixed to shuttle 618. Latches 620 protrude from the back plate of shuttle 618 into the interior of low-voltage data module 800 and engage with lips 820 on low-voltage data module chassis 822. Female cable connectors 818 are retained by chassis 822, providing strain relief to the low-voltage communication wires 824 extending outward and into end cap 808. Slot 810 in end cap 808 accommodates the routing and management of low-voltage communication cables 824 that terminate onto communications outlets 818. Fingers 826 extend outward from the side of low-voltage data module chassis 822 through the opening 802 between front and rear module housings 704 and 706. The fingers 826 are engage-able with an adjacent high-voltage power module to help align the low-voltage data module with an adjacent high-voltage power module or power module.

Preferably, front module housing 704, rear module housing 706, and low-voltage data module chassis 822 are formed from a thermoplastic material that is V Rated by Underwriter's Laboratories, or an equivalent flame-retardant material. End cap 808 may be formed from an elastomeric material. RJ plate 816 may be formed from metal.

As shown, the high-voltage power module 700 and the low-voltage data module 800 have identical mounting blades 716, plugs 702, front module housings 704, and rear module housings 706. Also, the power core 600, the high-voltage power module 700, and the low-voltage data module 800 have identical shuttles to promote interchangeability of parts and reduce manufacturing costs. Alternatively and less preferably, each module could have different housings, plugs, blades, and shuttles.

To assemble low-voltage data module 800, communications outlets 818 are inserted into low-voltage data module chassis 822 with the outlet ends of the connectors facing toward the front of the chassis. RJ plate 816 is placed over the front of the chassis and around the communications outlet ends. The chassis assembly, plug 702, and cable management strap 808 are then sandwiched between front and rear module housings 604 and 606, and the housings are screwed together. Id ring 710 is placed into opening 712 in front housing 704, and, if desired, one or two end caps are placed into one or both openings 802 between the front and rear module housings 704 and 706. Blade 716 and shuttle 618 are screwed onto rear module housing 706. Preferably, the low-voltage data module is assembled at the factory.

Mounting Bracket

Referring to FIGS. 1-2 and 63-64, each combination of a power core, such as power core 600, along with one or more high-voltage power modules, such as high-voltage power module 600, and one or more low-voltage data modules, such as low-voltage data module 800, can be mounted to a desk or work surface by inserting blade 616 and/or blade(s) 716 into a mounting bracket 1100. Bracket 1100 comprises a desk mounting member 1102 attached to blade retaining member 1104 along a corner joint 1106. Desk mounting member 1102 can be mounted to the bottom surface of a desk or table top 1108, using screws or other fasteners (not shown) inserted through holes 1112. Bracket 1100, as shown, can be used to retrofit existing office furniture. Alternatively, a mounting bracket could be integral with a desk or table top (not shown), or it could be insert-able into slots (not shown) in the desk or table top. Also alternatively, a mounting bracket could be secured to a wall or vertical panel behind a desk or table.

Blade retaining member 1104 of bracket 1100 includes protruding blade retainers 1114 that provide a space to partially surround the blade 616 of a power core, and blade retainers 1116 that provide spaces to partially surround the blades 616 of high-voltage power and low-voltage data modules 600 and 800. The blade retainers 1114 and 1116 hold the blades adjacent to the edge 1118 of the table or desk top 1108. It should be noted that the edge 1118 of the desk or table top need not be a planar vertical surface as shown. Rather it could have a rounded or other profile, as long as blade retaining member 1104 is positioned outward from the edge sufficiently for blades 616 and 716 to be inserted. Preferably, blade retainers 1114 include holes 1120 through which screws or other fasteners can be inserted to hold blades 616 and 716 securely to mounting bracket 1100. As shown, bracket 1100 accommodates up to six high-voltage power and low-voltage data modules, three on each side of the core. In addition, desk mounting member 1102 includes an opening 1124 to accommodate a ribbon cable passing between the edge of desk or table top 1108 and core blade 616. Although it would be possible to use a bracket that accommodates more modules, it is preferable to limit the number of modules to six or fewer to limit the power draw on the circuit(s) and prevent circuit overload.

As shown in FIGS. 1-2 and 63-64, the core and the high-voltage power and low-voltage data modules are mounted above the desk or table top 1108, with their blades extending downward into bracket 1100. Although this configuration is preferred, the core and the high-voltage power and low-voltage data modules could be mounted below the desk or table top, with the blades extending upward into bracket 1100. It is also possible to mount a similar bracket to a wall or vertical panel adjacent the desk or table.

Bracket 1100 is preferably formed from sheet metal or another material with sufficient strength and rigidity to withstand the forces used to insert and remove plugs from receptacle faces.

Keying Feature for Circuit Identification

Each power core 600 and high-voltage power module 700 is provided with a male connect bezel on the left side and a female connect bezel on the right side, as viewed in FIGS. 39 and 41-47. Thus, each power core can be connected in series with one or more high-voltage power modules, with a low-voltage data module possibly positioned at the end of the series. Alternatively and not shown, each module could be provided with a female connect bezel on the left and a male connect bezel on the right. For compatibility, the placement of male and female connect bezels must be consistent in each module.

As explained above, the power distribution of the ten lines may be configured in different ways at a utility cabinet or a power distribution module. Generally, there are two ground lines, and the other eight lines are either phased or neutral conductors. It is important that all modules in an installation be consistent with each other and selected for a particular configuration of the power lines. There are a number of commonly used circuit configurations for the eight phased or neutral lines, which can be derived by implementing a configuration shown in one of the three columns in Table I, or in a selected portion of one of the columns.

TABLE I

Circuit configurations

| Configuration | 4D | 3 + 2 | 3 + 3 |
|---|---|---|---|
| Line 1 | Phase | Phase | Phase |
| Line 2 | Phase | Phase | Phase |
| Line 3 | Phase | Phase | Phase |
| Line 4 | Phase |  | Phase |
| Line 5 | Ground | Ground | Ground |
| Line 6 | Ground | Ground | Ground |
| Line 7 | Neutral |  | Phase |
| Line 8 | Neutral | Neutral | Phase |
| Line 9 | Neutral | Neutral | Neutral |
| Line 10 | Neutral | Neutral | Neutral |

In accordance with the present invention, distinctive male and female key shapes are used to identify the circuit configuration for which the components of any particular system are to be used. For example, FIG. 65 shows corresponding male and female connect bezels that could be used for a 4D configuration. Approximately triangular male key feature 1202 protrudes outward from the face plate 1204 of male connect bezel 1206. Approximately triangular female key feature 1210 is a well formed in the face plate 1212 of female connect bezel 1214.

Referring to FIG. 66, approximately semi-circular male key feature 1222 protrudes outward from the face plate of male connect bezel 1226, with complementary approximately semi-circular well 1230 formed in the face plate 1232 of female connect bezel 1234. The semi-circular key shape shown in FIG. 66 can be used to identify a 3+2 configuration. As shown for a 3+3 circuit configuration in FIG. 67, four-sided male key feature 1242 of male connect bezel 1246 complements four-sided female key feature 1250 of female connect bezel 1256. The keying features prevent a user from combining components that are internally configured for different system circuit types.

Channels 1208, 1228, 1248, 1216, 1236, and 1256 through male connect bezels 1206, 1216, and 1246 and female connect bezels 1214, 1234, and 1254, respectively, are used to install and uninstall modules, as discussed below.

Data/Voice Cable Management Strap

Figure 68:
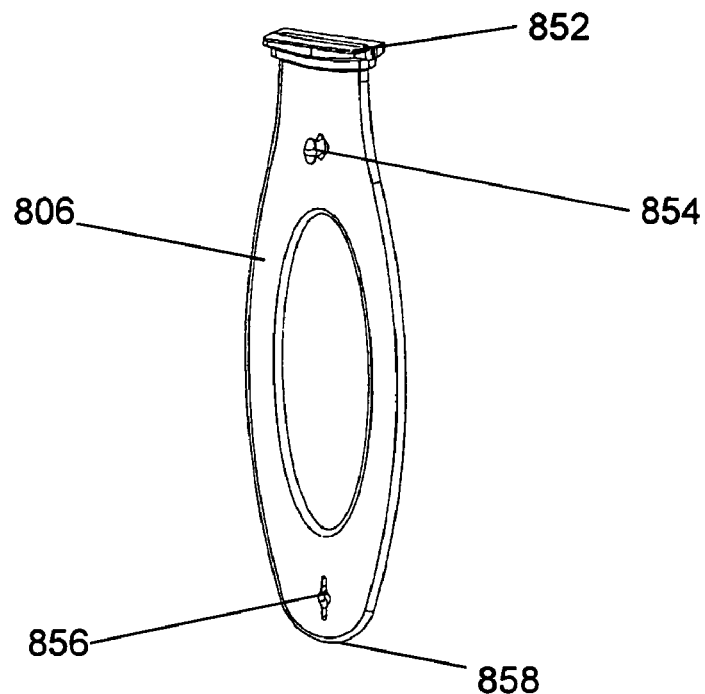
FIG. 68 is a front perspective view of a cable management strap in accordance with the present invention.
Figure 69:
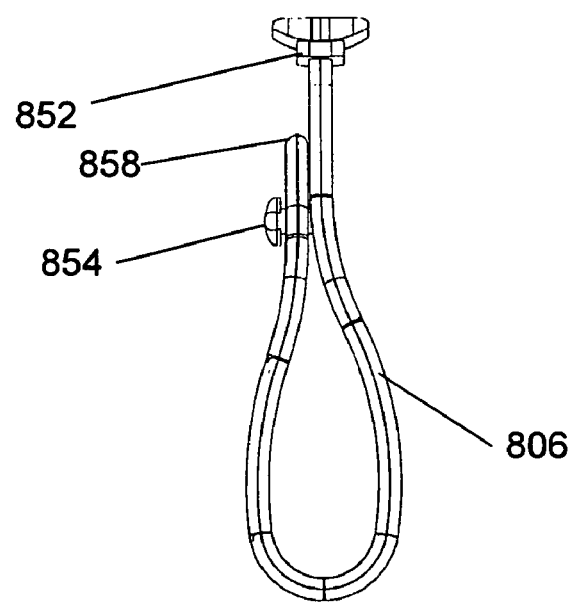
FIG. 69 is a right side view of the cable management strap of FIG. 68.

Referring to FIGS. 68-69, the high-voltage power modules 700 and the low-voltage data modules 800 each may include a cable management strap 806 having a flange 852 that is clamped between the front and rear housings of the module, either at the bottom of the module, as shown in FIGS. 55-58, or at the top of the module (not shown). It should be noted that as shown, each low-voltage data and high-voltage power module includes a plug 702 inserted into the space at the top of the module. If a cable management strap 806 is mounted at the top of a module, the plug 702 could be used to seal the opening at the bottom of the module. If no strap is needed, a second plug 702 could be used to seal the opening provided to retain a cable management strap.

As shown, cable management strap 806 extends from flange 852 downward from the bottom of the module, with pin or hook 854 extending from strap 850 so as to engage the end of strap 850 through hole 856. Strap 806 can be looped around one or more power cords and/or telecommunication cables exiting the cable management strap, with strap end 858 secured on hook 854. Strap end 858 can easily be unhooked to install or remove telecommunication cables. Strap 806 is particularly useful when the power core, high-voltage power modules, and low-voltage data module or modules are mounted underneath a desk or table.

Cable management strap 806 is preferably formed from a flexible elastomeric material, such as by injection molding, allowing strap to conform easily to the shape of the cords and/or cables it supports.

High-Voltage Gooseneck Adapter

Figures 70, 71:
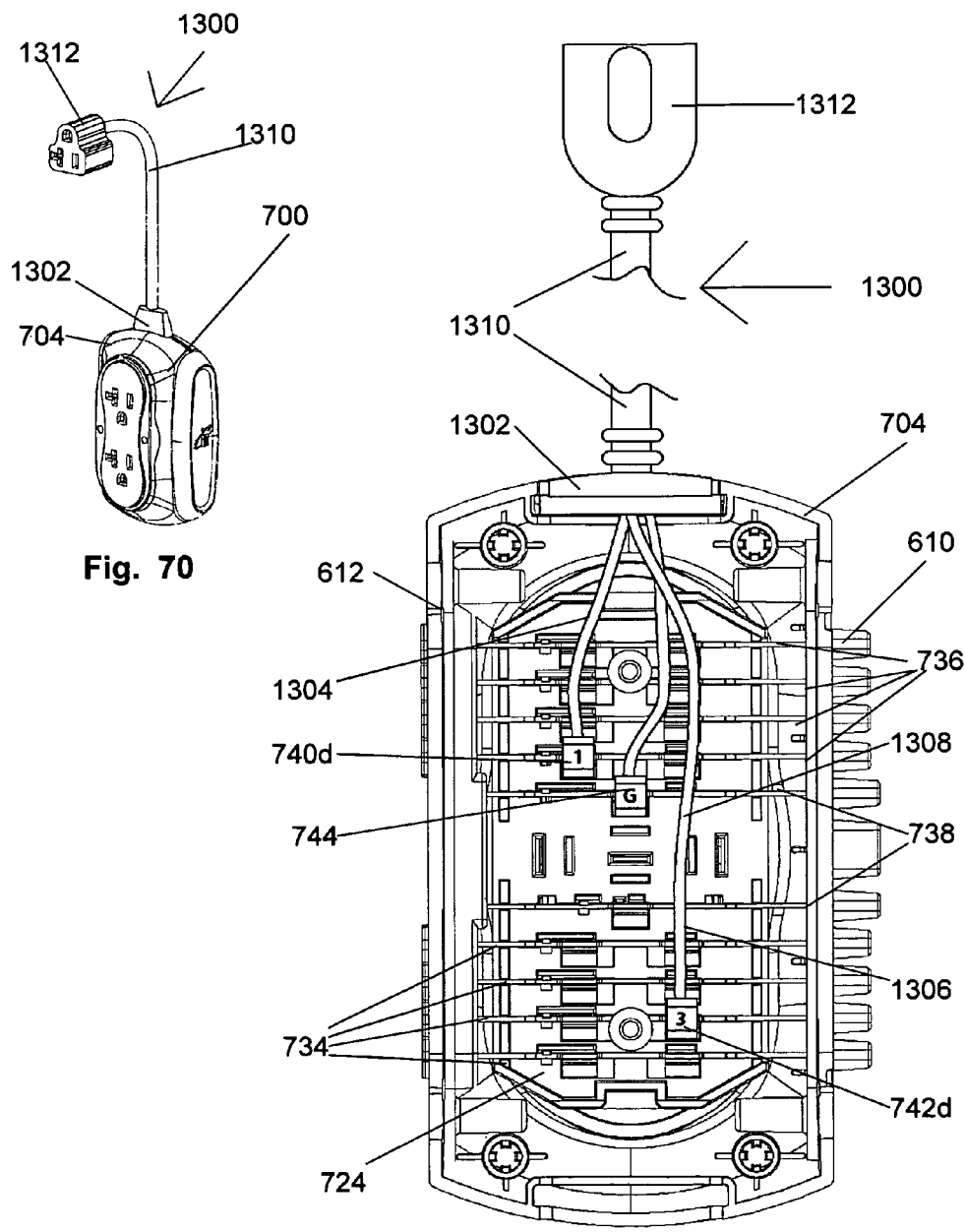
FIG. 70 is a front perspective view of a high-voltage power module and gooseneck in accordance with the present invention.
FIG. 71 is a rear interior view of the high voltage power module of FIG. 70.

If the power core and high and low voltage power modules are mounted below the desk or table top, as shown in FIG. 3, each high voltage power module 700 may be equipped with a gooseneck adapter 1300, as shown in FIGS. 70-71. Gooseneck adapter 1300 includes a retaining plug 1302 that fits between front and rear module housings 704 and 706, replacing plug 702 in FIGS. 41 and 43. Wires 1304, 1306, and 1308 are connected electrically to power straps 740d, 742d, and 744. The wires pass through retaining plug 1302 and insulating sheath 1310 and are connected to standard electrical contacts in plug 1312. Preferably, insulating sheath 1310 is thin enough to fit between the rear edge of a desk or table top and a wall or panel behind the desk or table.

Release Tool

Figure 72:
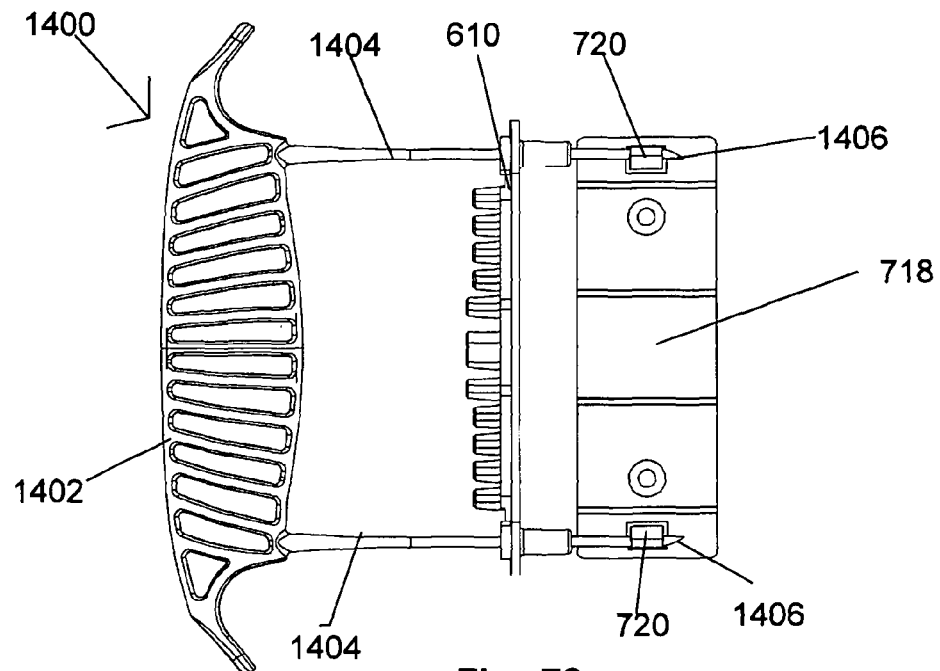
FIG. 72 is a side view of a release tool with its tines extending through channels in a male connect bezel and engaging the latches of a shuttle in accordance with the present invention.
Figure 73:
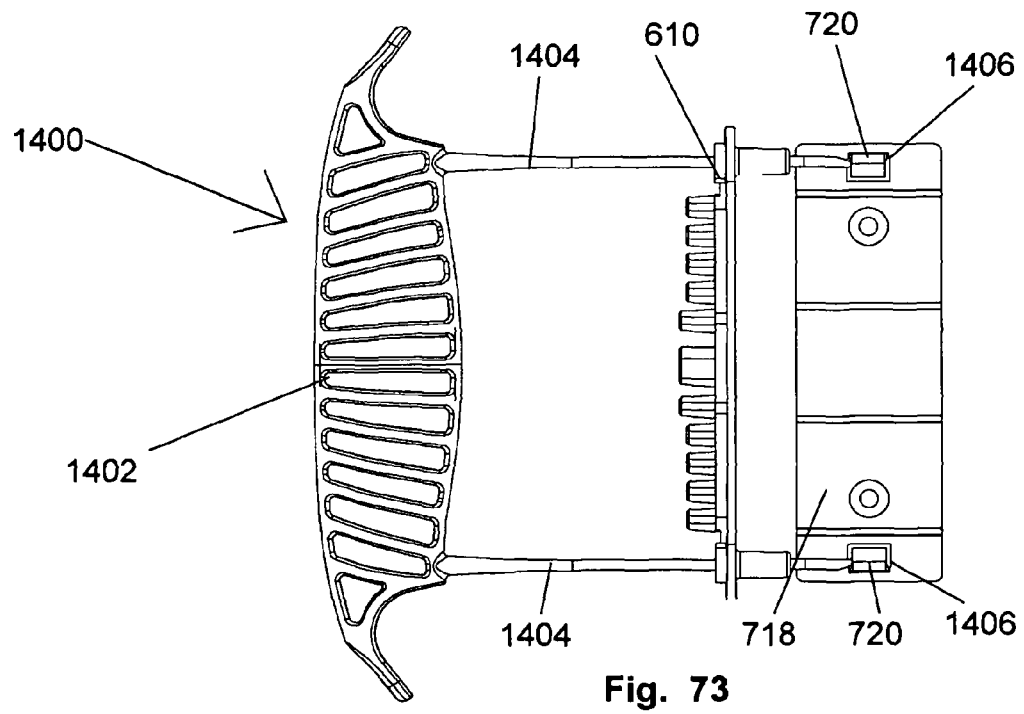
FIG. 73 is another side view of the release tool, male connect bezel, and shuttle of FIG. 72.

Referring to FIGS. 72-73, release tool 1400 is used to safely remove high-voltage power and low-voltage data modules during de-installation of the modules. Release tool 1400 includes a handle 1402 and tines 1404 that terminate in tapered tips 1406. Tines 1404 are sufficiently long to extend (1) through channels 1208, 1228, or 1248 in a male connect bezel, or (2) channels 1216, 1236, or 1256 in a female connect bezel of a power core 600 or high-voltage power module 700, and into the interior of a low-voltage data module 800. The purpose of the tines is to disengage the latches 620 of a shuttle 618 inside the power core or module.

Release tool 1400 may be formed from any rigid material, such as by injection molding a rigid plastic material. Preferably, it is formed by molding a plastic handle over metal tines.

System Installation

To install a system in accordance with the present invention, a power distribution module is first installed into space above the ceiling or under a raised access floor, and one end of a whip cable is connected to the power distribution module. Preferably the whip cable is a cable 200 of the type described in U.S. Pat. No. 5,727,963 or a cable 250 of the type shown in FIG. 4. If installed into the ceiling space, the whip cable 200 or 250 is run from the power distribution module and down a power pole or column into a wall or into a furniture system. If the power distribution module is installed under a raised access floor, the whip cable 200 or 250 is run from the power distribution module and then up into the wire ways of a furniture system through preconfigured penetrations in the raised access floor tiles. If more than one work station is to be included, the second end of the whip cable is then attached to a splitter 400 or 500 positioned at the location where a branch power line is desired, such as below a work station desk or table top. Additional splitters 400 or 500 may be used as needed, connected by additional sections of whip cable 200 or 250. Each splitter 400 or 500 includes a short section of whip cable 200 or 250 fitted with a male connector 900 or 950. Any exposed portions of whip cable 200 or 250 may placed into linked sections of cable carrier 300 or 350, respectively.

Brackets 1100 are installed at desired locations on the undersides of table or desk tops by inserting screws or other fasteners through holes 1112 in the desk mounting member 1102 and into corresponding holes tapped into the furniture. Alternatively, a bracket could be attached to a vertical surface, such as wall or furniture panel.

Figure 63:
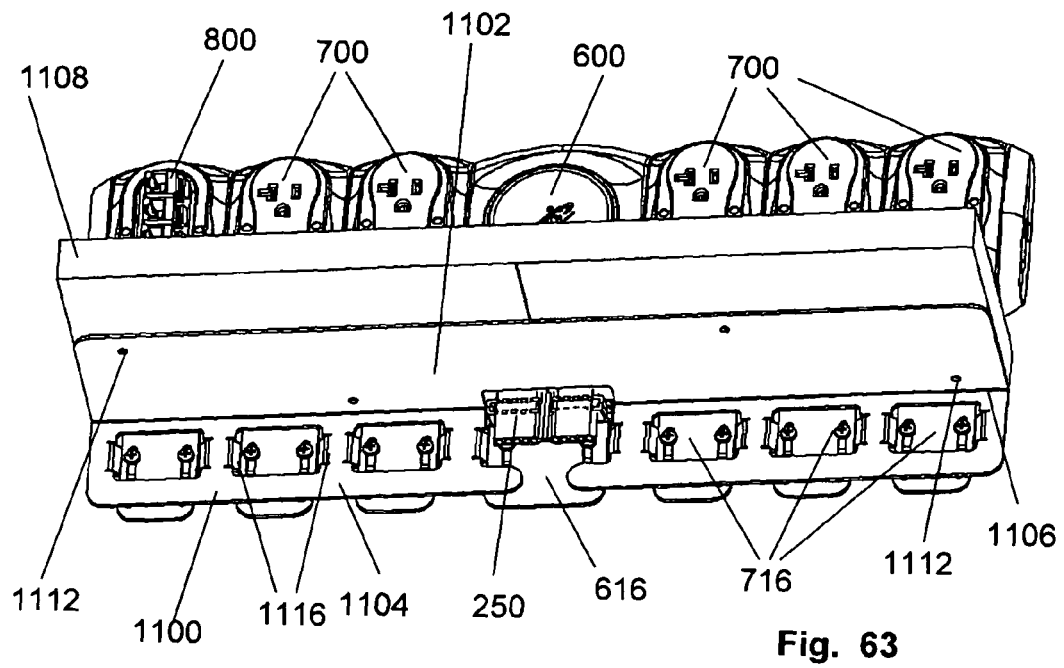
FIG. 63 is a front perspective view of a mounting bracket in accordance with the present invention.
Figure 64:
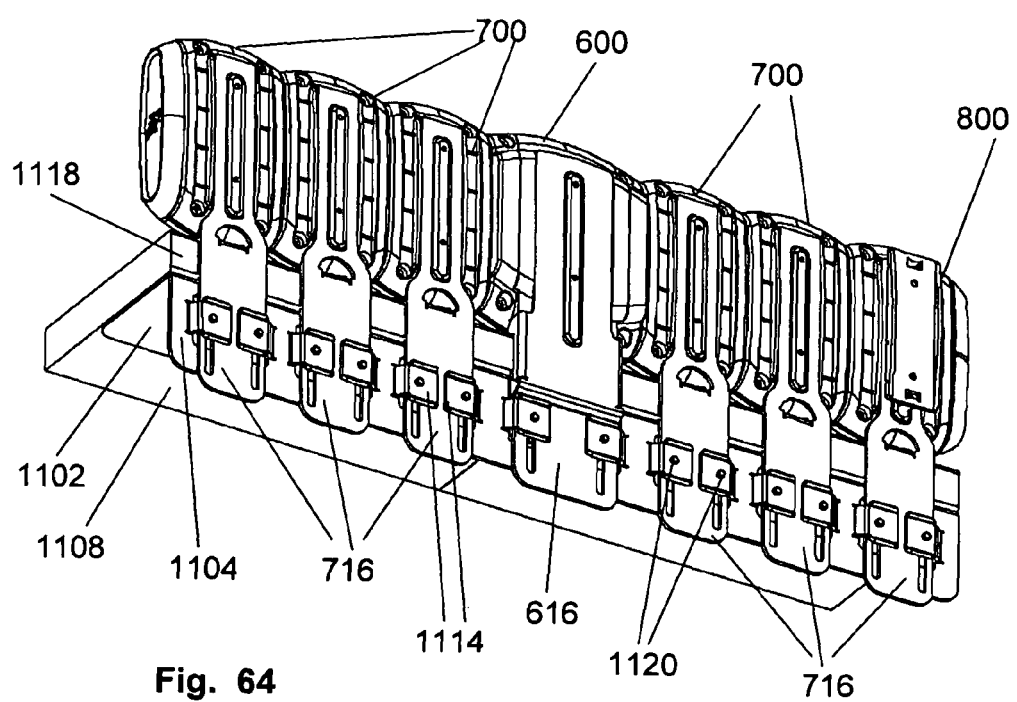
FIG. 64 is a rear perspective view of the bracket of FIG. 63.

Normally, the power cores, high-voltage power modules, and low-voltage data modules will each be supplied from the factory with a separate subassembly of the blade attached to the shuttle. The first module, generally a power core 600 that has been pre-assembled at the factory, is then installed by inserting its blade between blade retainers 1114 or 1116 and blade retaining member 1104 and securing it to bracket 1100 with suitable fasteners. The first module's shuttle is then latched onto the module chassis. No more than one power core 600 can be installed on bracket 1100. As shown in FIGS. 63 and 64, the power core blade 616 is shaped differently from the high-voltage and low-voltage module blades 716, bracket 1100 includes only one pair of blade retainers 1114 for a power core blade 616 and multiple pairs of blade retainers 1116 for high-voltage and low-voltage module blades 716.

Figure 48:
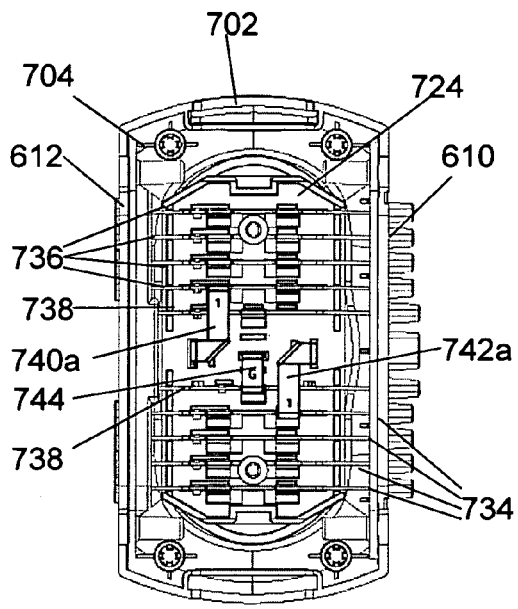
FIG. 48 is a rear interior view of the high-voltage power module of FIG. 41 showing one possible configuration of power straps.
Figure 49:
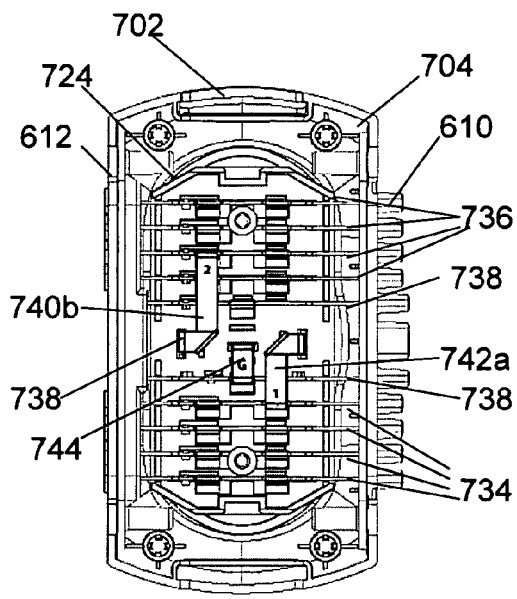
FIG. 49 is a rear interior view of the high-voltage power module of FIG. 41 showing another possible configuration of power straps.
Figure 50:
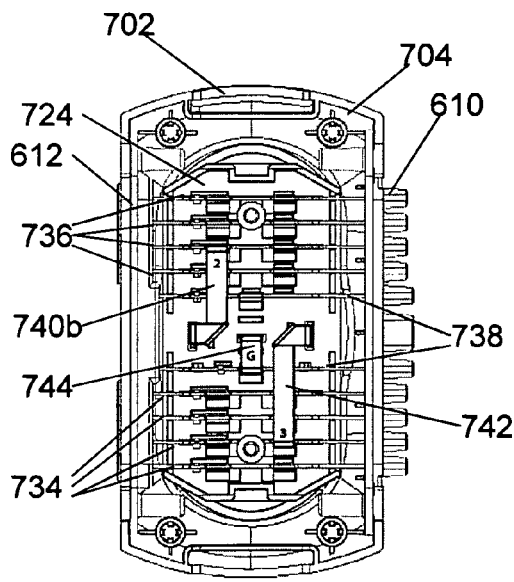
FIG. 50 is a rear interior view of the high-voltage power module of FIG. 41 showing yet another possible configuration of power straps.
Figure 51:
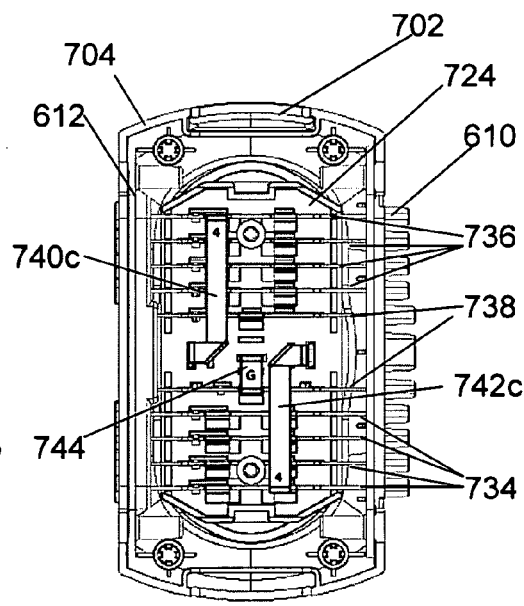
FIG. 51 is a rear interior view of the high-voltage power module of FIG. 41 showing still another possible configuration of power straps.

Additional modules, such as high-voltage power modules 700 and low-voltage data modules 800, in accordance with the present invention, preferably include identical shuttles, such as shuttle 618 of power core 600, high-voltage power module 700, and low-voltage data module 800. Referring to FIGS. 48-49, shuttle latches 620 are engage-able with a chassis, such as core chassis 626, high-voltage power module high-voltage module chassis 724, or low-voltage data module chassis 822. Each shuttle 618 fits against the rear housing of its respective module, and the rear housing includes slots 624 or 722 through which the shuttle latches 620 are inserted. A core mounting blade 616 or a module mounting blade 716 is attached to the outside (rear) surface of the shuttle 618.

After the first module is installed, an additional module can be aligned with the first one and installed. The blade 716 of a blade/shuttle assembly is secured to the mounting bracket 1100 via blade retainers 1116. The additional module is mounted onto the blade/shuttle subassembly such that the shuttle latches 622 extend into the slots 624 in the rear module housing with the shuttle positioned as far as possible toward the connect bezel that will mate with the adjacent module.

Thus, the connect bezels that are to be mated are adjacent to each other, with the body of the second module spaced apart sideways from the previously installed module. The module body is moved sideways relative to the blade and the shuttle to mate the male and female connect bezels of the adjacent modules. The shuttle latches 620 slide along the chassis top and bottom, engaging the chassis inside the module, thereby locking the module in the desired position. All high-voltage power modules must be connected serially to a power core to provide electrical continuity between modules. Low-voltage data modules must be outer-most in the series, attached physically but not electrically to an adjacent power core or high-voltage power module.

Male connector 900 or 950 at the end of a whip cable is mated with a corresponding female connector 1000 or 1050 attached to a power core 600. It should be noted that if the power core is to be mounted above the desk, a female connector will be positioned at the end of a short section of ribbon cable extending downward from the bottom of the power core, as shown in FIGS. 33-37 for power core 600. If the power core and other modules are mounted below the desk, the female connector may be attached directly to the power core or a shorter section of ribbon cable may be used. When the connection is made and power energizes the power core, the LED of the power core will light up to indicate that power is available.

Male connector 900 can be mated to female connector 1000 by sliding the end of male connector 900 into the end of female connector 1000 with the ends of latch levers 916 depressed, and then releasing the latch levers to engage latches 918 with lip 101 of female connector 900. The procedure is similar if male connector 950 and corresponding female connector 1050 are used, except that lever 960 of male connector 950 is depressed and then released to engage pin 962 in opening 1070 of female connector 1050.

Data and voice cables are attached to the low-voltage data module 800 through low-voltage data module end cap 808. The data and voice cables may be inserted into cable carrier sections 300 or 350, and the cables may also be engaged in one or more cable management straps 806 attached to one or more high-voltage power modules 700 or low-voltage data modules 800.

As shown in FIGS. 1 and 2, the power core, high-voltage power modules, and low-voltage data module(s) are mounted above desk or table top 112. If the power core, high-voltage power modules, and low-voltage data module(s) are mounted below the desk or table top 112, the rear housings 606 and 706 on the power core 600 and on the high-voltage power modules 700 and the low-voltage data module 800 can be turned upside down for mounting with blades 616 and 716 extending upward into mounting bracket 1100. The front core bezel 604 of core module 600 can also be rotated 90 or 180 degrees, as needed to display a logo or other information correctly. Preferably, these modifications are made at the manufacturing facility rather than at an installation site.

As shown, core 600 and high-voltage power module 700 each have a male connect bezel 610 on the left side, mate-able with a female connect bezel 612 on an adjacent high-voltage power module or power core or with fingers 826 extending from chassis 822 of a low-voltage data module 800. Core 600 and high-voltage power module 700 each also have a female connect bezel 612 on the right side, mate-able with a male connect bezel 610 of an adjacent high-voltage power module or power core or with fingers 826 extending from the chassis 822 of a low-voltage data module 800. In accordance with the modular nature of the system, each module in an installation should have the male connect bezels on the same side and the female connect bezels on the other side. It is possible to have the male connect bezels on the right side and the female connect bezels on the left side, as long as all modules remain compatible with each other. Similarly, the male and female connect bezels could be turned upside down, as long as a consistent orientation is followed to allow the keying features to align with each other. To ensure consistency in an installation of a system such as system 100, it is preferred that each module is assembled at a manufacturing facility and shipped to the installation site ready for system assembly.

A modular utility system in accordance with the present invention can also be configured with a power core 600 mounted below the desk or table top 1008. In this case, the high-voltage power modules 700 and the low-voltage data modules 800 will also be mounted underneath the desk or table top. Core cover 608 and core blade 616 may be turned upside down to facilitate mounting below a desk or table top. In addition, the system can be configured with the core, high-voltage power and low-voltage data modules rotated 90 degrees, so they are stacked vertically.

System De-Installation

The installation process may be reversed to uninstall a module or system. However, a release tool, such as release tool 1400, is required to separate low voltage data modules and high voltage power modules from each other and from a power core.

Each male and female connect bezel, such as male connect bezels 1206, 1216, and 1226 and female connect bezels 1214, 1234, and 1254 in FIGS. 65-67, includes channels, such as channels 1208, 1228, 1248, 1216, 1236, and 1256 that extend into the interior of the power core, high-voltage power module, or low-voltage data module into which the connect bezel is mounted. To uninstall a module, the tines 1404 of the release tool 1400 are inserted through the channels in the connect bezel on the side of the module that is to be farthest from the previously installed module or power core, and the tips 1406 of the tines separate the shuttle latches 620 and disengage them from the chassis inside the module. Thus, the release tool allows the shuttle to slide sideways relative to the connect bezels. With the latches thus released, the module to be uninstalled can be moved toward the tool handle, with the latches sliding within slots 624 or 722 in the rear housing of the module. When the module has been moved sufficiently to separate the male and female connect bezels of the adjacent modules, the blade of the module being uninstalled can be removed from the mounting bracket.

For ease of manufacture, it is preferable to make as many components of the system as possible interchangeable. Thus, end caps 614, which protect the internal portions of a power core 600 or high-voltage power module 700 from dust and debris, may be formed such that they fit over a male or female connect bezel and do not fit against or into any of the internal components of the module onto which they are mounted. Preferably, the same front module housing 704 can be used for either a high-voltage power module or a low-voltage data module, as can the same rear module housing 706. The same shuttles 618, plugs 702, cable management straps 806, and color-coded ID rings 710, are also be used in high-voltage power module 700 and in low-voltage module 800. Also, male connector chassis 908, male connector chassis 966, female connector chassis 1002, and female connector chassis 1052 may be identical, and connector contacts 922, 924, 1064, and 1066 may be identical.

Although multiple modules can be mounted in series on each side of a power core, high-voltage power modules should be adjacent the power core, with a low-voltage data module positioned at the end of the series to provide electrical continuity between the power core and all high-voltage power modules. The low-voltage data modules need no high-voltage power. Depending on the number of high-voltage power modules needed at a work station, a low-voltage data module may be mounted directly to a power core.

Preferably, the system components are re-usable within the same building or installation or in another installation. It is contemplated that, in addition to a minimal number of basic tools, such as a screw driver and a drill, only an installation tool, such as tool 1400, is needed for installation or un-installation of the system. Because the power configuration is set up at the power distribution module and maintained through all system components, and because the components mate with each other in an unambiguous way, installation and un-installation are simple and do not require the services of an electrician after the individual wires of multi-conductor trunk cable cables 102 are connected to the main power line through a series of protective circuit breakers within the utility cabinet/breaker panel.

Preferably, all contacts and bus bars are formed from brass using a four slide process. The component housings, chassis, and connect bezels may be formed from a suitable flame-retardant, non-conductive material, preferably V-rated plastic that meets the requirements of Underwriters Laboratory. Splitter housing 410 may be formed from metal, such as sheet steel, for ease of manufacturing and to minimize the thickness of the splitter 400. The end caps and plugs may be formed from a resilient material, such as rubber. The ID rings may be formed from any material, preferably plastic.

The present invention provides an improved system for managing power, data, and telephone lines for work stations and work areas, allowing flexibility and convenience for configuring and re-configuring work stations and work areas without the need for a qualified electrician. The system may be used with conventional modular furniture and can be reconfigured ease and flexibility comparable to that of reconfiguring the furniture.

The foregoing description is considered as illustrative only of the principles of the invention. Further, since numerous modifications and changes will readily occur to those skilled in the art, it is not desired to limit the invention to the exact construction and process shown and described above. Accordingly, all suitable modifications and equivalents may be resorted to falling within the scope of the invention.

What is claimed is:

1. A modular utility system for providing high-voltage power and low-voltage telecommunications connectivity to equipment of at least one work station, said system comprising:
    a whip cable having up to 10 conductors and operative to carry a pre-determined assignment of phase, neutral, and ground circuits in said conductors;
    a power core module in electrical contact with said whip cable and operative to maintain said pre-determined assignment of phase, neutral, and ground circuits; and
    at least one high-voltage power module in mated physical and electrical contact with said power core module and operative to distribute high-voltage power to the workstation equipment with said pre-determined assignment of phase, neutral, and ground circuits;
    wherein:
    a) said power core and each of said high-voltage power modules comprises a male connector on one side and a female connector on an opposing side;
    b) at least one of the following conditions occurs:
        said male connector of said power core is mated with said female connector of an adjacent high-voltage power module or an adjacent data module;
        said female connector of said power core is mated with said male connector of said adjacent high-voltage power module or an adjacent data module;
        said male connector of said high-voltage power module core is mated with said female connector of said adjacent power core or high-voltage power module or with an adjacent data module; or
        said female connector of said power module is mated with said male connector of said adjacent power core or power module or an adjacent data module;
    c) said male and female connectors each include mated key features correlated with said pre-determined assignment of phase, neutral, and ground circuits;
    d) said key features are operative to align and mate adjacent modules, each module having a front, two sides, and a male connect bezel on one side and a female connect bezel on the other side;
    e) said key features comprise a male mating surface at the exterior of each of said male connect bezels and openings through said male mating surface into which electrical contacts extend from the interior of said module, with a distinctively shaped key protruding outward from said male mating surface;
    f) said key features also comprise a female mating surface at the exterior of each of said female connect bezels and openings through said female mating surface into which electrical contacts extend from the interior of said module, with a keyhole in said female mating surface having a shape complementary to said distinctively shaped key; and
    g) said key of said first module is insert-able into said keyhole of said second module to mate said modules with said electrical contacts of said modules providing electrical continuity of said pre-determined power configuration between said modules.

2. The system of claim 1, comprising a plurality of high-voltage power modules connected serially to said power core.

3. The modular utility system of claim 1, further comprising at least one low-voltage data module in mated physical contact with one of said high-voltage power modules or said power core.

4. The keying system of claim 1, wherein said male connect bezels are positioned on the left sides of each of said modules, and said female connect bezels are positioned on the right sides of each of said modules, as viewed from the front of said module.

5. The keying system of claim 1, wherein said predetermined power configuration is selected from 4D, 3+2, and 3+3.

6. The keying system of claim 1, wherein:
    said first module is a power core;
    said second module is a high-voltage power module;
    said system further comprises additional high-voltage power modules, with each high-voltage power module including male and female mating surfaces substantially identical to said male and female mating surfaces of said power core; and
    said key of each module is insert-able into said keyhole of another of said modules to mate said modules to provide electrical continuity between all of said modules in said pre-determined power configuration.

7. The modular utility system of claim 1, wherein said whip cable comprises:
- a 1×10 array of conductors within a ribbon cable sheath, wherein said sheath includes indicia for identifying each of said conductors.

8. The system of claim 1, further comprising a second whip cable terminating in a female connector, said second whip cable having up to 10 conductors and operative to carry a pre-determined assignment of phase neutral, and ground circuits in said conductors;
- wherein said first whip cable terminates in a male connector for providing physical and electrical contact between said whip cable and said female connector on said second whip cable, said male connector comprising:
- a male connector housing; and
- a connector chassis retaining up to ten contacts, with each contact in electrical communication with an end of one wire of the first whip cable; wherein:
- said chassis is secured about an end of the whip cable and within said male connector housing; and
- two of said contacts extend farther away from the first whip cable than the rest of said contacts for providing first make/last break connections and disconnections for a safety/equipment ground line and an isolated ground line.

9. The system of claim 1, further comprising at least one female connector for providing physical and electrical contact with a male connector on a whip cable, said female connector comprising:
- a female connector housing; and
- a connector chassis retaining up to ten contacts, with each contact in electrical communication with an end of a conductor and two of said contacts extending farther away from the cable end than the rest of said contacts; wherein:
- said chassis is secured within said female connector housing; and
- two of said contacts extend farther away from the first whip cable than the rest of said contacts for providing first make/last break connections and disconnections for a safety/equipment ground line and an isolated ground line.

10. The modular utility system of claim 1, further comprising:
- a flexible cable carrier at least partially enclosing said whip cable, said cable carrier also including means for retaining additional low-voltage cables selected from telephone cables, data transmission cables, fiber optics cables, coaxial cables, and combinations thereof, said cable carrier comprising:
- an elongated, hollow section of an elastomeric material having a slot there-through extending the length of said section, wherein said section is shaped to substantially surround and enclose the whip, telephone, data, fiber optics, and coaxial cables; and
- means for joining said section to another section or to a device connected to said whip cable.

11. The modular utility system of claim 1, further comprising:
- at least one high-voltage power splitter for splitting a first high-voltage line into second and third high-voltage lines, each high voltage line having up to 10 conductors, said splitter comprising:
- a splitter base;
- a splitter housing joined to said splitter base with a space there-between, said housing also including an opening through which said third high voltage line passes;
- two opposing connecting extensions retained between said splitter base and said splitter housing, said connecting extensions mate-able with connectors on whip cables of said first and second high voltage lines;
- up to ten internal conductors extending between said connecting extensions and within said space between said splitter housing and said splitter base;
- one contact engaging electrically each internal conductor within said space;
- means for engaging each conductor of said third line within said space and in electrical continuity with a corresponding one of said internal conductors; and
- means for mechanically supporting said third 10-conductor line adjacent said splitter.

12. The modular utility system of claim 1, wherein said power core comprises:
- a front core housing;
- a rear core housing secured to said front core housing and defining a space there-between;
- a male connect bezel retained between said front and rear core housings on one side of said power core;
- a female connect bezel retained between said front and rear core housing on a second side of said power core opposing said male connect bezel;
- a core chassis retained in the space between said front and rear core housing;
- a core cover secured to said rear core housing and forming a space there-between;
- a high-voltage whip cable having an end positioned between said core cover and said rear core housing;
- up to 10 bus bars retained by said chassis and providing electrical continuity between said male and female connect bezels within the space defined between said front and rear core housings; and
- up to 10 angle contacts, one extending from each of said bus bars through an opening in said rear core housing and engaging one conductor of said whip cable within the space defined between said rear core housing and said core cover, with each angle contact providing electrical continuity between one of said bus bars and one of said conductors of said whip cable.

13. The modular utility system of claim 1, wherein said high-voltage power module comprises:
- a front module housing;
- a rear module housing attached to said front module housing and enclosing a space there-between;
- a male connect bezel retained between said front and rear module housings on one side of said power module;
- a female connect bezel retained between said front and rear module housings on a second side of said power module opposing said male connect bezel;
- a power module chassis retained between said front and rear module housings;
- 10 current carriers retained by said chassis and providing electrical continuity between said male and female connect bezels within the space defined between said front and rear module housings, with each current carrier designated to carry a type of current selected from phase, neutral, or ground circuits;
- at least one power receptacle retained within an opening in said front module housing, said power receptacle including openings for two power prongs and a ground prong of an electrical plug;
- ground straps electrically connecting said ground current carriers to a ground contact in each power receptacle; and power straps electrically connecting said phase and neutral current carriers to said at least one power receptacle in accordance with a pre-determined power line configuration.

14. The system of claim 1, further comprising at least one high-voltage power splitter, each splitter providing high-voltage power to a side branch whip cable having up to ten conductors.

15. The system of claim 1, further comprising a power distribution module having at least one input for a multi-conductor trunk cable cable and at least one output connector adapted for use with said whip cable.

16. The system of claim 1, further comprising mated connectors for providing electrical continuity between said whip cable and said power core.

17. The system of claim 1, further comprising a cable carrier at least partially enclosing said whip cable, said cable carrier also including means for retaining additional low-voltage cables selected from telephone cables, data transmission cables, fiber optics cables, coaxial cables, and combinations thereof.

18. The system of claim 17, wherein said cable carrier comprises flexibly linked sections.

19. The system of claim 1, wherein:
said whip cable comprises an array of up to ten conductors arranged side by side within a ribbon cable sheath; and
said sheath includes indicia for identifying each of said conductors.

20. The system of claim 1, further comprising a bracket for mounting said power core, power modules, and data modules to a work surface.

21. The system of claim 1, wherein each of said power cores, power modules, and data modules comprises a shuttle having latches engage-able with an internal chassis, and said chassis retains electrical components.

22. The system of claim 1, wherein at least one of said power modules and said data modules comprises means for retaining high-voltage power cords and low-voltage cables selected from telephone cables, data cables, fiber optics cables, coaxial cables, and combinations thereof.

23. A method for installing and de-installing the modular system of claim 1, wherein each module comprises a chassis, a mounting blade, and a shuttle, with the mounting blade fixed to the shuttle and the shuttle latchable to the chassis, the method comprising the steps of:
(a) providing a mounting bracket and means for mounting each mounting blade to said bracket with said modules in a side-by-side arrangement;
(b) providing first and second modules, each module having a shuttle/blade subassembly detached from said module;
(c) mounting said first module shuttle/blade subassembly to said mounting bracket;
(d) mounting said first module onto said first module shuttle/blade subassembly and latching said first module's shuttle to said first module's chassis;
(e) mounting said second module shuttle/blade subassembly to said mounting bracket adjacent said first shuttle/blade assembly;
(f) mounting said second module onto said second module shuttle/blade subassembly with said second module's chassis positioned laterally away from said first module; and
(g) sliding said second module toward said first module until said second module is positioned in physical contact with said first module with said male key of said male mating surface of one of said modules engaged with said keyhole of said female mating surface of the other of said modules and said second module's shuttle latches to said second module's chassis.

24. The system of claim 3, comprising multiple low-voltage data modules, wherein each low-voltage data module is in mated physical contact with a different one of said high-voltage power modules.

25. The system of claim 14, comprising a power core on each side branch, wherein each power core is in electrical contact with one of said side branch whip cables.

26. The system of claim 3, wherein:
at least one high-voltage power module is in mated physical and electrical contact with each of said power cores; and
at least one low-voltage data module is in physical contact with each power core or a high-voltage power module in contact with each power core.

27. The system of claim 21, further comprising a tool for uninstalling said power modules and data modules, said tool having tines engage-able with said latches of said shuttles and operable to release said latches of said shuttle from said chassis.

28. The method of claim 23, wherein said first module is a power core and said second module is a high voltage power module.

29. The method of claim 23, wherein steps e-g are repeated to mount a third module to one of said first and second modules.

30. The method of claim 29, wherein said third module is selected from high voltage power modules and low voltage data modules.

31. The method of claim 29, wherein:
steps e-g are repeated to mount up to three modules on each side of a power core to form a linear array of connected modules, said array comprising no more than two low voltage data modules with each low voltage data module at an end of said array.

32. The method of claim 29, wherein:
said method comprises the additional steps of
(h) providing a de-installation tool said tool comprising a handle and a pair of tines extending from said handle, each tine terminating in a tip engage-able with each shuttle of each module; and
(i) inserting said tines into openings in the last of said modules to disengage said shuttle latches from said chassis of said last module; and
steps c-g are reversed.

33. The system of claim 27, wherein:
said tool further comprises a handle; and
said tines extend from said handle, each tine terminating in a tapered tip engage-able with said shuttle latches on one of the modules.

34. The system of claim 7, wherein said ten conductors of said whip cable are individually insulated within said ribbon cable sheath.

35. The system of claim 7, wherein:
said sheath includes two opposing sides;
said conductors are disposed side by side within said sheath; and
said indicia comprise different shapes for each of said two sides.

36. The system of claim 7, wherein said sheath includes openings for attachment of connectors to said cable.

37. The system of claim 8, wherein said first whip cable is a ribbon cable.

38. The system of claim 8, wherein said second whip cable comprises up to ten individual wires within a flexible conduit.

39. The system of claim 38, further comprising mated shell portions including flanges engaged with said flexible conduit, said female connector housing, and said connector chassis.

40. The system of claim 8, further comprising means for locking said male connector to said female connector.

41. The system of claim 40, wherein said means for locking is operable with one hand.

42. The system of claim 40, wherein said means for locking comprises at least one lever with a tip engage-able with an opening in the female connector.

43. The system of claim 9, wherein said conductors extend from a device selected from whip cables, splitters, power cores, and combinations thereof.

44. The system of claim 9, further comprising means for locking said female connector to a male connector.

45. The system of claim 44, wherein said means for locking includes at least one opening engage-able with a lever tip of the male connector.

46. The system of claim 10, wherein said cable carrier comprises a plurality of flexibly linked sections.

47. The modular utility system of claim 10, wherein each of said cable carrier sections has first and second ends, and said means for joining comprises opposing pivot pins adjacent said first end of said section and opposing holes for receiving pivot pins adjacent said second end.

48. The cable carrier of claim 10, wherein said section further comprises inwardly projecting ribs for retaining said cables within said section.

49. The system of claim 11, wherein said first, second, and third high-voltage lines are whip cables within a tubular conduit.

50. The system of claim 11, wherein at least one of said high-voltage lines is connected to a ribbon cable of said power core.

51. The system of claim 11, wherein said internal conductors are wires.

52. The system of claim 11, wherein said contacts are retained by devices selected from spacers integral with said base, spacers integral with said housing, and combinations thereof.

53. The system of claim 11, wherein said means for engaging comprise contacts engaging each of said internal conductors with a separate spade, wherein each spade is in electrical continuity with one contact and one conductor in said third line.

54. The system of claim 11, wherein said means for supporting comprises a bracket in mechanical contact with said housing and said third branch line.

55. The modular utility system of claim 12, wherein said whip cable is a ribbon cable.

56. The modular utility system of claim 12, further comprising means for mounting said power core adjacent a work surface.

57. The modular utility system of claim 12, wherein said means for mounting comprises a blade insert-able into a mounting bracket adjacent said work surface.

58. The modular utility system of claim 12, further comprising means for indicating when electrical power is supplied to said power core.

59. The modular utility system of claim 12, wherein said means for indicating comprises a light source selected from electrically powered light sources and inductively powered light sources.

60. The modular utility system of claim 13, wherein said current carriers are bus bars.

61. The modular utility system of claim 13, wherein said power receptacle is selected from 110V power receptacles and 220 V power receptacles.

62. The modular utility system of claim 13, further comprising an indicator for the power configuration of the current carriers.

63. The modular utility system of claim 62, wherein said indicator is a ring retained within the opening in said front module housing between said front module housing and said at least one power receptacle.

64. The modular utility system of claim 13, further comprising means for mounting said high-voltage power module adjacent a work surface and in electrical contact with a power core of the utility system.

65. The modular utility system of claim 64, wherein said means for mounting comprises a blade insertable into a mounting bracket adjacent said work surface, a shuttle adapted for lateral motion relative to said work surface, or a combination thereof.

66. The modular utility system of claim 1, further comprising:
at least one low-voltage data module in mated physical contact with one of said high-voltage power modules or said power core, said low-voltage data module comprising:
a front module housing;
a rear module housing attached to said front module housing and partially enclosing a space there-between;
a data module chassis retained between said front and rear module housings and including projections that are physically align-able with an adjacent power core or high-voltage power module; and
at least one communications receptacle in electrical communication with a low-voltage line selected from telephone lines and data lines, said receptacle retained by said chassis between said front and rear module housings and extending into an opening in said front module housing to enable connection of a telecommunications line extending between said communications receptacle and telecommunications equipment.

67. The system of claim 66, wherein said telecommunications receptacles of said low-voltage data module are selected from telephone cable receptacles, network cable receptacles, fiber optics cable receptacles, and coaxial cable receptacles.

68. The modular utility system of claim 66, wherein said low-voltage data module further comprises indicia for identifying the type of low-voltage circuit associated with each receptacle.

69. The modular utility system of claim 66, wherein said low-voltage data module further comprises means for mounting said low-voltage data module adjacent a work surface and in physical contact with a device selected from said high-voltage power module and said power core.

70. The system of claim 69, wherein said means for mounting is selected from a blade insert-able into a mounting bracket adjacent said work surface, a shuttle adapted for lateral motion relative to said work surface, and combinations thereof.

* * * * *